(12) United States Patent
Peng et al.

(10) Patent No.: US 12,212,162 B2
(45) Date of Patent: Jan. 28, 2025

(54) CHARGING CABLE-BASED DATA TRANSMISSION METHOD AND ELECTRONIC DEVICE

(71) Applicant: HUAWEI TECHNOLOGIES CO., LTD., Guangdong (CN)

(72) Inventors: Jiang Peng, Shanghai (CN); Zongjian Li, Dongguan (CN); Chao Wang, Shenzhen (CN); Mingwei Zhang, Shenzhen (CN); Chengjun Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 18/014,529

(22) PCT Filed: Jul. 15, 2021

(86) PCT No.: PCT/CN2021/106599
§ 371 (c)(1),
(2) Date: Jan. 5, 2023

(87) PCT Pub. No.: WO2022/012644
PCT Pub. Date: Jan. 20, 2022

(65) Prior Publication Data
US 2023/0261477 A1   Aug. 17, 2023

(30) Foreign Application Priority Data

Jul. 15, 2020  (CN) .......................... 202010682894.2
Oct. 27, 2020  (CN) .......................... 202011167642.2
(Continued)

(51) Int. Cl.
H02J 7/00    (2006.01)
G06F 13/36   (2006.01)
H02J 7/34    (2006.01)

(52) U.S. Cl.
CPC .......... *H02J 7/00032* (2020.01); *G06F 13/36* (2013.01); *H02J 7/342* (2020.01)

(58) Field of Classification Search
CPC ...................................................... G06F 13/36
See application file for complete search history.

(56) References Cited

U.S. PATENT DOCUMENTS

2013/0191566 A1   7/2013  Kaestner
2014/0159645 A1*  6/2014  Wyskiel ............... H02J 7/0042
                                              320/107
(Continued)

FOREIGN PATENT DOCUMENTS

CN    201515041 U    6/2010
CN    104578276 A    4/2015
(Continued)

*Primary Examiner* — Henry Tsai
*Assistant Examiner* — Aurangzeb Hassan

(57) ABSTRACT

This application discloses a charging cable-based data transmission method and an electronic device. A first electronic device is connected to a second electronic device through a third electronic device, and the third electronic device includes a first data signal line and a second data signal line. When the method is applied to the first electronic device, the first electronic device may detect a connection to the second electronic device; send a first message through a first pin, where the first pin is connected to the first data signal line;

(Continued)

and receive a second message through a second pin, where the second pin is connected to the second data signal line, and the first message and the second message are used for charging setting of the first electronic device.

20 Claims, 29 Drawing Sheets

(30) Foreign Application Priority Data

Oct. 28, 2020 (CN) .......................... 202011175402.7
Dec. 30, 2020 (CN) .......................... 202011614749.7

(56) References Cited

U.S. PATENT DOCUMENTS

| | | | | |
|---|---|---|---|---|
| 2015/0249393 | A1* | 9/2015 | Zhang | H02M 3/33523 363/21.15 |
| 2016/0105038 | A1* | 4/2016 | Chi | H02J 7/00036 320/107 |
| 2016/0190847 | A1* | 6/2016 | Han | H02J 1/10 320/134 |
| 2017/0187200 | A1 | 6/2017 | Somerville et al. | |
| 2018/0239410 | A1* | 8/2018 | Paparrizos | H02J 7/00036 |
| 2019/0236037 | A1 | 8/2019 | Sugumar et al. | |
| 2020/0247267 | A1* | 8/2020 | Kuwabara | H02J 7/0047 |

FOREIGN PATENT DOCUMENTS

| | | |
|---|---|---|
| CN | 104701583 A | 6/2015 |
| CN | 104967200 A | 10/2015 |
| CN | 106716389 A | 5/2017 |
| CN | 106877462 A | 6/2017 |
| CN | 107196357 A | 9/2017 |
| CN | 107201615 A | 9/2017 |
| CN | 107210615 A | 9/2017 |
| CN | 107508354 A | 12/2017 |
| CN | 107544934 A | 1/2018 |
| CN | 107579558 A | 1/2018 |
| CN | 207053208 U | 2/2018 |
| CN | 108964187 A | 12/2018 |
| CN | 110534988 A | 12/2019 |
| CN | 110829523 A | 2/2020 |
| CN | 210327098 U | 4/2020 |
| CN | 111157813 A | 5/2020 |
| CN | 111309662 A | 6/2020 |
| CN | 111404219 A | 7/2020 |
| CN | 114297127 B | 11/2022 |
| KR | 20150073677 A | 7/2015 |

* cited by examiner

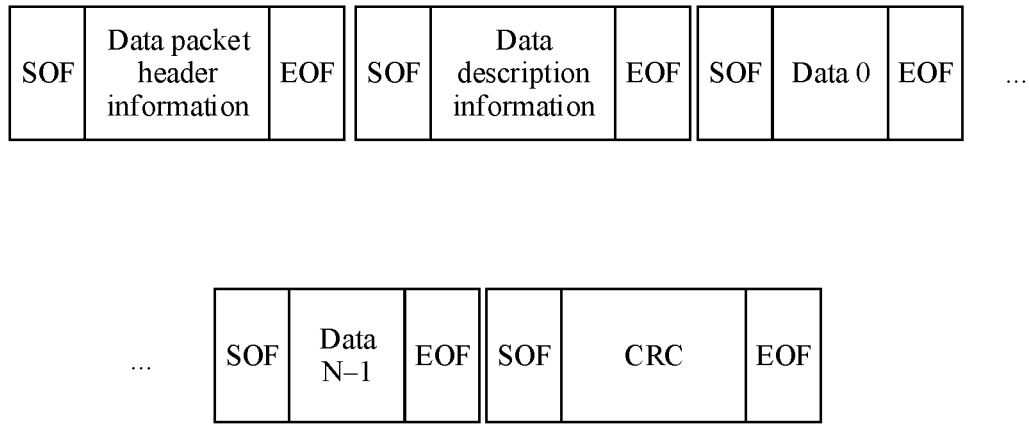
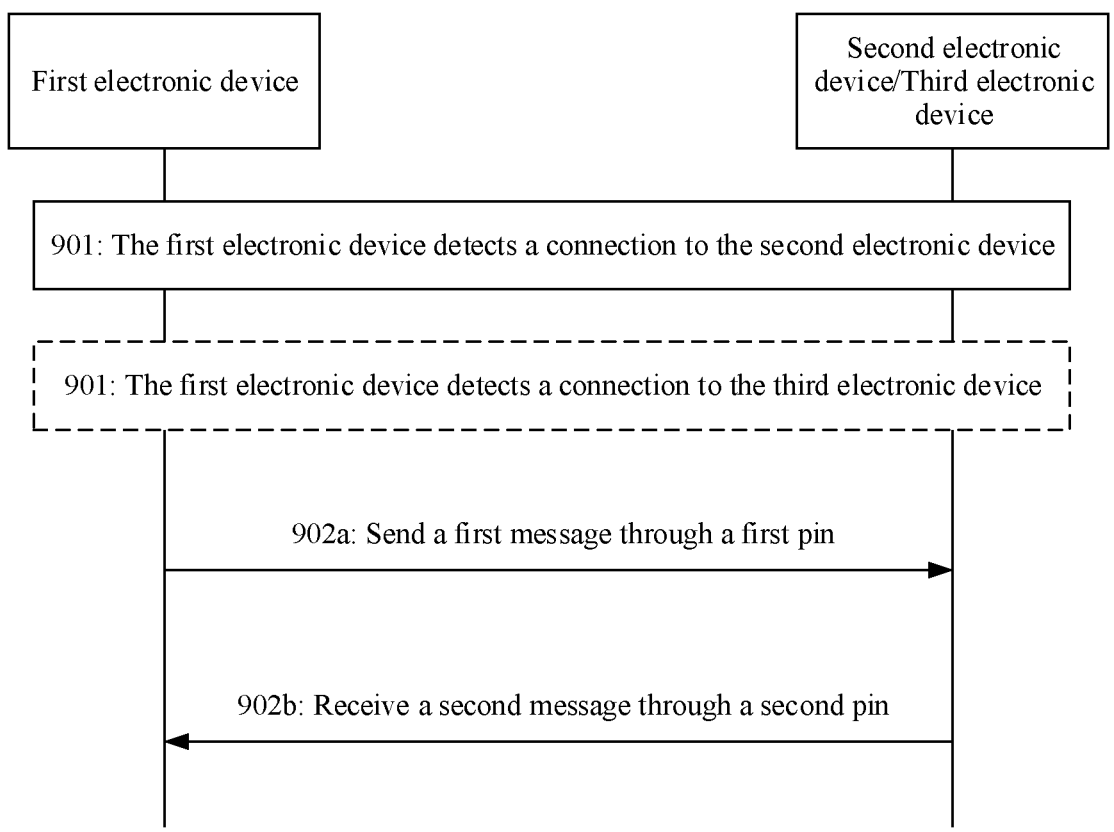
FIG. 8e
FIG. 9a

CHARGING CABLE-BASED DATA TRANSMISSION METHOD AND ELECTRONIC DEVICE

CROSS-REFERENCE TO RELATED APPLICATIONS

This application is a national stage of International Application No. PCT/CN2021/106599, filed on Jul. 15, 2021, which claims priority to Chinese Patent Application No. 202010682894.2, filed on Jul. 15, 2020, and Chinese Patent Application No. 202011175402.7, filed on Oct. 28, 2020, and Chinese Patent Application No. 202011167642.2, filed on Oct. 27, 2020 and Chinese Patent Application No. 202011614749.7, filed on Dec. 30, 2020. All the aforementioned applications are hereby incorporated by reference in their entireties.

TECHNICAL FIELD

This application relates to the field of charging technologies, and in particular, to a charging cable-based data transmission method and an electronic device.

BACKGROUND

With a trend of diversified functions and large screens of intelligent terminals, power consumption of devices gradually increases, battery capacities gradually increase, and intelligent terminal devices have an increasingly strong demand for fast charging. In recent years, a plurality of fast charging protocols have been developed in the industry.

One type of fast charging protocol is a single-wire communication (Configuration Channel, CC) fast charging protocol, and a representative based on the CC communication protocol is USB PD. A terminal product in the USB PD may support a Type-C USB port, referred to as a Type-C port for short, defined by the USB association. Advantages of the USB Type-C port are support for both-side insertion of the USB port, a thinner and simpler design, and stronger circuit transmission (a maximum of 100 W). These advantages can implement fast charging for terminal products, so that customers' charging requirements are satisfied. However, the USB PD fast charging protocol cannot be applied to another charging scenario other than a Type-C to Type-C port, for example, a Type A to Type B port scenario. In addition, the USB PD protocol has a relatively large limitation on a charging power and specification. Consequently, implementation is relatively complex, and costs are relatively high.

Another type of fast charging protocol is a fast charging protocol based on D+/D− (Data+/Data−) channel communication, such as Huawei SCP, OPPO VOOC, QC, or Samsung AFC. However, in an existing charging process based on D+/D− (Data+/Data−) channel communication, transmission efficiency of charging data or instructions is very low. In a process of charging a terminal product, a delay may occur in transmission of to-be-transmitted information due to a charging status, an unexpected fault, or the like of the terminal or a power supply device. Consequently, security of a charging system is affected.

SUMMARY

This application provides a charging cable-based data transmission method and an electronic device, to improve data transmission efficiency of a D+/D− channel in a charging process.

According to a first aspect, this application provides a charging cable-based data transmission method, applied to a first electronic device. The first electronic device is connected to a second electronic device through a third electronic device, the third electronic device includes a first data signal line and a second data signal line, and the method includes: detecting a connection to the second electronic device; sending a first message through a first pin, where the first pin is connected to the first data signal line; and receiving a second message through a second pin, where the second pin is connected to the second data signal line, and the first message and the second message are used for charging setting of the first electronic device.

This is different from the conventional technology in which only a D− data signal line can be used for message sending and receiving between the first electronic device and the second electronic device. According to the foregoing method, messages can be sent and received on different data signal lines, so that electronic devices can send messages to peer ends without waiting for completion of sending by the peer ends. This effectively improves efficiency of transmitting data on the data signal lines. In addition, when the second electronic device servers as a to-be-charged device and the second electronic device servers as a power supply device, compared with the only solution in which the first electronic device actively sends a message to the second electronic device and the second electronic device passively responds to the message in the conventional technology, in this application, the first electronic device may further receive a message actively sent by the second electronic device or the third electronic device, especially in a scenario in which active reporting is required when the second electronic device or the third electronic device is abnormal. This can effectively improve security of a charging process.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

According to the foregoing method, a pin of the positive signal data line (for example, D+) may be set to the first pin, and a pin of the negative signal data line (for example, D−) may be set to the second pin, or a pin of the positive signal data line (for example, D+) may be set to the second pin, and a pin of the negative signal data line (for example, D−) may be set to the first pin, so that signals are independently sent or received on different data lines. This implements duplex transmission on the signal data line. In addition, different duplex transmission manners may be set according to a requirement. This effectively improves data transmission efficiency and data transmission flexibility.

In a possible implementation, the method further includes: detecting the connection to the second electronic device by using the first pin or the second pin, and determining that the second electronic device is a dedicated charging port DCP device; sending a first pulse signal through the first pin; and detecting an electrical signal of the second electronic device by using the second pin, and determining that the second electronic device supports a fast charging mode.

Considering that a handshake process for a communication protocol is time-consuming in the conventional technology, according to the foregoing method of sending the first pulse signal, the first electronic device and the second electronic device support a handshake protocol for charging a battery of the first electronic device in a fast charging mode, and the second electronic device can quickly detect the first pulse signal. Therefore, time for entering the fast charging mode is shortened. Especially, when a battery level of the first electronic device is excessively low, the fast charging mode can be quickly entered to improve charging experience.

In a possible implementation, the second pin is the pin connected to the positive signal data line, and the electrical signal is a high-level signal.

According to the foregoing method, when the second pin is the pin connected to the positive signal data line, considering that the first electronic device sends the first pulse signal through the first pin, the first pin is a negative signal data line, and is at a low level in an idle state. Therefore, the electrical signal of the second electronic device may be a high-level signal. For example, the high-level signal may be a high-level pulse signal. In this way, the first electronic device can quickly determine, by detecting the high-level signal, that handshake is completed. This further shortens time for entering the fast charging mode.

In a possible implementation, the second pin is the pin connected to the negative signal data line, and the electrical signal is a low-level signal.

According to the foregoing method, when the second pin is the pin connected to the negative signal data line, considering that the first electronic device sends the first pulse signal through the first pin, the first pin is a positive signal data line, and is at a high level in an idle state. Therefore, the electrical signal of the second electronic device may be a low-level signal. For example, the low-level signal may be a low-level pulse signal. In this way, the first electronic device can quickly determine, by detecting the low-level signal, that handshake is completed. This further shortens time for entering the fast charging mode.

In a possible implementation, the first message includes a first identifier, the first identifier is used to indicate a receiver of the first message, the second message includes a second identifier, and the second identifier is used to indicate a receiver of the second message.

In a possible implementation, the receiver of the first message is a chip of the third electronic device, and the receiver of the second message is the first electronic device. In a possible implementation, the receiver of the first message is the second electronic device, and the receiver of the second message is the first electronic device.

Considering that the third electronic device may also participate in data transmission, according to the foregoing method, an identifier may be set for a message receiver, to identify the message receiver in a data transmission system, avoid mistaken message processing, and improve message transmission reliability.

In a possible implementation, before the sending a first message through a first pin, the method further includes: sending a first signal through the first pin, where a frequency of the first signal is a first frequency, and the first signal is used to indicate that a frequency of the first message is the first frequency.

According to the foregoing method, the first electronic device may send the first signal, to negotiate with the second electronic device to determine a frequency for sending the first signal, so that a frequency of a signal for performing data transmission between the first electronic device and the second electronic device can be negotiated and adjusted according to a requirement, to improve data transmission flexibility. In addition, an anti-interference capability of data transmission can be implemented by adjusting the frequency of the signal, to improve data signal transmission reliability, and improve data transmission performance.

In a possible implementation, a second signal is received through the second pin, where a frequency of the second signal is a second frequency, and the second signal is used to indicate that a frequency of the second message is the second frequency.

According to the foregoing method, the first electronic device may receive the second signal sent by the second electronic device, to negotiate with the second electronic device to determine that a frequency for sending the first signal is the second frequency.

In a possible implementation, the first message includes at least one data frame, and the data frame is any one of the following: data packet header information, data information, control information, and cyclic redundancy check, where a data frame includes a start field, a data field, and an end field.

According to the foregoing method, the first electronic device can determine, according to a requirement, content of a message to be sent to the second electronic device. This improves flexibility of sending the first message. The start field and the end field of the sent data frame can enable the second electronic device to accurately receive the first message. In addition, data transmission reliability can be improved by using a cyclic redundancy check field. Similarly, the second electronic device or the third device may also determine, according to a requirement, content of the second message to be sent to the first electronic device. This improves flexibility of sending the second message.

In a possible implementation, the data packet header information includes the first identifier.

According to the foregoing method, after receiving the first message, a receiving end (for example, the second electronic device or the third electronic device) may first determine the first identifier included in the data packet header information, to determine whether the first message is a message sent to the receiving end; and parse a remaining field after determining that the first message is a message sent to the receiving end, to avoid unnecessary message processing at the receiving end, and reduce power consumption.

In a possible implementation, before the sending a first message through a first pin, the method further includes: sending a start signal, where the start signal is a high-level signal; and after the sending a first message through a first pin, the method further includes: sending an end signal, where the end signal is a low-level signal; or before the sending a first message through a first pin, the method further includes: sending a start signal, where the start signal is a low-level signal; and after the sending a first message through a first pin, the method further includes: sending an end signal, where the end signal is a high-level signal.

According to the foregoing method, the start signal may be sent, so that the receiving end determines a start of message sending, to improve message receiving efficiency. In addition, the end signal is sent, so that the receiving end determines an end of message sending, to avoid mistaken message receiving at the receiving end, and improve message receiving efficiency.

In a possible implementation, before the receiving a second message through a second pin, the method further includes: receiving a start signal, where the start signal is a high-level signal; and after the receiving a second message through a second pin, the method further includes: receiving an end signal, where the end signal is a low-level signal; or before the receiving a second message through a second pin, the method further includes: receiving a start signal, where the start signal is a low-level signal; and after the receiving a second message through a second pin, the method further includes: receiving an end signal, where the end signal is a high-level signal.

According to the foregoing method, a start of message receiving may be determined by using the received start signal, to improve message receiving efficiency. In addition, an end of message receiving is determined by using the received end signal, to avoid mistaken message receiving and improve message receiving efficiency.

In a possible implementation, a first reset signal is sent through the first pin, where the first reset signal is used to indicate a receiver of the first reset signal to perform reset, and a pulse width of the first reset signal is associated with the receiver.

According to the foregoing method, when it is determined that an exception occurs in data transmission, or another exception occurs, the first reset signal may be sent to the second electronic device or the third electronic device, so that the receiver determines, based on the received first reset signal, that an exception occurs in current data transmission, and can stop a loss in a timely manner, to avoid damage to the device caused by abnormal charging behavior, and improve charging safety. In addition, to distinguish between first reset signals sent to different receivers, pulse widths of the first reset signals may be associated with the receivers, to avoid incorrect reset.

According to a second aspect, this application provides a charging cable-based data transmission method, applied to a second electronic device. The second electronic device is connected to a first electronic device through a third electronic device, the third electronic device includes a first data signal line and a second data signal line, and the method includes: determining a connection to the first electronic device; receiving a first message through a first pin, where the first pin is connected to the first data signal line; and sending a second message through a second pin, where the second pin is connected to the second data signal line, and the first message and the second message are used for charging setting of the first electronic device.

This is different from the conventional technology in which only a D− data signal line can be used for message sending and receiving between the first electronic device and the second electronic device. According to the foregoing method, messages can be sent and received on different data signal lines, so that electronic devices can send messages to peer ends without waiting for sending completion of the peer ends. In addition, compared with a solution in the conventional technology in which the second electronic device can only passively respond when serving as a charging device, in this application, the second electronic device may further actively send a message to the first electronic device or the third electronic device. This effectively improves transmission efficiency of data on a data signal line. Especially, in a scenario in which active report is required when the second electronic device or the third electronic device is abnormal, safety of a charging process can be effectively improved.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

According to the foregoing method, a pin of the positive signal data line (for example, D+) may be set to the first pin, and a pin of the negative signal data line (for example, D−) may be set to the second pin, or a pin of the positive signal data line (for example, D+) may be set to the second pin, and a pin of the negative signal data line (for example, D−) may be set to the first pin, so that signals are independently sent or received on different data lines. This implements duplex transmission on the signal data line. In addition, different duplex transmission manners may be set according to a requirement. This effectively improves data transmission efficiency and data transmission flexibility.

In a possible implementation, the method further includes: receiving detection from the first electronic device through the first pin or the second pin, where the detection is used by the first electronic device to determine that the second electronic device is a dedicated charging port DCP device; and receiving a first pulse signal from the first electronic device through the first pin, sending an electrical signal to the first electronic device through the second pin, and determining to charge a battery of the first electronic device in a fast charging mode.

Considering that a handshake process for a communication protocol is time-consuming in the conventional technology, according to the foregoing method of sending the first pulse signal by the first electronic device, the first electronic device and the second electronic device support a handshake protocol for charging a battery of the first electronic device in a fast charging mode, and the second electronic device can quickly detect the first pulse signal. Therefore, time for entering the fast charging mode is shortened. Especially, when a battery level of the first electronic device is excessively low, the fast charging mode can be quickly entered to improve charging experience.

In a possible implementation, the second pin is the pin connected to the positive signal data line, and the electrical signal is a high-level signal; or the second pin is the pin connected to the negative signal data line, and the electrical signal is a low-level signal.

According to the foregoing method, when the second pin is the pin connected to the positive signal data line, considering that the first electronic device sends the first pulse signal through the first pin, the first pin is a negative signal data line, and is at a low level in an idle state. Therefore, the electrical signal of the second electronic device may be a high-level signal. In this way, the first electronic device can quickly determine, by detecting the high-level pulse signal, that handshake is completed. This further shortens time for entering the fast charging mode.

When the second pin is the pin connected to the negative signal data line, considering that the first electronic device sends the first pulse signal through the first pin, the first pin is a positive signal data line, and is at a high level in an idle state. Therefore, the electrical signal of the second electronic device may be a low-level signal. In this way, the first electronic device can quickly determine, by detecting the low-level signal, that handshake is completed. This further shortens time for entering the fast charging mode.

In a possible implementation, the first message includes a first identifier, the first identifier is used to indicate a receiver of the first message, the second message includes a second identifier, and the second identifier is used to indicate a receiver of the second message.

Considering that the third electronic device may also participate in data transmission, according to the foregoing method, an identifier may be set for a message receiver, to identify the message receiver in a data transmission system, avoid mistaken message processing, and improve message transmission reliability.

In a possible implementation, the receiver of the first message is the second electronic device, and the receiver of the second message is the first electronic device.

In a possible implementation, when the receiver of the first message is a chip of the third electronic device, the second message is not sent to the first electronic device.

According to the foregoing method, a conflict caused because the second electronic device actively sends a message to the first electronic device when the first electronic device and the third electronic device transmit messages can be avoided. This improves message transmission reliability.

In a possible implementation, before the sending a second message through a second pin, the method further includes: sending a start signal, where the start signal is a high-level signal; and after the sending a second message through a second pin, the method further includes: sending an end signal, where the end signal is a low-level signal; or before the sending a second message through a second pin, the method further includes: sending a second signal through the second pin, where a frequency of the second signal is a second frequency, and the second signal is used to indicate that a frequency of the second message is the second frequency.

According to the foregoing method, the second electronic device may send the second signal to the first device, so that the first device determines, by negotiating with the second electronic device, that the frequency at which the first electronic device sends the first signal is the second frequency. In this way, a frequency of a signal for performing data transmission between the first electronic device and the second electronic device can be negotiated and adjusted according to a requirement, to improve data transmission flexibility. In addition, an anti-interference capability of data transmission can be implemented by adjusting a frequency of a signal, to improve data signal transmission reliability and improve data transmission performance.

In a possible implementation, a first signal is received through the first pin, where a frequency of the first signal is a first frequency, and the first signal is used to indicate that a frequency of the first message is the first frequency.

According to the foregoing method, the first electronic device may send the first signal, to negotiate with the second electronic device to determine a frequency for sending the first signal, so that a frequency of a signal for performing data transmission between the first electronic device and the second electronic device can be negotiated and adjusted according to a requirement, to improve data transmission flexibility. In addition, an anti-interference capability of data transmission can be implemented by adjusting a frequency of a signal, to improve data signal transmission reliability and improve data transmission performance.

In a possible implementation, the first message includes at least one data frame, and the data frame is any one of the following: data packet header information, data information, control information, and cyclic redundancy check, where a data frame includes a start field, a data field, and an end field.

According to the foregoing method, the first electronic device can determine, according to a requirement, content of a message to be sent to the second electronic device. This improves flexibility of sending the first message. The start field and the end field of the sent data frame can enable the second electronic device to accurately receive the first message. In addition, data transmission reliability can be improved by using a cyclic redundancy check field. Simi- larly, the second electronic device may also determine, according to a requirement, content of the second message to be sent to the first electronic device. This improves flexibility of sending the second message.

In a possible implementation, before the sending a second message through a second pin, the method further includes: sending a start signal, where the start signal is a high-level signal; and after the sending a second message through a second pin, the method further includes: sending an end signal, where the end signal is a low-level signal; or before the sending a second message through a second pin, the method further includes: sending a start signal, where the start signal is a low-level signal; and after the sending a second message through a second pin, the method further includes: sending an end signal, where the end signal is a high-level signal.

According to the foregoing method, the start signal may be sent, so that the receiving end determines a start of message sending, to improve message receiving efficiency. In addition, the end signal is sent, so that the receiving end determines an end of message sending, to avoid mistaken message receiving at the receiving end, and improve message receiving efficiency.

In a possible implementation, before the receiving a first message through a first pin, the method further includes: receiving a start signal, where the start signal is a high-level signal; and after the receiving a first message through a first pin, the method further includes: receiving an end signal, where the end signal is a low-level signal; or before the receiving a first message through a first pin, the method further includes: receiving a start signal, where the start signal is a low-level signal; and after the receiving a first message through a first pin, the method further includes: receiving an end signal, where the end signal is a high-level signal.

According to the foregoing method, a start of message receiving may be determined by using the received start signal, to improve message receiving efficiency. In addition, an end of message receiving is determined by using the received end signal, to avoid mistaken message receiving and improve message receiving efficiency.

In a possible implementation, the method further includes: receiving a first reset signal through the first pin, where a pulse width of the first reset signal is associated with the second electronic device; and resetting the second electronic device based on the first reset signal.

According to the foregoing method, when determining that an exception occurs in data transmission, or another exception occurs, the first electronic device may send the first reset signal to the second electronic device, so that the second electronic device determines, based on the received first reset signal sent by the first electronic device, that an exception occurs in current data transmission, and can stop a loss in a timely manner, to avoid damage to each electronic device caused by abnormal charging behavior, and improve charging safety.

In a possible implementation, the method further includes: receiving a second reset signal through the first pin, where a pulse width of the second reset signal is associated with the third electronic device; and ignoring the second reset signal.

According to the foregoing method, the first reset signal sent by the first electronic device to another receiver can be distinguished, to avoid that the second electronic device is mistakenly reset based on the second reset signal.

According to a third aspect, this application provides a charging cable-based data transmission method, applied to a third electronic device. The third electronic device is configured to connect a second electronic device to a first electronic device, the third electronic device includes a first data signal line and a second data signal line, and the method includes: receiving a first message through a first pin, where the first pin is connected to the first data signal line; and sending a second message through a second pin, where the second pin is connected to the second data signal line, and the first message and the second message are used for charging setting of the first electronic device.

This is different from the conventional technology in which only a D− data signal line can be used for message sending and receiving between the first electronic device and the second electronic device. According to the foregoing method, messages can be sent and received on different data signal lines, so that electronic devices can send messages to peer ends without waiting for completion of sending by the peer ends. This effectively improves efficiency of transmitting data on the data signal lines. In addition, when the second electronic device servers as a to-be-charged device and the second electronic device servers as a power supply device, compared with the only solution in which the first electronic device actively sends a message to the second electronic device and the second electronic device passively responds to the message in the conventional technology, in this application, the first electronic device may further receive a message actively sent by the second electronic device or the third electronic device, especially in a scenario in which active reporting is required when the second electronic device or the third electronic device is abnormal. This can effectively improve security of a charging process.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

According to the foregoing method, a pin of the positive signal data line (for example, D+) may be set to the first pin, and a pin of the negative signal data line (for example, D−) may be set to the second pin, or a pin of the positive signal data line (for example, D+) may be set to the second pin, and a pin of the negative signal data line (for example, D−) may be set to the first pin, so that signals are independently sent or received on different data lines. This implements duplex transmission on the signal data line. In addition, different duplex transmission manners may be set according to a requirement. This effectively improves data transmission efficiency and data transmission flexibility.

In a possible implementation, the first message includes a first identifier, the first identifier is used to indicate a receiver of the first message, the second message includes a second identifier, and the second identifier is used to indicate a receiver of the second message.

Considering that the third electronic device may also participate in data transmission, for example, in a possible implementation, the receiver of the first message is the third electronic device, and the receiver of the second message is the first electronic device. According to the foregoing method, an identifier may be set for a message receiver, to identify the message receiver in a data transmission system, avoid mistaken message processing, and improve message transmission reliability.

In a possible implementation, when the receiver of the first message is the second electronic device, the second message is not sent to the first electronic device.

According to the foregoing method, a conflict caused because the second electronic device actively sends a message to the first electronic device when the first electronic device and the third electronic device transmit messages can be avoided. This improves message transmission reliability.

In a possible implementation, a first signal is received through the first pin, where a frequency of the first signal is a first frequency, and the first signal is used to indicate that a frequency of the first message is the first frequency.

Before the sending a second message through a second pin, the method further includes: sending a first signal through the second pin, where a frequency of the first signal is a second frequency, and the first signal is used to indicate that a frequency of the first message is the second frequency.

According to the foregoing method, the third electronic device may send the second signal to the first device, so that the first device determines, by negotiating with the third electronic device, that the frequency at which the first electronic device sends the first signal is the second frequency. In this way, a frequency of a signal for performing data transmission between the first electronic device and the third electronic device can be negotiated and adjusted according to a requirement, to improve data transmission flexibility. In addition, an anti-interference capability of data transmission can be implemented by adjusting a frequency of a signal, to improve data signal transmission reliability and improve data transmission performance.

In a possible implementation, the first message includes at least one data frame, and the data frame is any one of the following: data packet header information, data information, control information, and cyclic redundancy check, where a data frame includes a start field, a data field, and an end field.

According to the foregoing method, the first electronic device can determine, according to a requirement, content of a message to be sent to the third electronic device. This improves flexibility of sending the first message. The start field and the end field of the sent data frame can enable the third electronic device to accurately receive the first message. In addition, data transmission reliability can be improved by using a cyclic redundancy check field. Similarly, the third device may also determine, according to a requirement, content of the second message to be sent to the first electronic device. This improves flexibility of sending the second message.

In a possible implementation, before the sending a second message through a second pin, the method further includes: sending a start signal, where the start signal is a high-level signal; and after the sending a second message through a second pin, the method further includes: sending an end signal, where the end signal is a low-level signal; or before the sending a second message through a second pin, the method further includes: sending a start signal, where the start signal is a low-level signal; and after the sending a second message through a second pin, the method further includes: sending an end signal, where the end signal is a high-level signal.

According to the foregoing method, the start signal may be sent, so that the receiving end determines a start of message sending, to improve message receiving efficiency. In addition, the end signal is sent, so that the receiving end determines an end of message sending, to avoid mistaken message receiving at the receiving end, and improve message receiving efficiency.

In a possible implementation, before the receiving a first message through a first pin, the method further includes: receiving a start signal, where the start signal is a high-level signal; and after the receiving a first message through a first pin, the method further includes: receiving an end signal, where the end signal is a low-level signal; or before the receiving a first message through a first pin, the method further includes: receiving a start signal, where the start signal is a low-level signal; and after the receiving a first message through a first pin, the method further includes: receiving an end signal, where the end signal is a high-level signal.

According to the foregoing method, a start of message receiving may be determined by using the received start signal, to improve message receiving efficiency. In addition, an end of message receiving is determined by using the received end signal, to avoid mistaken message receiving and improve message receiving efficiency.

In a possible implementation, the method further includes: receiving a second reset signal through the first pin, where a pulse width of the second reset signal is associated with the third electronic device; and performing reset based on the second reset signal.

According to the foregoing method, when determining that an exception occurs in data transmission, or another exception occurs, the first electronic device may send the second reset signal to the third electronic device, so that the third electronic device determines, based on the received second reset signal, that an exception occurs in current data transmission, and can stop a loss in a timely manner, to avoid damage to each electronic device caused by abnormal charging behavior, and improve charging safety.

In a possible implementation, the method further includes: receiving a first reset signal through the first pin, where a pulse width of the first reset signal is associated with the second electronic device; and ignoring the first reset signal.

According to the foregoing method, the first reset signal sent by the first electronic device to another receiver can be distinguished, to avoid that the third electronic device is mistakenly reset based on the first reset signal.

According to a fourth aspect, this application provides a charging cable-based data transmission method, applied to a first electronic device. The first electronic device is connected to a second electronic device through a third electronic device, the third electronic device includes a first data signal line and a second data signal line, and the method includes: determining that a second pin is in a message receiving state and a first pin is in a message sending state, where the first pin is connected to the first data signal line, and the second pin is connected to the second data signal line; and sending a third message to the third electronic device through the first pin, where the third message is used to obtain configuration information of the third electronic device, or the third message is used by the first electronic device to indicate the third electronic device to switch a receiving/sending state of a pin.

According to the foregoing method, the first electronic device may determine that the second pin is in the message receiving state and the first pin is in the message sending state, to send the third message to the third electronic device through the first pin, so as to enable communication between the first electronic device and the third electronic device. In a communication process, the configuration information of the third electronic device may be obtained by using the sent third message, or the third electronic device may be indicated, based on a requirement, to switch a receiving/sending state of a pin, to schedule and control the receiving/sending state of the pin of the third electronic device, and improve flexibility and performance of communication between the first electronic device and the third electronic device. In addition, a possible conflict between the first electronic device, the second electronic device, and the third electronic device is avoided, and communication performance and communication efficiency during communication between a plurality of devices are improved.

In a possible implementation, the determining that a second pin is in a message receiving state and a first pin is in a message sending state includes: receiving a message from the second electronic device through the second pin, and determining that the second pin is in the message receiving state and the first pin is in the message sending state; or sending a message to the second electronic device through the first pin, and determining that the second pin is in the message receiving state and the first pin is in the message sending state.

According to the foregoing method, it may be determined, by receiving the message from the second electronic device, that the second pin is in the message receiving state and the first pin is in the message sending state; or setting may be performed based on a requirement, and it is determined, by sending the message to the second electronic device through the first pin, that the second pin is in the message receiving state and the first pin is in the message sending state. Flexibility of determining that the second pin is in the message receiving state and the first pin is in the message sending state is improved, to adapt to more scenarios.

In a possible implementation, the method further includes: receiving a third response message from the third electronic device through the second pin, where the third response message is used to indicate the configuration information of the third electronic device.

According to the foregoing method, the configuration information of the third electronic device may be received through the second pin, to complete a communication process between the first electronic device and the third electronic device, and prepare for subsequent normal communication between the first electronic device and the second electronic device.

In a possible implementation, the third message includes a third identifier, and the third identifier is used to indicate that a receiver of the third message is the third electronic device.

According to the foregoing method, when there may be a plurality of receiving manners, the receiver of the third message may be indicated by using the third identifier. This improves directivity of message transmission.

In a possible implementation, the method further includes: sending an indication message to the second electronic device when determining that the configuration information of the third electronic device fails to be received, where the indication message is used to indicate the second electronic device to obtain the configuration information of the third electronic device.

According to the foregoing method, when the first electronic device fails to obtain the configuration information of the third electronic device, the second electronic device may obtain the configuration information of the third electronic device. This improves fault tolerance and robustness of obtaining the configuration information of the third electronic device.

In a possible implementation, the method further includes: receiving a notification message from the second electronic device, where the notification message is used to notify that the second electronic device fails to obtain the configuration information of the third electronic device.

According to the foregoing method, the first electronic device may obtain the configuration information of the third electronic device after the second electronic device fails to obtain the configuration information of the third electronic device.

In a possible implementation, the method further includes: when a fourth message from the second electronic device is received through the second pin, determining that communication with the third electronic device ends.

According to the foregoing method, when it is determined that the fourth message from the second electronic device is received, it may be determined that communication between the first electronic device and the second electronic device starts and communication between the first electronic device and the third electronic device ends, to stop sending a message to or receiving a message from the third electronic device. This avoids a possible conflict between the first electronic device, the second electronic device, and the third electronic device, and improves transmission performance.

In a possible implementation, the method further includes: sending a reset message to the third electronic device through the first pin, where the reset message is used to indicate that the first pin of the third electronic device and the second pin of the third electronic device are in the message receiving state.

According to the foregoing method, the first electronic device may send the reset message to the third electronic device when necessary. For example, the reset message may be sent to the third electronic device when it is determined that communication with the third electronic device ends. In this way, the first pin of the third electronic device and the second pin of the third electronic device are in the message receiving state. This avoids a possible conflict between the first electronic device, the second electronic device, and the third electronic device, and improves transmission performance.

In a possible implementation, the method further includes: determining that the first pin is in the message receiving state and the second pin is in the message sending state; sending a fifth message to the third electronic device through the second pin, where the fifth message is used to obtain the configuration information of the third electronic device; and receiving a fifth response message from the third electronic device through the first pin, where the fifth response message is used to indicate the configuration information of the third electronic device.

According to the foregoing method, after it is determined that the first pin is in the message receiving state and the second pin is in the message sending state, that is, after switching of the receiving/sending state of the pin is determined, the third electronic device may be directly indicated, by sending the fifth message, to switch the receiving/sending state of the pin. In addition, the configuration information of the third electronic device is obtained by using the fifth message. Signaling is effectively reduced, and switching of the receiving/sending state of the pin of the third electronic device is indicated. In another possible scenario, the first electronic device may separately send an indication message through the second pin, to indicate switching of the receiving/sending state of the pin of the third electronic device.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

According to a fifth aspect, this application provides a charging cable-based data transmission method, applied to a second electronic device. The second electronic device is connected to a first electronic device through a third electronic device, the third electronic device includes a first data signal line and a second data signal line, and the method includes: determining that a first pin is in a message receiving state and a second pin is in a message sending state, where the first pin is connected to the first data signal line, and the second pin is connected to the second data signal line; and sending a third message to the third electronic device through the second pin, where the third message is used to obtain configuration information of the third electronic device, or the third message is used by the second electronic device to indicate the third electronic device to switch a receiving/sending state of a pin.

According to the foregoing method, the second electronic device may determine that the first pin is in the message receiving state and the second pin is in the message sending state, to send the third message to the third electronic device through the second pin, so as to enable communication between the second electronic device and the third electronic device. In a communication process, the configuration information of the third electronic device may be obtained by using the sent third message, or the third electronic device may be indicated, based on a requirement, to switch a receiving/sending state of a pin, to schedule and control the receiving/sending state of the pin of the third electronic device, and improve flexibility and performance of communication between the first electronic device and the third electronic device. In addition, a possible conflict between the first electronic device, the second electronic device, and the third electronic device is avoided, and communication performance and communication efficiency during communication between a plurality of devices are improved.

In a possible implementation, the determining that a first pin is in a message receiving state and a second pin is in a message sending state includes: receiving a message from the first electronic device through the first pin, and determining that the first pin is in the message receiving state and the second pin is in the message sending state; or sending a message to the first electronic device through the second pin, and determining that the first pin is in the message receiving state and the second pin is in the message sending state.

According to the foregoing method, it may be determined, by receiving the message from the first electronic device, that the first pin is in the message receiving state and the second pin is in the message sending state; or setting may be performed based on a requirement, and it is determined, by sending the message to the first electronic device through the second pin, that the first pin is in the message receiving state and the second pin is in the message sending state. Flexibility of determining that the first pin is in the message receiving state and the second pin is in the message sending state is improved, to adapt to more scenarios.

In a possible implementation, the method further includes: receiving a third response message from the third electronic device through the first pin, where the third response message is used to indicate the configuration information of the third electronic device.

According to the foregoing method, the configuration information of the third electronic device may be received through the first pin, to complete a communication process between the second electronic device and the third electronic device, and prepare for subsequent normal communication between the first electronic device and the second electronic device.

In a possible implementation, the third message includes a third identifier, and the third identifier is used to indicate that a receiver of the third message is the third electronic device.

According to the foregoing method, when there may be a plurality of receiving manners, the receiver of the third message may be indicated by using the third identifier. This improves directivity of message transmission.

In a possible implementation, the method further includes: sending a notification message to the first electronic device when determining that the configuration information of the third electronic device fails to be received, where the notification message is used to notify that the second electronic device fails to obtain the configuration information of the third electronic device.

According to the foregoing method, when the second electronic device fails to obtain the configuration information of the third electronic device, the first electronic device may obtain the configuration information of the third electronic device. This improves fault tolerance and robustness of obtaining the configuration information of the third electronic device.

In a possible implementation, before the sending a third message to the third electronic device through the first pin, the method further includes: receiving an indication message from the first electronic device through the second pin, where the indication message is used to indicate the second electronic device to obtain the configuration information of the third electronic device.

According to the foregoing method, the second electronic device may be indicated to obtain the configuration information of the third electronic device after the first electronic device fails to obtain the configuration information of the third electronic device. Alternatively, the first electronic device determines, according to a requirement, that the second electronic device is to obtain the configuration information of the third electronic device, to indicate the second electronic device to obtain the configuration information of the third electronic device.

In a possible implementation, the method further includes: when a fourth message from the first electronic device is received through the second pin, determining that communication with the third electronic device ends.

According to the foregoing method, after it is determined that communication between the second electronic device and the third electronic device ends, or after it is determined that communication between the first electronic device and the third electronic device ends, the fourth message may be sent to the first electronic device, to enable communication between the first electronic device and the second electronic device, and stop message receiving/sending with the third electronic device, so as to avoid a possible conflict between the first electronic device, the second electronic device, and the third electronic device, and improve transmission performance.

In a possible implementation, the method further includes: sending a reset message to the third electronic device through the first pin, where the reset message is used to indicate that the first pin of the third electronic device and the second pin of the third electronic device are in the message receiving state.

According to the foregoing method, the second electronic device may send the reset message to the third electronic device when necessary. For example, the reset message may be sent to the third electronic device when it is determined that communication with the third electronic device ends. In this way, the first pin of the third electronic device and the second pin of the third electronic device are in the message receiving state. This avoids a possible conflict between the first electronic device, the second electronic device, and the third electronic device, and improves transmission performance.

In a possible implementation, the method further includes: determining that the second pin is in the message receiving state and the first pin is in the message sending state; sending a fifth message to the third electronic device through the second pin, where the fifth message is used to obtain the configuration information of the third electronic device; and receiving a fifth response message from the third electronic device through the second pin, where the fifth response message is used to indicate the configuration information of the third electronic device.

According to the foregoing method, after it is determined that the second pin is in the message receiving state and the first pin is in the message sending state, that is, after switching of the receiving/sending state of the pin is determined, the third electronic device may be directly indicated, by sending the fifth message, to switch the receiving/sending state of the pin. In addition, the configuration information of the third electronic device is obtained by using the fifth message. Signaling is effectively reduced, and switching of the receiving/sending state of the pin of the third electronic device is indicated. In another possible scenario, the second electronic device may separately send an indication message through the first pin, to indicate switching of the receiving/sending state of the pin of the third electronic device.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

According to a sixth aspect, this application provides a charging cable-based data transmission method, applied to a third electronic device. The third electronic device is configured to connect a second electronic device to a first electronic device, the third electronic device includes a first data signal line and a second data signal line, and the method includes: when receiving a third message through a first pin, setting the first pin to a message receiving state and setting a second pin to a message sending state, where the first pin is connected to the first data signal line, the second pin is connected to the second data signal line, and a receiver of the third message is the third electronic device.

According to the foregoing method, when the third message is received through the first pin, the first pin may be set to the message receiving state, and the second pin may be set to the message sending state, to enable communication between an electronic device corresponding to the third message and the third electronic device. Therefore, scheduling and control of the receiving/sending state of the pin of the third electronic device are implemented by using the received third message, and flexibility and performance of communication between the first electronic device and the third electronic device are improved. In addition, a possible conflict between the first electronic device, the second electronic device, and the third electronic device is avoided, and communication performance and communication efficiency during communication between a plurality of devices are improved.

In a possible implementation, before the receiving a third message through a first pin, the method further includes: setting the first pin and the second pin to the message receiving state.

According to the foregoing method, before communication with the first electronic device or communication with the second electronic device starts, the first pin and the second pin are in the message receiving state. Therefore, the third electronic device can effectively receive a message from the first pin or the second pin, and switch the receiving/sending state of the pin based on the received message, to start communication, and improve efficiency and an effect of communication between the third electronic device and another electronic device.

In a possible implementation, the third message further includes a third identifier, and the third identifier is used to indicate that a receiver of the third message is the third electronic device.

According to the foregoing method, when there may be a plurality of receiving manners, the receiver of the third message may be indicated by using the third identifier. This improves directivity of message transmission.

In a possible implementation, the method further includes:
when receiving a fourth message through the first pin, setting the first pin and the second pin to the message receiving state.

A receiver of the fourth message is the second electronic device or the first electronic device; or the fourth message is used to indicate that the first pin of the third electronic device and the second pin of the third electronic device are in the message receiving state.

According to the foregoing method, the fourth message from the first electronic device or the second electronic device may be received at the same time, so that it is determined, based on the fourth message, that the first pin of the third electronic device and the second pin of the third electronic device are in the message receiving state, to stop a status of actively sending a message to the first electronic device or the second electronic device. After a message from the first electronic device or the second electronic device is received next time, the pin of the third electronic device is adjusted, and a sending function of the third electronic device is enabled. A possible conflict between the first electronic device, the second electronic device, and the third electronic device is avoided, and communication performance and communication efficiency during communication between a plurality of devices are improved.

In a possible implementation, the method further includes:
when receiving a fifth message through the second pin, setting the second pin to the message receiving state and setting the first pin to the message sending state, where a receiver of the fifth message is the third electronic device.

According to the received fifth message, it may be determined to switch the receiving/sending state of the pin, that is, set the second pin to the message receiving state and the first pin to the message sending state.

In a possible implementation, the third message and the fifth message are sent by a same electronic device; or the third message is sent by the second electronic device, and the fifth message is sent by the first electronic device.

In a possible implementation, the third message and the fourth message are used by the first electronic device or the second electronic device to obtain configuration information of the third electronic device; or the third message and the fourth message are used by the first electronic device or the second electronic device to indicate the third electronic device to switch a receiving/sending state of a pin.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

According to a seventh aspect, this application provides a charging cable-based data transmission method, applied to a first electronic device. The first electronic device is connected to a second electronic device through a third electronic device, the third electronic device includes a first data signal line, and the method includes: detecting a connection to the second electronic device; and sending a first message through a first pin; or receiving a second message through the first pin, where the first message and the second message are messages obtained after Manchester coding, the first pin is connected to the first data signal line, and the first message and the second message are used for charging setting of the first electronic device.

According to the foregoing method, the first electronic device may send the first message after Manchester coding, and decode the received second message through Manchester coding, and does not need to send a synchronization clock signal in a message. This avoids a problem that transmission performance is poor and transmission efficiency is low because it is difficult for a receiving end to receive consecutive high-frequency signals in the conventional technology.

In a possible implementation, the first pin is a pin connected to a negative signal data line, or the first pin is a pin connected to a positive signal data line.

According to the foregoing method, the first pin used to transmit the first message and the second message can be flexibly configured, so that data transmission is more flexible.

In a possible implementation, the method further includes: detecting the connection to the second electronic device by using the first pin and a second pin, and determining that the second electronic device is a dedicated charging port DCP device; sending a first pulse signal through the first pin; and detecting an electrical signal of the second electronic device by using the second pin, and determining whether to charge a battery of the first electronic device in a fast charging mode.

Considering that a handshake process for a communication protocol is time-consuming in the conventional technology, according to the foregoing method of sending the first pulse signal, the first electronic device and the second electronic device support a handshake protocol for charging the battery of the first electronic device in the fast charging mode. Therefore, time for entering the fast charging mode is shortened. Especially, when a battery level of the first electronic device is excessively low, the fast charging mode can be quickly entered to improve charging experience.

In a possible implementation, the second pin is a pin connected to a positive signal data line, and the electrical signal is a second pulse signal.

According to the foregoing method, when the second pin is the pin connected to the positive signal data line, considering that the first electronic device sends the first pulse signal through the first pin, the first pin is a negative signal data line, and is at a low level in an idle state. Therefore, the electrical signal of the second electronic device may be the second pulse signal. For example, the second response signal may be a high-level pulse signal. In this way, the first electronic device can quickly determine, by detecting the second response signal, that handshake is completed. This further shortens time for entering the fast charging mode.

In a possible implementation, the second pin is a pin connected to a negative signal data line, and the electrical signal is a low-level signal.

According to the foregoing method, when the second pin is the pin connected to the negative signal data line, considering that the first electronic device sends the first pulse signal through the first pin, the first pin is a positive signal data line, and is at a high level in an idle state. Therefore, the electrical signal of the second electronic device may be a low-level signal, so that the first electronic device can quickly determine, by detecting a first response signal, that handshake is completed. This shortens time for entering the fast charging mode, and reduces handshake complexity.

In a possible implementation, the first message includes a first identifier, the first identifier is used to indicate a receiver of the first message and a sender of the first message, the second message includes a second identifier, the second identifier is used to indicate a receiver of the second message and a sender of the second message, and the receiver of the first message or the sender of the second message is either of the following: the second electronic device and the third electronic device.

Considering that the third electronic device may also participate in data transmission, according to the foregoing method, identifiers may be separately set for a message sender and a message receiver, to identify the message sender and the message receiver in a data transmission system, avoid mistaken message processing, and improve message transmission reliability.

In a possible implementation, a first signal is sent through the first pin, where a frequency of the first signal is a first frequency, and the first signal is used to negotiate that a communication frequency is the first frequency.

According to the foregoing method, the first electronic device may send the first signal, to negotiate with the second electronic device to determine a frequency for sending the first signal, so that a frequency of a signal for performing data transmission between the first electronic device and the second electronic device can be negotiated and adjusted according to a requirement, to improve data transmission flexibility. In addition, an anti-interference capability of data transmission can be implemented by adjusting the frequency of the signal, to improve data signal transmission reliability, and improve data transmission performance.

In a possible implementation, a second signal is received through the first pin, where a frequency of the second signal is a first frequency, and the second signal is used to determine that a communication frequency is the first frequency.

According to the foregoing method, the first electronic device may receive the second signal sent by the second electronic device, to negotiate with the second electronic device to determine that a frequency for sending the first signal is the first frequency.

In a possible implementation, frequencies of the first message and the second message are the first frequency.

According to the foregoing method, it may be specified that the first electronic device sends and receives messages at a same frequency, to reduce data transmission complexity.

In a possible implementation, the first message includes at least one data frame, and the data frame is any one of the following: data packet header information, data information, control information, and cyclic redundancy check, where a data frame includes a start field, a data field, and an end field. Alternatively, the first message includes at least one of the following: at least one data frame and a cyclic redundancy check field, where a data frame includes a start field, an end field, a data packet header field, and a data field.

According to the foregoing method, the first electronic device can determine, according to a requirement, content of a message to be sent to the second electronic device or the third electronic device. This improves flexibility of sending the first message. The start field and the end field of the sent data frame can enable the second electronic device or the third electronic device to accurately receive the first message. In addition, data transmission reliability can be improved by using a cyclic redundancy check field. Similarly, the second electronic device or the third device may also determine, according to a requirement, content of the second message to be sent to the first electronic device. This improves flexibility of sending the second message.

In a possible implementation, after the first message is sent through the first pin, in a first time window, the first data signal line is used by the first electronic device to receive a message.

According to the foregoing method, the first time window may be set after the first electronic device sends the first message. In the first time window, sending permission of the first data signal line may be another electronic device. Therefore, a solution in which the another electronic device actively sends a message is implemented, data transmission flexibility is improved, and a data transmission conflict is avoided.

In a possible implementation, after the second message is received through the first pin, in a second time window, the first data signal line is used by the first electronic device to receive a message.

According to the foregoing method, the second time window may be set after the first electronic device receives the second message. In the second time window, sending permission of the first data signal line may be another electronic device. Therefore, a solution in which the another electronic device actively sends a message is implemented, data transmission flexibility is improved, and a data transmission conflict is avoided.

In a possible implementation, after the second message is received through the first pin, and it is determined that current time exceeds the second time window, the first data signal line is used by the first electronic device to send a message.

According to the foregoing method, the second time window may be set after the first electronic device receives the second message. After the second time window ends, sending permission of the first data signal line returns to the first electronic device. This avoids that the first electronic device cannot actively send a message for a long time, improves data transmission efficiency, and avoids a data transmission conflict.

In a possible implementation, the method further includes: sending a first reset signal through the first pin, where the first reset signal is used to indicate a receiver of the first reset signal to perform reset, and a pulse width of the first reset signal is associated with the receiver.

According to the foregoing method, when determining that an exception occurs in data transmission, or another exception occurs, the first electronic device may send the second reset signal to the third electronic device, so that the third electronic device determines, based on the received second reset signal, that an exception occurs in current data transmission, and can stop a loss in a timely manner, to avoid damage to each electronic device caused by abnormal charging behavior, and improve charging safety. Further, the first reset signal sent by the first electronic device to another receiver can be distinguished, to avoid that the second electronic device or the third electronic device is mistakenly reset based on the first reset signal.

According to an eighth aspect, this application provides a charging cable-based data transmission method, applied to a second electronic device. The second electronic device is connected to a first electronic device through a third electronic device, the third electronic device includes a first data signal line, and the method includes: determining a connection to the first electronic device; and sending a second message through a first pin; or receiving a first message through the first pin, where the first pin is connected to the first data signal line, the first message and the second message are messages obtained after Manchester coding, and the first message and the second message are used for charging setting of the first electronic device.

According to the foregoing method, the second electronic device may send the second message after Manchester coding, and decode the received first message through Manchester coding, and does not need to send a synchronization clock signal in a message. This avoids a problem that transmission performance is poor and transmission efficiency is low because it is difficult for a receiving end to receive consecutive high-frequency signals in the conventional technology.

In a possible implementation, the first pin is a pin connected to a negative signal data line, or the first pin is a pin connected to a positive signal data line.

According to the foregoing method, the first pin used to transmit the first message and the second message can be flexibly configured, so that data transmission is more flexible.

In a possible implementation, the method further includes: receiving detection from the first electronic device through the first pin and a second pin, where the detection is used by the first electronic device to determine that the second electronic device is a dedicated charging port DCP device; receiving a first pulse signal from the first electronic device through the first pin; and sending an electrical signal to the first electronic device through the second pin, and determining whether to charge a battery of the first electronic device in a fast charging mode.

Considering that a handshake process for a communication protocol is time-consuming in the conventional technology, according to the foregoing method of sending the first pulse signal, the first electronic device and the second electronic device support a handshake protocol for charging the battery of the first electronic device in the fast charging mode. Therefore, time for entering the fast charging mode is shortened. Especially, when a battery level of the first electronic device is excessively low, the fast charging mode can be quickly entered to improve charging experience.

In a possible implementation, the second pin is a pin connected to a positive signal data line, and the electrical signal is a second pulse signal; or the second pin is a pin connected to a negative signal data line, and the electrical signal is a low-level signal.

According to the foregoing method, when the second pin is the pin connected to the negative signal data line, considering that the first electronic device sends the first pulse signal through the first pin, the first pin is a positive signal data line, and is at a high level in an idle state. Therefore, the electrical signal of the second electronic device may be a low-level signal, so that the first electronic device can quickly determine, by detecting a first response signal, that handshake is completed. This shortens time for entering the fast charging mode, and reduces handshake complexity.

In a possible implementation, the first message includes a first identifier, the first identifier is used to indicate a receiver of the first message and a sender of the first message, the second message includes a second identifier, the second identifier is used to indicate a receiver of the second message and a sender of the second message, and the sender of the first message or the receiver of the second message is either of the following: the first electronic device and the third electronic device.

Considering that the third electronic device may also participate in data transmission, according to the foregoing method, identifiers may be separately set for a message sender and a message receiver, to identify the message sender and the message receiver in a data transmission system, avoid mistaken message processing, and improve message transmission reliability.

In a possible implementation, a first signal is received through the first pin, where a frequency of the first signal is a first frequency, and the first signal is used to negotiate that a communication frequency is the first frequency.

According to the foregoing method, the first electronic device may send the first signal, to negotiate with the second electronic device to determine a frequency for sending the first signal, so that a frequency of a signal for performing data transmission between the first electronic device and the second electronic device can be negotiated and adjusted according to a requirement, to improve data transmission flexibility. In addition, an anti-interference capability of data transmission can be implemented by adjusting the frequency of the signal, to improve data signal transmission reliability, and improve data transmission performance.

In a possible implementation, a second signal is sent through the first pin, where a frequency of the second signal is a first frequency, and the first signal is used to determine that a communication frequency is the first frequency.

According to the foregoing method, the first electronic device may receive the second signal sent by the second electronic device, to negotiate with the second electronic device to determine that a frequency for sending the first signal is the first frequency.

In a possible implementation, frequencies of the first message and the second message are the first frequency.

According to the foregoing method, it may be specified that the second electronic device sends and receives messages at a same frequency, to reduce data transmission complexity.

In a possible implementation, the first message includes at least one of the following: at least one data frame and a cyclic redundancy check field, where a data frame includes a start field, an end field, a data packet header field, and a data field. Alternatively, the first message includes at least one data frame, where a data frame includes a start field, an end field, and a data field. The data frame is any one of the following: data packet header information, data information, control information, and cyclic redundancy check.

According to the foregoing method, the first electronic device can determine, according to a requirement, content of a message to be sent to the second electronic device. This improves flexibility of sending the first message. The start field and the end field of the sent data frame can enable the second electronic device to accurately receive the first message. In addition, data transmission reliability can be improved by using a cyclic redundancy check field. Similarly, the third device may also determine, according to a requirement, content of the second message to be sent to the first electronic device. This improves flexibility of sending the second message.

In a possible implementation, after the first message is received through the first pin, in a first time window, the first data signal line is used by the second electronic device or the third electronic device to send a message.

According to the foregoing method, the first time window may be set after the first electronic device sends the first message. In the first time window, sending permission of the first data signal line may be the second electronic device or the third electronic device. Therefore, a solution in which the second electronic device or the third electronic device actively sends a message is implemented, data transmission flexibility is improved, and a data transmission conflict is avoided.

In a possible implementation, after the second message is sent through the first pin,
  in a second time window, the first data signal line is used by the second electronic device or the third electronic device to send a message.

According to the foregoing method, the second time window may be set after the first electronic device receives the second message. In the second time window, sending permission of the first data signal line may be another electronic device. Therefore, a solution in which the another electronic device actively sends a message is implemented, data transmission flexibility is improved, and a data transmission conflict is avoided.

In a possible implementation, after the second message is sent through the first pin,
  after it is determined that current time exceeds the second time window, the first data signal line is used by the second electronic device or the third electronic device to receive a message.

According to the foregoing method, the second time window may be set after the first electronic device receives the second message. After the second time window ends, sending permission of the first data signal line returns to the first electronic device. This avoids that the first electronic device cannot actively send a message for a long time, improves data transmission efficiency, and avoids a data transmission conflict.

In a possible implementation, the method further includes: receiving a first reset signal through the first pin, where a pulse width of the first reset signal is associated with the second electronic device; and resetting a charging mode based on the first reset signal.

According to the foregoing method, when determining that an exception occurs in data transmission, or another exception occurs, the first electronic device may send the first reset signal to the second electronic device, so that the second electronic device determines, based on the received first reset signal sent by the first electronic device, that an exception occurs in current data transmission, and can stop a loss in a timely manner, to avoid damage to each electronic device caused by abnormal charging behavior, and improve charging safety.

In a possible implementation, the method further includes: receiving a second reset signal through the first pin, where a pulse width of the second reset signal is associated with the third electronic device; and ignoring the second reset signal.

According to the foregoing method, the first reset signal sent by the first electronic device to another receiver can be distinguished, to avoid that the second electronic device is mistakenly reset based on the second reset signal.

According to a ninth aspect, this application provides a charging cable-based data transmission method, applied to a third electronic device. The third electronic device is configured to connect a second electronic device to a first electronic device, the third electronic device includes a first data signal line, and the method includes: sending a second message through a first pin; or receiving a first message through the first pin, where the first pin is connected to the first data signal line, the first message and the second message are messages obtained after Manchester coding, and the first message and the second message are used for charging setting of the first electronic device.

According to the foregoing method, the third electronic device may send the second message after Manchester coding, and decode the received first message through Manchester coding, and does not need to send a synchronization clock signal in a message. This avoids a problem that transmission performance is poor and transmission efficiency is low because it is difficult for a receiving end to receive consecutive high-frequency signals in the conventional technology.

In a possible implementation, the first pin is a pin connected to a negative signal data line, or the first pin is a pin connected to a positive signal data line.

According to the foregoing method, the first pin used to transmit the first message and the second message can be flexibly configured, so that data transmission is more flexible.

In a possible implementation, the first message includes a first identifier, and the first identifier is used to indicate a receiver of the first message and a sender of the first message.

The second message includes a second identifier, the second identifier is used to indicate a receiver of the second message and a sender of the second message, and the sender of the first message or the receiver of the second message is either of the following: the first electronic device and the third electronic device.

Considering that the third electronic device participates in data transmission, according to the foregoing method, identifiers may be separately set for a message sender and a message receiver, to identify the message sender and the message receiver in a data transmission system, avoid mistaken message processing, and improve message transmission reliability.

In a possible implementation, frequencies of the first message and the second message are the first frequency.

According to the foregoing method, it may be specified that the second electronic device sends and receives messages at a same frequency, to reduce data transmission complexity.

In a possible implementation, the first message includes at least one of the following: at least one data frame and a cyclic redundancy check field, where a data frame includes a start field, an end field, a data packet header field, and a data field. Alternatively, the first message includes at least one data frame, and the data frame is any one of the following: header information, data information, control information, and cyclic redundancy check, where a data frame includes a start field, a data field, and an end field.

According to the foregoing method, the first electronic device can determine, according to a requirement, content of the first message to be sent to the third electronic device. This improves flexibility of sending the first message. The start field and the end field of the sent data frame can enable the second electronic device to accurately receive the first message. In addition, data transmission reliability can be improved by using cyclic redundancy check information. Similarly, the third electronic device may also determine, according to a requirement, content of the second message to be sent to the first electronic device. This improves flexibility of sending the second message.

In a possible implementation, after the first message is received through the first pin, in a first time window, the first data signal line is used by the second electronic device or the third electronic device to send a message.

According to the foregoing method, the first time window may be set after the first electronic device sends the first message. In the first time window, sending permission of the first data signal line may be the second electronic device or the third electronic device. Therefore, a solution in which the second electronic device or the third electronic device actively sends a message is implemented, data transmission flexibility is improved, and a data transmission conflict is avoided.

In a possible implementation, after the second message is sent through the first pin, in a second time window, the first data signal line is used by the second electronic device or the third electronic device to send a message.

According to the foregoing method, the second time window may be set after the first electronic device receives the second message. In the second time window, sending permission of the first data signal line may be the second electronic device or the third electronic device. Therefore, a solution in which the second electronic device or the third electronic device actively sends a message is implemented, data transmission flexibility is improved, and a data transmission conflict is avoided.

In a possible implementation, after the second message is sent through the first pin, and it is determined that current time exceeds the second time window, the first data signal line is used by the third electronic device or the second electronic device to receive a message.

According to the foregoing method, the second time window may be set after the first electronic device receives the second message. After the second time window ends, sending permission of the first data signal line returns to the first electronic device. This avoids that the first electronic device cannot actively send a message for a long time, improves data transmission efficiency, and avoids a data transmission conflict.

In a possible implementation, the method further includes: receiving a second reset signal through the first pin, where a pulse width of the second reset signal is associated with the third electronic device; and resetting a charging mode based on the second reset signal.

According to the foregoing method, when determining that an exception occurs in data transmission, or another exception occurs, the first electronic device may send the second reset signal to the third electronic device, so that the third electronic device determines, based on the received second reset signal sent by the first electronic device, that an exception occurs in current data transmission, and can stop a loss in a timely manner, to avoid damage to each electronic device caused by abnormal charging behavior, and improve charging safety.

In a possible implementation, the method further includes: receiving a first reset signal through the first pin, where a pulse width of the first reset signal is associated with the second electronic device; and ignoring the first reset signal.

According to the foregoing method, the first reset signal sent by the first electronic device to another receiver can be distinguished, to avoid that the third electronic device is mistakenly reset based on the first reset signal.

According to a tenth aspect, this application provides an electronic device, including one or more processors, a memory, and one or more computer programs. The one or more computer programs are stored in the memory, the one or more computer programs include instructions, and when the instructions are executed by the electronic device, the electronic device is enabled to perform the method according to any possible design provided in the first aspect, the fourth aspect, or the seventh aspect of embodiments of this application.

According to an eleventh aspect, this application provides an electronic device, including one or more processors, a memory, and one or more computer programs. The one or more computer programs are stored in the memory, the one or more computer programs include instructions, and when the instructions are executed by the electronic device, the electronic device is enabled to perform the method according to any possible design provided in the second aspect, the fifth aspect, or the eighth aspect of embodiments of this application.

According to a twelfth aspect, this application provides an electronic device, including one or more processors, a memory, and one or more computer programs. The one or more computer programs are stored in the memory, the one or more computer programs include instructions, and when the instructions are executed by the electronic device, the electronic device is enabled to perform the method according to any possible design provided in the third aspect, the sixth aspect, or the ninth aspect of embodiments of this application. Alternatively, the electronic device may not include the memory. For example, the processor may execute instructions stored in an external memory, so that the electronic device performs the method according to any possible design provided in the third aspect, the sixth aspect, or the ninth aspect of embodiments of this application.

According to a thirteenth aspect, an embodiment of this application provides a data transmission system, including the electronic device according to the tenth aspect, the electronic device according to the eleventh aspect, and the electronic device according to the twelfth aspect.

According to a fourteenth aspect, an embodiment of this application provides a computer storage medium. The computer storage medium stores a program, and when the program is run on an electronic device, the electronic device is enabled to perform the method in any possible design of the first aspect to the ninth aspect.

According to a fifteenth aspect, an embodiment of this application provides a computer program product. When the computer program product runs on an electronic device, the electronic device is enabled to perform the method in any possible design of the first aspect to the ninth aspect.

BRIEF DESCRIPTION OF DRAWINGS

FIG. 8d and FIG. 8e each are a schematic diagram of a data structure according to an embodiment of this application;

FIG. 9a is a schematic flowchart of a charging cable-based data transmission method according to an embodiment of this application;

FIG. 11a-1 and FIG. 11a-2 are a schematic flowchart of a charging cable-based data transmission method according to an embodiment of this application;

DESCRIPTION OF EMBODIMENTS

The following further describes this application in detail with reference to the accompanying drawings. A specific operation method in a method embodiment may also be applied to an apparatus embodiment or a system embodiment. It should be noted that in the descriptions of the following embodiments of this application, "at least one" refers to one or more, and "a plurality of" refers to two or more. In view of this, in embodiments of the present disclosure, "a plurality of" may also be understood as "at least two". The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects, unless otherwise specified. In addition, it should be understood that, in descriptions of this application, terms such as "first" and "second" are merely used for distinguishing and description, but should not be understood as an indication or implication of relative importance, or an indication or implication of a sequence.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

With a trend of diversified functions and large screens of intelligent terminals, power consumption of devices gradually increases, and battery capacities gradually increase. As the battery capacities increase, intelligent terminal devices have an increasingly strong demand for fast charging. Therefore, based on the USB channel, a plurality of fast charging protocols have been developed in the industry in recent years, such as USB PD 2.0/3.0, Qualcomm QC 2.0/3.0/4.0, OPPO VOOC, Samsung AFC, MediaTek PE, and Huawei SCP. Currently, commercial charging powers in the market range from 10 W to 65 W. This greatly shortens charging time of terminal devices.

Figure 1A:
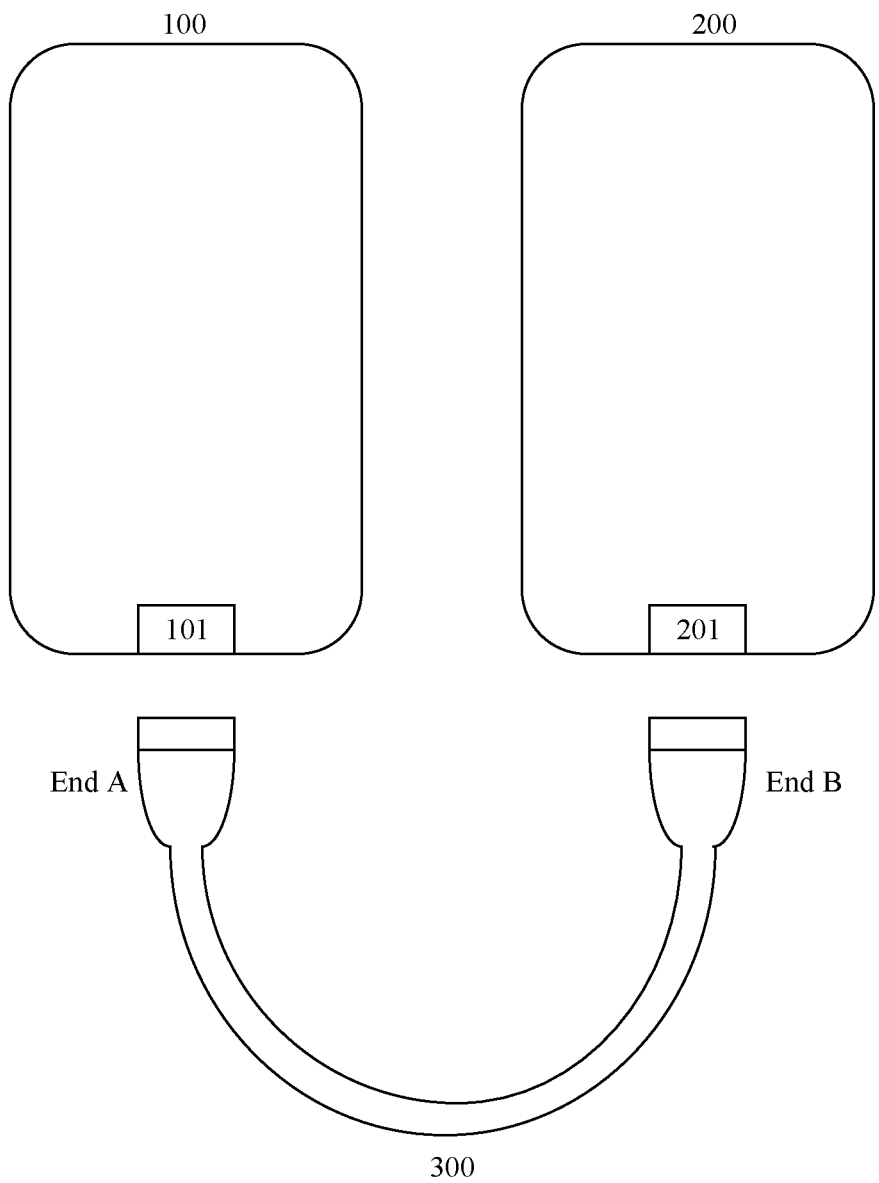
FIG. 1a is a schematic diagram of a structure of a charging system according to an embodiment of this application.
Figure 1B:
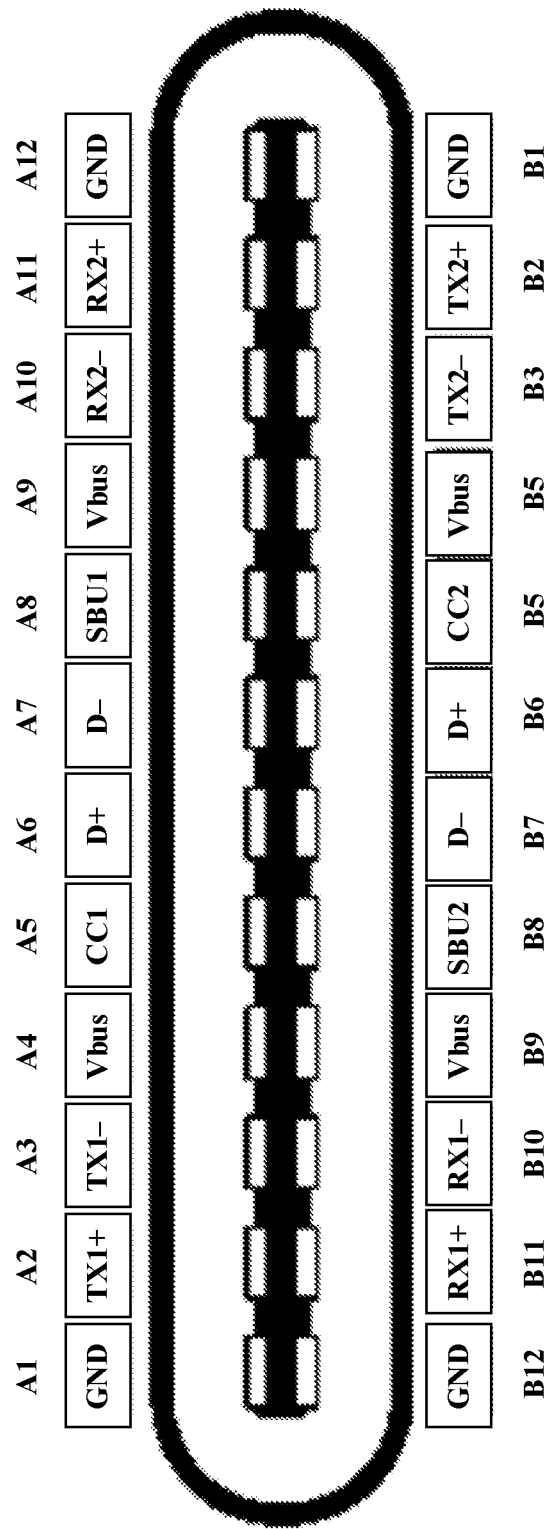
FIG. 1B is a schematic diagram of a structure of a charging port according to an embodiment of this application.

USB is a serial port bus standard, and is also a technical specification of an input/output interface. Currently, USB ports have three physical specifications, which are referred to as USB Type-A, USB Type-B, and USB Type-C. The following uses USB Type-C as an example to describe a pin in a USB port. USB Type-C includes 24 pins. A schematic diagram of the pins of the USB Type-C port is shown in FIG. 1a. It can be learned that USB Type-C includes four pairs of differential transmission line pins configured to implement a TX/RX function. There are two pairs of differential transmission line pins (or differential data pins) configured to send data signals: A2 (TX1+) and A3 (TX1−), and B2 (TX2+) and B3 (TX2−); and two pairs of differential transmission line pins (or differential data pins) configured to receive data signals: B11 (RX1+) and B10 (RX1−), and A11 (RX2+) and A10 (RX2−). For ease of description subsequently, a data signal transmitted by a differential data pin is referred to as a differential data signal. USB Type-C further includes two channel configuration (channel configuration, CC) signal pins used for function negotiation. For example, the pins may be used to determine a device insertion direction: forward insertion or reverse insertion. The pins may be further used to negotiate a power supply function, a replacement mode, or a peripheral mode on the port. The peripheral mode supports transmission of an analog audio or debugging signal through the USB Type-C port. The replacement mode supports transmission of a compressed or lossless video signal through the USB Type-C port, for example, a data signal in a DP protocol. USB Type-C may further include a pin configured to transmit another signal, for example, a pin configured to transmit a sideband use (sideband use, SBU) signal. For details, refer to Table 1.

TABLE 1

| Pin number | Signal | Pin number | Signal | Pin number | Signal |
|---|---|---|---|---|---|
| A1 | Grounding (GND) | A2 | TX1+ | A3 | TX1− |
| A4 | Vbus | A5 | CC1 | A6 | D− |
| A7 | D+ | A8 | SBU1 | A9 | Vbus |
| A10 | RX2− | A11 | RX2+ | A12 | GND |
| B1 | GND | B2 | TX2+ | B3 | TX2− |
| B4 | Vbus | B5 | CC2 | B6 | D+ |
| B7 | D− | B8 | SBU2 | B9 | Vbus |
| B10 | RX1− | B11 | RX1+ | B12 | GND |

TX/RX (TX1, TX2, RX1, and RX2) is a differential data signal of USB 3.1. It should be noted that TX1 is used to represent differential data signals (TX1+/−) transmitted by a pair of differential transmission line terminals, and RX1 is used to represent RX1+/−. Other differential signals are also described in the same manner. In USB 3.1, when an insertion direction of an electronic device using the USB Type-C port is forward insertion, A2, A3, B10, and B11 are used as differential transmission line terminals of data signals in USB 3.1. When an insertion direction of an electronic device is reverse insertion, B2, B3, A10, and A11 are used as differential transmission line terminals of data signals in USB 3.1. Regardless of the forward insertion direction or the reverse insertion direction, two pairs of differential transmission line pins are not used. USB Type-C may be further configured to transmit a digital video port (displayport, DP) signal. In a DP mode, two pairs of unused differential signal line pins in USB 3.1 may be configured to transmit a DP data signal (or referred to as a data signal in a DP protocol). Therefore, the USB Type-C port may be configured to implement USB 3.1+DP signal transmission. In addition, if a receiving end needs only a DP signal and does not need a USB 3.1 signal, the four pairs of differential signal line pins may all be configured to send DP data signals. USB Type-C further includes two pairs of differential transmission line pins (A6 and A7, and B7 and B7) for transmitting a USB 2.0 data signal. The USB 2.0 data signal is D+/D−. A8 and B8 are reserved pins in the USB Type-C port, and are configured to transmit an SBU signal. In different application scenarios, the SBU signal has different functions. For example, the SBU signal may include a control signal or a data signal in the DP protocol. For example, A8 and B8 are used as audio transmission channels or microphone transmission channels, and are configured to transmit audio data or video data. The control signal in the DP protocol may be an auxiliary (auxiliary, AUX) signal. The USB Type-C port further supports a power delivery (power delivery, PD) protocol, that is, has a power supply function. Referring to FIG. 1a, GND is a ground pin, Vbus is a power supply pin, and four ground pins and four power supply pins in the USB Type-C port form four pairs of power supply pins, configured to implement power supply.

The following describes a charging scenario to which this application is applicable. FIG. 1a is a schematic diagram of a system according to this application. In this example, a first electronic device 100 (for example, a to-be-charged electronic device) may be connected to a second electronic device 200 (for example, a power supply device such as a charger, an adapter, or a reverse charging device) through a third electronic device 300 (for example, a USB cable). The first electronic device may be a terminal device. The second electronic device 200 may be any suitable type of charging apparatus, for example, a charger, a travel adapter (TA), a rechargeable electronic device, or a reverse charging device. The first electronic device 100 may include a USB socket (not shown), and the USB socket is physically connected to another USB socket on the second electronic device 200 through the third electronic device 300. Although in this example, the second electronic device 200 includes the USB socket, in another example, the third electronic device 300 may be directly welded to the second electronic device 200, to avoid a need for the USB socket. During operation, when an alternating current (AC) signal (for example, 220 V or 110 V) is received from a wall socket, the second electronic device 200 may convert the received AC signal into a direct current (DC) signal and feed the DC signal to the first electronic device 100. In some implementations, the second electronic device 200 or a computer 120 may support a battery charger communications protocol. The battery charger communications protocol may be used to negotiate a voltage and/or current level between the second electronic device 200 (or the computer 120) and the first electronic device 100.

In a specific charging process, when detecting that the second electronic device (to-be-charged device) is connected to the first electronic device (power supply device) through the third electronic device (for example, a cable) and is powered on, a processor of the first electronic device sends a charging start signal to a charging chip 14 of the first electronic device, to control the charging chip to start charging.

The processor of the first electronic device detects whether the second electronic device is continuously on, and continuously performs a charging step in a process in which the second electronic device is continuously on. Subsequently, in the process in which the second electronic device is continuously on, the charging chip is used to control to charge a battery of the first electronic device, until the battery is fully charged. When the charging step is continuously performed, if it is detected at any time that the second electronic device is disconnected, charging is stopped. When the second electronic device is reconnected subsequently, a circuit is reconnected and a charging starting signal is sent to control the charging chip to start charging, and a subsequent continuous charging step is performed again.

Based on a characteristic of a battery, a process in which the battery is charged from a zero power or a low power to a full power may include several phases, for example, trickle charging (providing a very small charging current for the battery at a low rate in a constant manner), constant-current charging (a charging current being fixed), and constant-voltage charging (a charging voltage being fixed). With development of high-current charging technologies, the constant-current phase may include a plurality of phases, and different currents are used for charging in the phases.

It should be noted that a circuit structure and a charging scenario described in embodiments of this application are intended to describe the technical solutions in embodiments of this application more clearly, and do not constitute limitations to the technical solutions in embodiments of this application.

It should be noted that "connection" in embodiments of this application means that two interfaces are electrically connected, and pins corresponding to each other in the two interfaces are connected in a one-to-one manner. However, a specific connection manner between the two interfaces is not limited in embodiments of this application. For example, the connection may be insertion, docking, or the like. Using insertion as an example, that an interface 1 is connected to an interface 2 may be that the interface 1 is inserted into the interface 2, or may be that the interface 2 is inserted into the interface 1.

Figure 2:
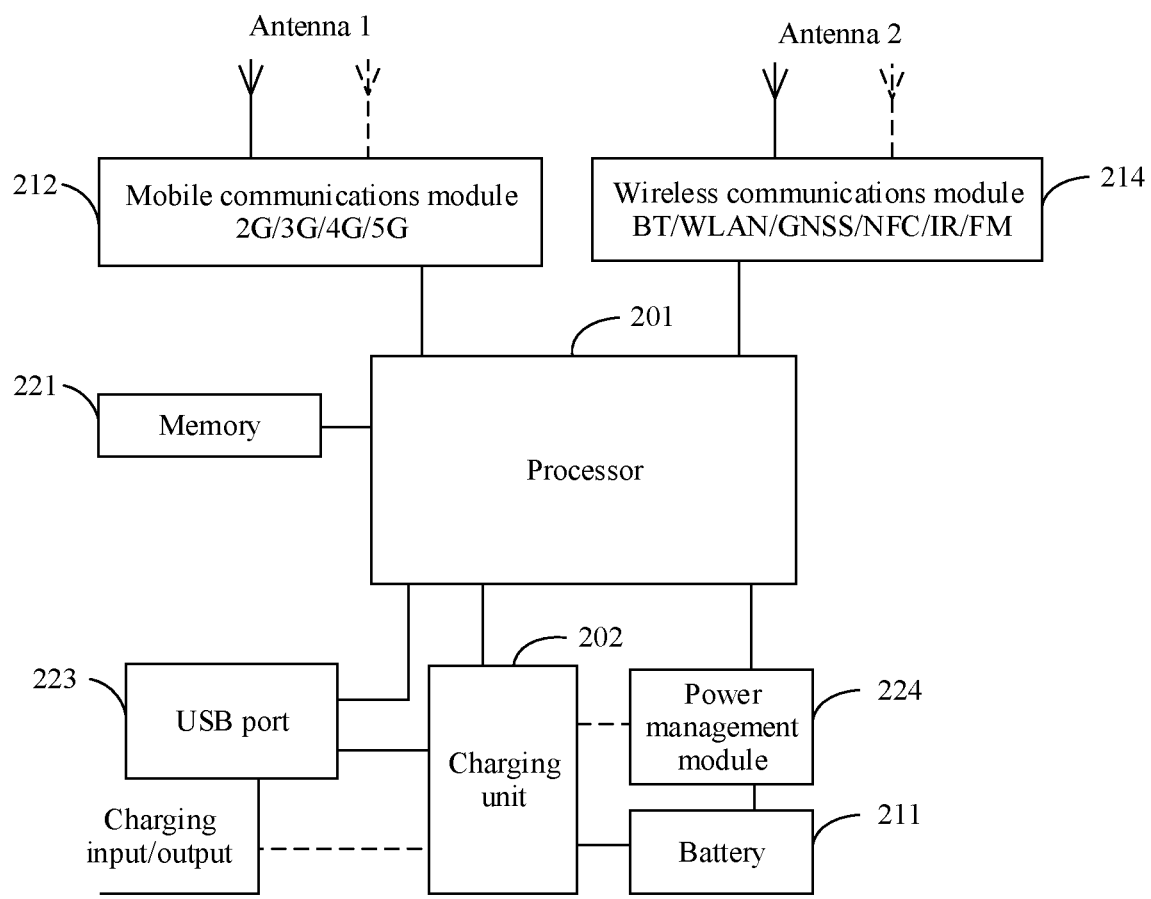
FIG. 2 is a schematic diagram of a structure of an electronic device.

As shown in FIG. 2, the following describes a structure of an electronic device by using the first electronic device as an example. FIG. 2 is a block diagram of an example of the first electronic device 100 according to aspects of the present disclosure. The first electronic device 100 mentioned in embodiments of this application may be various terminal devices having a battery, including but not limited to a mobile phone, a tablet computer, a computer with wireless sending and receiving functions, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The second electronic device provided in embodiments of this application may also be a terminal device having a battery. In this case, the second electronic device not only may be configured to charge the battery inside the electronic device, but also may use the battery as a power supply to supply power to the outside, that is, perform reverse charging. The reverse charging means that an electronic device (for example, a mobile phone or a tablet computer) may charge another electronic device (for example, another mobile phone) in a wired/wireless manner by using electric energy stored in a battery of the electronic device (for example, supply electric energy in a wired or wireless manner). When reverse charging is performed in a wired manner, a device that needs to be charged may be connected through universal serial bus (universal serial bus, USB) on-the-go (on the go, OTG), to implement wired reverse charging.

The terminal device mentioned in embodiments of this application may be a device that provides voice/data connectivity for a user, for example, a handheld device or a vehicle-mounted device with a wireless connection function. Currently, some terminal examples include a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), or the like. This is not limited in embodiments of this application.

Alternatively, the terminal device may be user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communications device, a user agent, a user apparatus, or the like.

By way of example and not limitation, the terminal device in embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an internet of things (internet of things, IoT) system. IoT is an important part of future information technology development. A main technical feature of IoT is connecting things to networks by using communication technologies, to implement an intelligent network for man-machine interconnection and interconnection between things. The terminal device in this application may alternatively be a vehicle-mounted module, a vehicle-mounted component, a vehicle-mounted chip, or a vehicle-mounted unit that is built in a vehicle as one or more components or units. The vehicle may implement a method in this application by using the vehicle-mounted module, the vehicle-mounted component, the vehicle-mounted chip, or the vehicle-mounted unit that is built in the vehicle. Therefore, embodiments of this application may be applied to an internet of vehicles, for example, vehicle-to-everything (vehicle-to-everything, V2X), long term evolution-vehicle (long term evolution-vehicle, LTE-V), and vehicle-to-vehicle (vehicle-to-vehicle, V2V).

The first electronic device 100 may include a processor 201, a charging unit 202, a memory 221, a USB port 223, a power manager integrated circuit (power manager integrated circuit, PMIC) 224, and a battery 211.

The processor 201 may include any suitable type of processing circuit. The processor 201 may include an application processor (application processor, AP), for example, a general-purpose processor (for example, an ARM-based processor, an x86-based processor, or a MIPS-based processor), a field programmable gate array (FPGA), and an application-specific integrated circuit (ASIC), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). In some implementations, the processor 201 may support a computation processing function, a content reproduction function in various formats (for example, audio, image, and video), a graphics engine, and the like. The processor 201 may execute an operating system (OS), various functions, and the like. In some implementations, the processor 201 may be constructed by using one chip, and there are a large quantity of components on the chip. The components may include a logic core, a memory, a display system/controller, a multimedia encoding/decoding codec, a 2D/3D accelerator engine, an image signal processor (ISP), a camera, an audio modem, various high- and low-speed serial/parallel connection interfaces, and the like. In some implementations, the processor 201 may be implemented as a system on a chip (SOC). The SOC may be configured to perform operations such as processing an instruction and processing data in computer software. Different processing units may be independent devices, or may be integrated into one or more processors. The controller may be a nerve center and a command center of the first electronic device 100. The controller may generate an operation control signal based on instruction operation code and a time sequence signal, to complete control of instruction reading and instruction execution. A memory may be further disposed in the processor 201, and is configured to store instructions and data. In some embodiments, the memory in the processor 201 is a cache. The memory may store instructions or data just used or cyclically used by the processor 201. If the processor 201 needs to use the instructions or the data again, the processor 201 may directly invoke the instructions or the data from the memory. This avoids repeated access and reduces a waiting time of the processor 201, so that system efficiency is improved.

The processor 201 may be connected to each module in the first electronic device 100. For example, as shown in FIG. 2, the processor 201 may be connected to the charging unit 202 through an inter-integrated circuit (Inter-Integrated Circuit, I2C) bus. The processor 201 may transmit a control instruction to the charging unit 202 and the like through the I2C bus.

The first electronic device 100 may further include a general-purpose processor, a mobile communications module 212, a wireless communications module (wireless connectivity, WC) 214, a front end module (front end module, FEM), a short-range communications unit, and a radio frequency integrated circuit (radio frequency integrated circuit, RFIC).

The general-purpose processor may be a processor configured to enable voice communication and/or data transmission, and may be a separately disposed processor, or may be integrated with the processor 201. This is not limited herein. The general-purpose processor may be further configured to compress voice data and image data, or may decompress compressed data. A communication processor may include a baseband modem, a baseband processor (BP), or the like. The communication processor may be designed to operate by using one of a global system for mobile communications (Global System for Mobile Communication, GSM) network, an enhanced data GSM environment (Enhanced Data GSM Environment, EDGE) network, a code division multiple access (Code Division Multiple Access, CDMA) network, a W-code division multiple access (W-CDMA) network, a long term evolution (Long Term Evolution, LTE) network, an orthogonal frequency division multiple access (Orthogonal Frequency Division Multiple Access, OFDMA) network, a wireless fidelity (Wireless Fidelity, Wi-Fi) network, a WiMax network, and a Bluetooth network.

The FEM may be configured to control transmission/reception of radio signals and may separately send/receive signals. The FEM may be included in the mobile communications module 212 and the wireless communications module 214, or may be an independent module. The FEM may be configured to filter and amplify a signal, and may include a receiving-side front-end module including a filter configured to filter a received signal and a sending-side front-end module including a power amplifier module (PAM) configured to amplify a to-be-sent signal.

The radio frequency integrated circuit (for example, an RF transceiver) may receive a radio frequency from a base station, and may modulate a received high band into a low band (that is, a baseband) that can be processed in a module (for example, a communication processor).

The short-range communications unit may be implemented by using various communication functions that are not processed by the processor 201, for example, Wi-Fi, Bluetooth, near field communication (NFC), a universal serial bus (USB), or a global positioning system (GPS).

The memory 221 may be configured to store computer-executable program code. The executable program code includes instructions. The processor 201 runs the instructions stored in the memory 221 to perform various function applications of the first electronic device 100 and process data. The memory 221 may include a program storage area and a data storage area. The program storage area may store an operating system, an application required by at least one function, and the like. The data storage area may store data (for example, an image or a video) created during use of the first electronic device 100, and the like. In addition, the memory 221 may include a high-speed random access memory, or may include a nonvolatile memory, for example, at least one magnetic disk storage device, a flash memory, or a universal flash storage (universal flash storage, UFS).

Although not shown, the first electronic device 100 may further include a speaker, a microphone, a camera, a display, a touch panel, a sensor module, an audio module, and the like. The first electronic device 100 may further include a graphics processing unit or an audio processor. The graphics processing unit may perform image information processing, acceleration, signal conversion, screen output, and the like. The audio processor may perform any appropriate type of audio processing.

The sensor module may include a pressure sensor A, a gyro sensor B, a barometric pressure sensor C, a magnetic sensor D, an acceleration sensor E, a distance sensor F, an optical proximity sensor G, a fingerprint sensor H, a temperature sensor J, a touch sensor K, an ambient light sensor L, a bone conduction sensor M, and the like.

The touch sensor K is also referred to as a "touch panel". The touch sensor K may be disposed on the display. The touch sensor K and the display form a touchscreen, which is also referred to as a "touch screen". The touch sensor K is configured to detect a touch operation performed on or near the touch sensor K. The touch sensor may transfer the detected touch operation to the application processor, to determine a type of a touch event. The display may provide a visual output related to the touch operation. In some other embodiments, the touch sensor K may alternatively be disposed on a surface of the first electronic device 100 at a location different from that of the display.

The display is configured to display a display interface of an application on the first electronic device 100, for example, a framing interface of a camera or a chat interface of WeChat, and may further display an image, a video, and the like in Gallery. The display includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini LED, a micro LED, a micro OLED, a quantum dot light-emitting diode (quantum dot light-emitting diodes, QLED), or the like. In some embodiments, the first electronic device 100 may include one or N displays, where N is a positive integer greater than 1.

The camera is configured to capture a static image, a moving image, or a video. In some embodiments, there may be at least two cameras in the first electronic device 100. For example, there are two cameras, one camera is a front-facing camera, and the other camera is a rear-facing camera. The camera may include photosensitive elements such as a lens group and an image sensor. The lens group includes a plurality of lenses (convex lenses or concave lenses), and is configured to: collect an optical signal reflected by a to-be-photographed object (for example, a user face or scenery), and transfer the collected optical signal to the image sensor. The image sensor generates an image of the to-be-photographed object based on the optical signal.

In addition, the first electronic device 100 may implement audio functions such as music playing and recording through the audio module, a speaker A, a receiver B, a microphone C, a headset jack D, the application processor, and the like. The first electronic device 100 may receive key input, and generate key signal input related to a user setting and function control of the first electronic device 100. The first electronic device 100 may generate a vibration prompt (for example, an incoming call vibration prompt) by using a motor. An indicator in the first electronic device 100 may be an indicator light, and may be configured to indicate a charging status and a power change, or may be configured to indicate a message, a missed call, a notification, and the like. A SIM card interface in the first electronic device 100 is configured to connect to a SIM card. The SIM card may be inserted into the SIM card interface or removed from the SIM card interface, to implement contact with and separation from the first electronic device 100.

It may be understood that the structure shown in this embodiment of the present disclosure does not constitute a specific limitation on the first electronic device 100. In some other embodiments of this application, the first electronic device 100 may include more or fewer components than those shown in the figure, combine some components, split some components, or have different component arrangements. The components shown in the figure may be implemented in hardware, software, or a combination of software and hardware.

The power management module 224 may be configured to adjust a power of the battery 211. For example, the processor 201 may send information to the power management module 224, and the information may be, for example, to-be-processed load. The power management module 224 may adjust, by using the information provided by the processor 201, a core voltage to be supplied to the processor 201.

The charging unit 202 may charge the battery 211. In some embodiments, the charging unit 202 may generate a signal used to charge the battery 211. In some embodiments, the charging unit 202 may adjust (or regulate in another manner) a voltage or a current fed to the battery. In addition or alternatively, the charging unit 202 may perform a constant-current charging operation and a constant-voltage charging operation. The charging unit 202 may include an external port that can be electrically connected to an external device (for example, a travel adapter (TA) or a computer). When wired charging needs to be performed, for example, when the processor 201 detects that a charging port is connected to an external charger, the processor 201 sends a wired charging control instruction to the charging unit 202, to instruct the charging unit 202 to convert a voltage input from the charging port into a charging voltage for charging the battery. When wired reverse charging needs to be performed, for example, when the processor 201 detects a wired reverse charging request sent by an external device connected to the charging port, the processor 201 sends a wired reverse charging control instruction to the charging unit 202, to instruct the charging unit 202 to convert a voltage provided by the battery into a charging voltage for charging the device connected to the charging port.

The external port may be a USB port having a fast charging port function.

An example in which the fast charging port works by using a USB port and a cable is used for description. For example, the fast charging port may be a standard a USB port of a TA connected to a micro-B or micro-AB USB socket (that is, a socket). In addition, the second electronic device 200 may be a device with a dedicated charging port (DCP).

When a DCP is detected, fast charging detection may be started, and fast charging communication is established after the detection is completed. The first electronic device 100 and the second electronic device 200 determine that a fast charging communication link can be established, so that the first electronic device 100 and the second electronic device 200 can communicate in a fast charging communication manner. If the communication link is disconnected, ports on the first electronic device 100 and the second electronic device 200 each may be restored to a corresponding default value, for example, a common charging communication manner.

The fast charging port may include a physical layer. The physical layer allows bidirectional transmission of a data packet through D− or D+. In embodiments of this application, for the first electronic device 100, the second electronic device 200, and the third electronic device 300, data may be received by using D+ or D−, or data may be sent by using D+ or D−. Therefore, for any two of the first electronic device 100, the second electronic device 200, and the third electronic device 300, data sending and data receiving may be independent of each other, so that bidirectional communication between electronic devices is formed. Alternatively, data may be sent and received by using only a D− line, or data may be sent and received by using only a D+ line. In a data transmission process of the first electronic device 100, the second electronic device 200, and the third electronic device 300, a plurality of fields may be sent or received by using the physical layer. Further, in a data transmission process, the data may further include a check field, so that accuracy of a data packet can be improved.

In various example embodiments of this application, a to-be-charged electronic device may be referred to as a primary device. In embodiments of this application, the primary device may be the first electronic device 100. In some embodiments, the primary device may be a leader and a power receiver in a communications protocol, for example, may be a terminal device. As a primary device, the terminal device plays a leading role in a communication process, and may send an instruction and data by using D+ or D−.

An electronic device that provides a charging service may be referred to as a secondary device. In embodiments of this application, the secondary device may be the second electronic device 200 and the third electronic device 300. In some embodiments, the secondary device may be an electronic identification cable or a power supply device, and perform a corresponding operation after receiving information sent by the primary device. For example, the terminal sends a voltage adjustment instruction to the power supply device. After receiving the voltage adjustment instruction, the power supply device performs a voltage adjustment operation according to the voltage adjustment instruction. For another example, the terminal sends a cable current capability reading instruction to the cable, and the cable returns current capability information.

Optionally, secondary devices may be further classified into a main secondary device and an auxiliary secondary device. In some embodiments, the main secondary device may be an electronic device of a power output party in a data transmission system, for example, a power supply device such as a charger or an adapter, and needs to complete identification detection with the primary device to perform communication, so as to provide a power output for the first electronic device. In some embodiments, the auxiliary secondary device may be an electronic device that has no power output behavior in the data transmission system, for example, the third electronic device in embodiments of this application. The third electronic device may be a cable with a special identifier, and does not need to provide a power output for the first electronic device. In some embodiments, there is only one primary device and one main secondary device, and a plurality of auxiliary secondary devices may be supported. When sending information, the primary device specifies an information receiver, and another non-specified receiver does not respond to the current information.

A fast charging protocol layer defines a corresponding negotiation manner for an instruction transmitted from the primary device. For example, to set a communication frequency for data transmission between the primary device and the secondary device, the primary device may send an electrical signal at a corresponding communication frequency to the secondary device, so that the second electronic device 200 returns a same communication frequency as a response. If data transmission at the communication frequency cannot be supported, transmission of all possible communication frequencies of the secondary device may be attempted, so that the primary device and the secondary device can select an appropriate communication frequency.

The fast charging protocol layer may further define a corresponding field for an instruction transmitted from the primary device. For a specific implementation, refer to the following embodiment.

Figure 3:
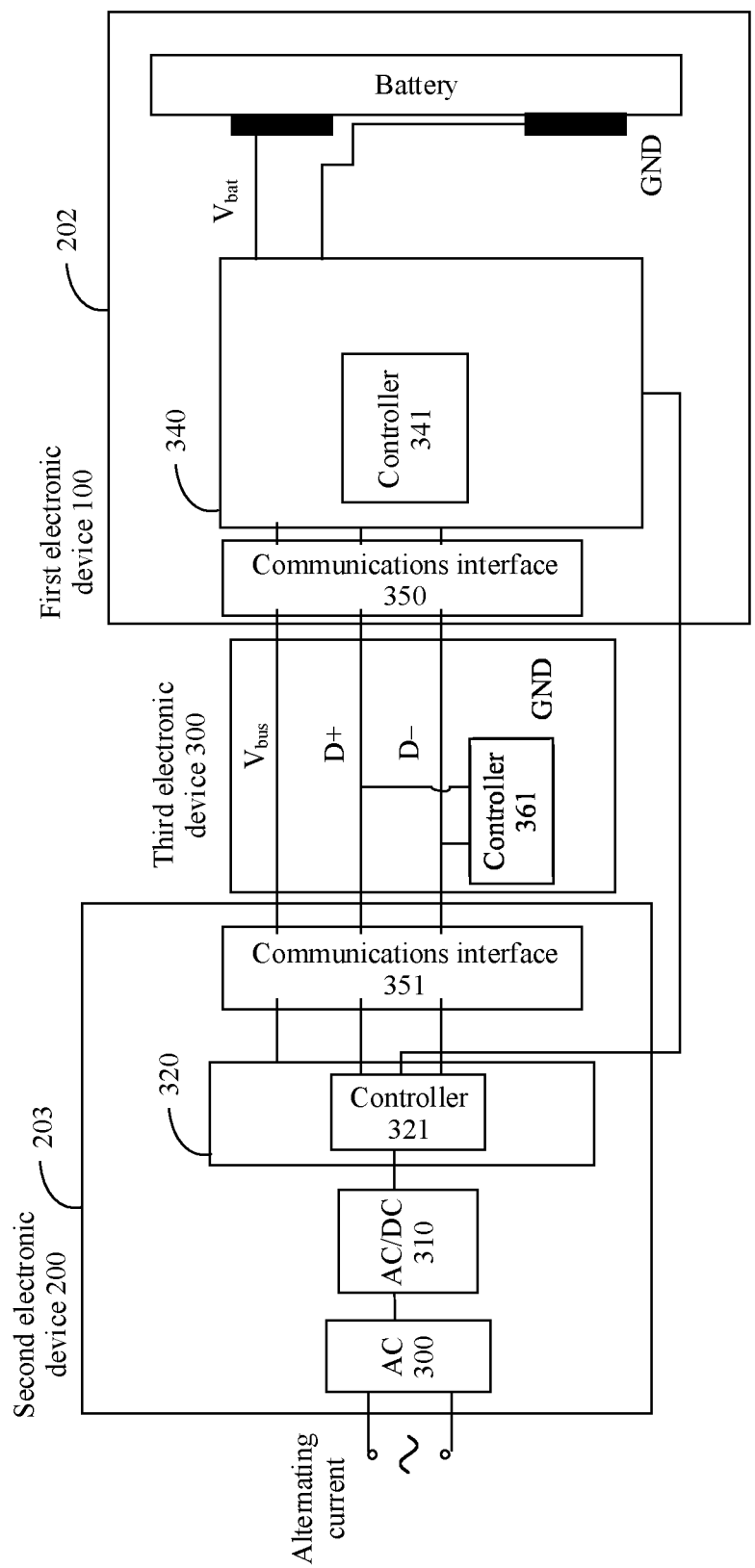
FIG. 3 is a schematic diagram of a structure of a charging system according to an embodiment of this application.

The following further discusses the charging unit 202 according to FIG. 3. FIG. 3 is a schematic diagram of a connection between the charging unit 202 of the first electronic device 100 and the second electronic device 200 according to this application. In this example, the second electronic device 200 is a charging apparatus, and the charging apparatus may be a charger, or may be a computer and/or any other type of battery charger.

As shown in FIG. 3, the second electronic device 200 may include an alternating current power input unit 300, an AC/DC conversion unit 310, a fast charging unit 320, and a communications interface 351. The communications interface 351 may be a USB port and/or any other type of port. In a charging process, the input unit 300 may receive an AC signal from a power socket and feed the AC signal to the AC/DC conversion unit 310. The AC/DC conversion unit 310 may convert the AC signal into a DC signal. The AC/DC conversion unit 310 may then feed the DC signal to the fast charging unit 320. The communications interface corresponds to four lines corresponding to the USB port 223, and the four lines include a VBUS line, a D− line, a D+ line, and a GND line. The VBUS line and the GND line may be configured to provide a power supply voltage. The D− line and the D+ line may be used for data transmission between electronic devices.

In a possible implementation, the fast charging unit 320 may include a controller 321 and a switch. The controller 321 may be a protocol chip of a power supply end. It should be noted that the controller 321 may alternatively control a power supply circuit and a communications line in another manner, and only the switch is used as an example for description herein.

In some embodiments, under control of the USB controller 321, a USB voltage may supply power to the first electronic device 100 through the VBUS line and the GND line. For example, the GND line may be connected to a ground line (GND) of the charging unit 203 in the second electronic device 200. In some embodiments, the controller 321 may be configured to control the switch, for example, may short-circuit the D− line and the D+ line during protocol handshake. In some other embodiments, the controller 321 may control the switch to receive or send an electrical signal of data through a communications line.

The charging unit 202 in the first electronic device 100 may include a communications interface 350, a fast charging unit 340, and a charging circuit (as shown in FIG. 3). The communications interface 350 may be a USB port and/or any other type of port.

In a possible implementation, the fast charging unit 340 may include a controller 341 and a switch. It should be noted that the controller 341 may alternatively control a power supply circuit and a communications line in another manner, and only the switch is used as an example for description herein. The controller 341 may be a protocol chip of a to-be-charged end.

In some embodiments, the controller 341 may provide a signal received by using the Vbus line for the charging circuit. The charging circuit may generate one of a fixed-voltage signal and a fixed-current signal based on the received signal, and feed the generated signal to the battery 211. To prevent an overvoltage or an overcurrent from flowing into the charging circuit, a protection circuit may be connected before the charging circuit. For example, the protection circuit may perform over voltage protection (over voltage protection, OVP). According to various aspects of this application, OVP may be implemented by using a switched capacitor. In some embodiments, the protection circuit may be located between the fast charging unit 202 and the charging circuit. In some other embodiments, the protection circuit may be disposed between the communications interface 350 and the fast charging unit 202.

In some embodiments, the controller 341 may further control the switch to specify whether to transmit received data to the processor 201 through the D− line or the D+ line, so as to implement communication between the controller 341 of the second electronic device 200 and the first electronic device 100.

The third electronic device may include a controller 361. The controller 361 may be configured to record related information of the cable, for example, a communications protocol that can be supported, a charging current that can be supported, and a charging voltage that can be supported. In addition, other identification information of the cable may be further recorded, and is used by the first electronic device or the second electronic device to verify the third electronic device or obtain capability information of the third electronic device. In some other embodiments, the controller 361 may be further configured to control the D− line and the D+ line used for receiving and sending data. For example, the controller may be configured to control the third electronic device to receive data through the D− line and send data through the D+ line. Alternatively, the controller may be configured to control the third electronic device to receive data through the D+ line and send data through the D− line. Alternatively, the controller may be configured to determine, according to a received instruction, the D− line and the D+ line used for receiving and sending data.

Communications lines are the D− line and the D+ line. There may be a plurality of manners of transmitting data between electronic devices through the D+ line and the D− line. The following uses a manner 1 to a manner 4 as an example to describe manners of receiving and sending data between the first electronic device 100 and the second electronic device 200.

Manner 1: The D− line may be used to receive and send data between the first electronic device 100 and the second electronic device 200. The D+ line may be used to send a signal indicating whether the first electronic device 100 and the second electronic device 200 are connected.

Manner 2: The D+ line may be used to receive and send data between the first electronic device 100 and the second electronic device 200. The D− line may be used to send a signal indicating whether the first electronic device 100 and the second electronic device 200 are connected.

Manner 3: The D− line may be used by the first electronic device 100 to send data to the second electronic device 200. The D+ line may be used by the first electronic device 100 to receive data sent by the second electronic device 200.

Manner 4: The D+ line may be used by the first electronic device 100 to send data to the second electronic device 200. The D− line may be used by the first electronic device 100 to receive data sent by the second electronic device 200.

For example, a characteristic of the DC signal may be determined by using communication data between the second electronic device 200 and the first electronic device 100. The characteristic may include a voltage, a current level, and/or any other suitable type of characteristic. For example, the first electronic device 100 may send input voltage-current indication information to the second electronic device 200. The fast charging port 320 of the second electronic device 200 may send output voltage-current indication information to the first electronic device 100, and output selected voltage-current indication information to the charging unit 202. The indication information may be transmitted by using a USB port connected to the charging unit 202.

Figure 4A:
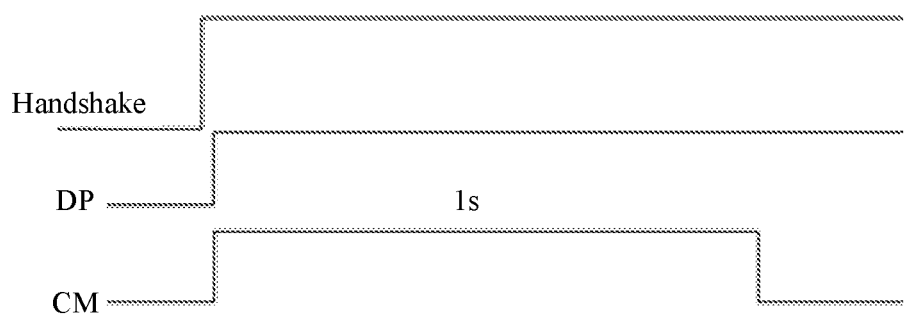
FIG. 4a is a schematic diagram of a time sequence of handshaking in the conventional technology.
Figure 4B:
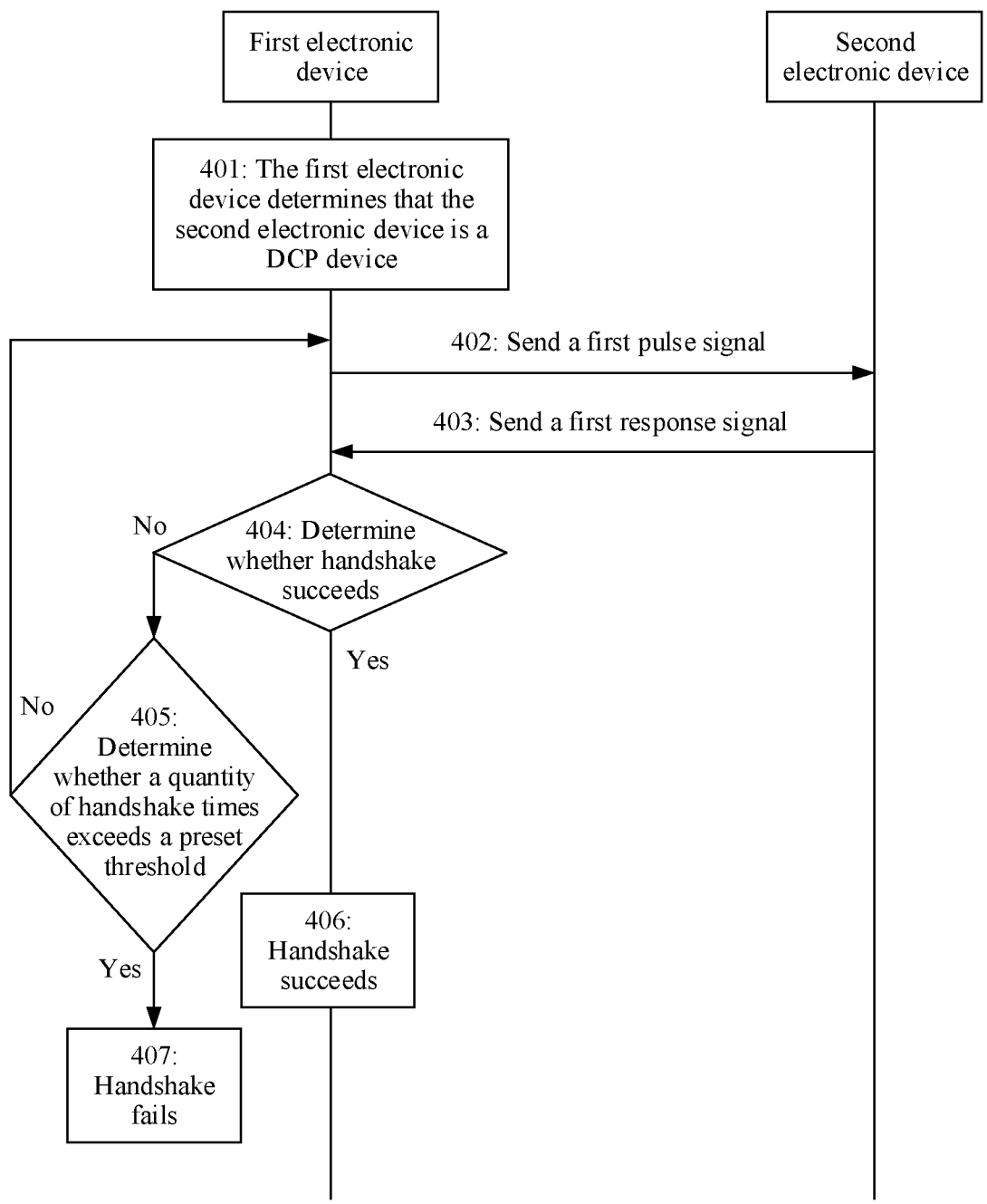
FIG. 4b is a schematic flowchart of a protocol handshaking method according to an embodiment of this application.

Considering that a handshake process of a communications protocol in the conventional technology takes a relatively long time, for example, as shown in FIG. 4a, handshake of the communications protocol requires a first electronic device to send a high level (for example, a handshake signal on a DP port or a DM port shown in FIG. 4a) that lasts 1 s to a second electronic device, after detecting the high level of 1s, the second electronic device determines to use a communications protocol corresponding to fast charging. This application provides a handshake method for a communications protocol. FIG. 4b is a schematic diagram of a handshake method for a communications protocol according to this application. A charging cable-based data transmission method provided in this application may be prepared by performing handshake between a first electronic device and a second electronic device for the communications protocol provided in this application. In this embodiment, an example in which the first electronic device is a to-be-charged device, the second electronic device is a power supply device, and a third electronic device is a charging cable is used for description. The handshake method may specifically include the following steps.

Step 401: After establishing a physical connection to the second electronic device by using the third electronic device, the first electronic device determines that the second electronic device is a DCP device.

In some embodiments, the first electronic device and the second electronic device may perform detection of the USB BC 1.2 protocol, to determine that the second electronic device is a DCP device. Considering that the DCP device can better support a fast charging mode, after detection of the USB BC 1.2 protocol, a fast charging process in this application can be performed based on the DCP device, to better implement fast charging on the first electronic device. The following briefly describes steps of USB BC 1.2 detection.

Step 4011: The first electronic device detects whether a Vbus line is connected.

Step 4012: The first electronic device starts a timer, and determines whether data contact detect (data contact detect, DCD) is supported.

When the first electronic device is connected to a common USB port (an SDP device) or a USB port supporting a high current (a CDP device), a next step is immediately performed without waiting for expiration of the timer. When the first electronic device does not support DCD, a next step is performed after the timer expires.

Step 4013: The first electronic device initiates first detection.

The first electronic device applies a voltage VDP_SRC to D+, and the first electronic device starts to detect a voltage on D−.

The voltage VDP_SRC can enable a voltage range on the D+ line to be 0.5 to 0.7 v.

When the voltage detected by the first electronic device on the D− line is greater than VDAT_REF (that is, a voltage range 0.25 to 0.4 v measured on the D− line), it is determined that the second electronic device is a DCP device (during the first detection, the D+ line and the D− line are short-circuited by using a controller of the DCP device) or a CDP device (during the first detection, the D+ line and the D− line are short-circuited by using a controller of the CDP device).

Step 4014: The first electronic device performs second detection, to determine whether the second electronic device is a DCP device.

The first electronic device applies a voltage VDM_SRC (0.5 to 0.7 v) to the D− line, and then detects a voltage on the D+ line.

When the voltage on the D+ line is greater than VDAT_REF (a voltage range 0.25 to 0.4 v measured on the D+ line), it is determined that the second electronic device is a DCP device.

In some embodiments, the DCP device short-circuits the D+ line and the D− line during the first detection and the second detection. In some other embodiments, the second electronic device is a power supply device that supports only BC 1.2, and the D+ line and the D− line may be short-circuited by directly using a resistor in the second electronic device.

After it is determined that the second electronic device is the DCP device, the first electronic device and the second electronic device enable protocol handshake detection, to detect whether the peer party supports a data transmission protocol in this application, so that the communications protocol in this application can be better compatible with the third electronic device and the second electronic device having USB ports.

Step 402: The first electronic device sends a first pulse signal to the second electronic device through a communications line (the D+ line or the D− line).

Manner a1: The first electronic device sends a first pulse on the D+ line.

The first pulse may be implemented in a plurality of manners. For example, the first pulse may be a pulse signal shown in (a) in FIG. 4c, where duration of a high level is Tdet1 and Tdet3, a voltage value of the high level may be 3.3 V, and duration of a low level may be Tdet2. In some embodiments, Tdet1, Tdet2, and Tdet3 may be the same, and are all 1 ms; or may be set to different time, and may be set according to a time requirement. This is not limited herein.

For example, when t=0 ms, the first electronic device enables a pull-up resistor RP, so that a high level is generated on the D+ line. Using Tdet1=Tdet2=Tdet3=1 ms as an example, when t=1 to 2 ms, the first electronic device pulls down a voltage on the D+ line, and after t=2 ms, the first electronic device restores the high level on the D+ line, so that the first pulse of t=0 to 3 ms is generated. In this way, the first electronic device sends the first pulse and the second electronic device detects the first pulse.

Manner a2: The first electronic device sends a first pulse on the D− line.

The first pulse may be implemented in a plurality of manners. For example, the first pulse may be a pulse signal shown in (a) in FIG. 4d, where duration of a low level is Tdet1 and Tdet3, a voltage value of the low level may be −3.3 V, and duration of a high level may be Tdet2. In some embodiments, Tdet1, Tdet2, and Tdet3 may be the same, and are all 1 ms; or may be set to different time, and may be set according to a time requirement. This is not limited herein.

For example, when t=0 ms, the first electronic device enables a pull-down resistor, so that a low level (for example, −3.3 V) is generated on the D− line. Using Tdet1=Tdet2=Tdet3=1 ms as an example, when t=1 to 2 ms, the first electronic device pulls up a voltage (for example, a voltage value is 0 V) on the D+ line, and after t=2 ms, the first electronic device restores the low level (for example, −3.3 V) on the D+ line, so that the first pulse of t=0 to 3 ms is generated. In this way, the first electronic device sends the first pulse and the second electronic device detects the first pulse.

Step 403: After detecting the first pulse, the second electronic device disconnects the D+ line and the D− line, and sends a first response signal through the communications line.

Figure 4C:
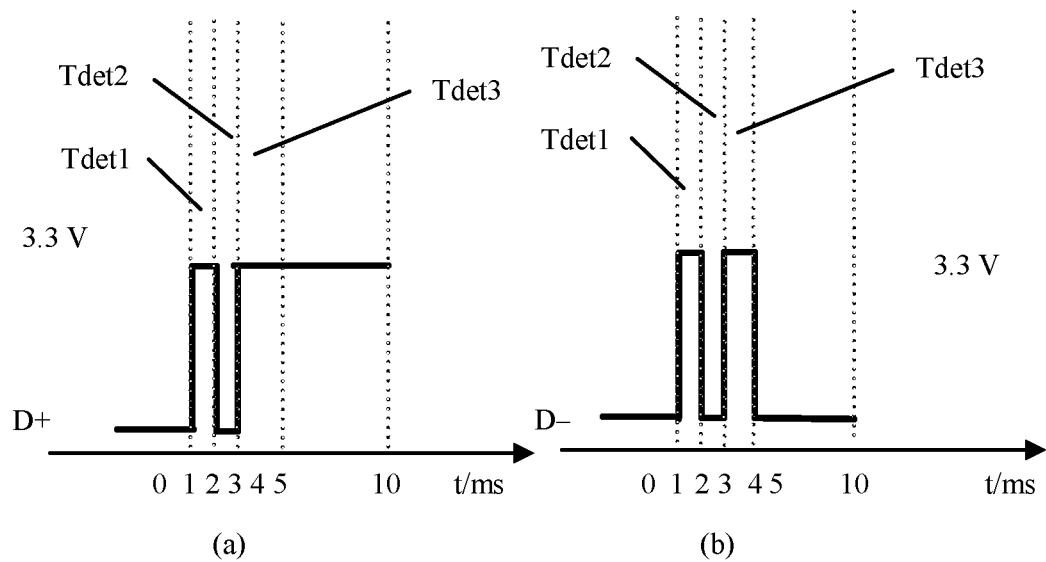
FIG. 4c and FIG. 4d are schematic diagrams of protocol handshaking according to an embodiment of this application.

With reference to the manner a1, the first response signal may be a high-level signal, as shown in (b) in FIG. 4c. In some embodiments, when the second electronic device detects the first pulse, because the D+ line and the D− line are in a short-circuited state, the first pulse may also be detected on the D− line. After detecting the first pulse, the second electronic device may disconnect the D+ line and the D− line, and pull down the D− line to a grounded state as a response signal sent by the second electronic device to the first electronic device, so that the first electronic device detects the response signal based on the D− line, to determine that handshake succeeds.

In some other embodiments, the first response signal may be a high-level pulse signal, and duration in which the second electronic device pulls down the D− line to the grounded state may be Tdet5. For example, duration of Tdet5 is 1 ms. Therefore, the first electronic device can determine, through detection within only duration of Tdet5, whether handshake succeeds. This improves detection efficiency.

With reference to the example of the manner a1 in step 402, the second electronic device may detect the first pulse when t=0 to 3 ms. After the second electronic device detects the first pulse, for example, when t=3 to 4 ms, a line between the D+ line and the D− line is disconnected, and the D− line is pulled down, so that after t=4 ms, a level on the D− line is a low level.

Figure 4D:
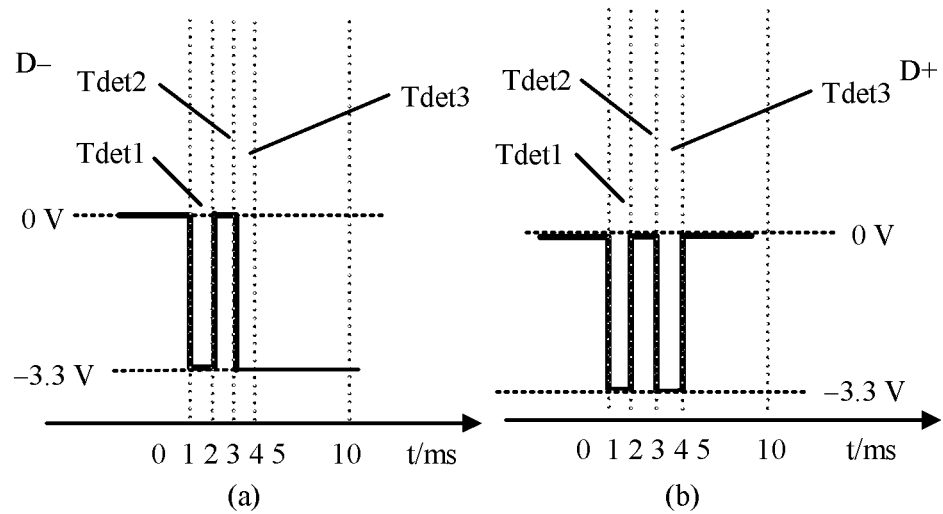

With reference to the manner a2, the first response signal may be a low-level signal, as shown in (b) in FIG. 4d. In some embodiments, after detecting the first pulse, the second electronic device may disconnect the D+ line and the D− line, and pull down the D+ line to a grounded state as a response signal sent by the second electronic device to the first electronic device, so that the first electronic device determines that handshake succeeds.

In some other embodiments, the first response signal may be a low-level pulse signal, and duration in which the second electronic device pulls up the D+ line to the grounded state may be Tdet5. Therefore, the first electronic device can determine, through detection within only duration of Tdet5, whether handshake succeeds. This improves detection efficiency.

With reference to the example of the manner a2 in step 402, after the second electronic device detects the first pulse, for example, when t=3 to 4 ms, a line between the D+ line and the D− line is disconnected, and the D+ line is pulled down, so that after t=4 ms, a level on the D+ line is a low level.

Step 404: The first electronic device detects a response signal on the communications line, determines whether handshake succeeds, and performs step 406 if handshake succeeds, or performs step 405 if handshake fails.

With reference to the manner a1, in some embodiments, when detecting that D− is at a low level, the first electronic device may determine that protocol handshake succeeds. In some other embodiments, if the first electronic device detects that D− is at a low level, and duration of the low level is Tdet5, it may be determined that protocol handshake succeeds. This improves detection efficiency. With reference to the example of the manner a1 in step 402, when t=2 ms, the first electronic device starts low level detection on the D− line.

With reference to the manner a2, in some embodiments, when detecting that D+ is at a low level, the first electronic device may determine that protocol handshake succeeds. In some other embodiments, if the first electronic device detects that D− is at a low level, and duration of the low level is Tdet5, it may be determined that protocol handshake succeeds.

Step 405: The first electronic device determines whether a quantity of times of detection in step 402 exceeds 3, and performs step 402 if the quantity of times of detection in step 402 exceeds 3, or performs step 407 if the quantity of times of detection in step 402 does not exceed 3.

Step 406: The first electronic device and the second electronic device complete protocol detection.

With reference to the example of the manner a1 in step 402, when t=5 ms, the first electronic device stops low level detection on the D− line.

With reference to the example of the manner a2 in step 402, when t=5 ms, the first electronic device stops low level detection on the D+ line.

When the first electronic device determines that handshake fails, the first electronic device may retry handshake detection when t=5 to 10 ms.

Step 407: The first electronic device releases control on D+ and D−, and determines that handshake fails.

According to the foregoing handshake protocol, protocol handshake detection may be performed on a premise that it is first determined that the second electronic device is a DCP device, so that a USB port-based charging protocol on the current market can be better compatible.

Figure 5A:
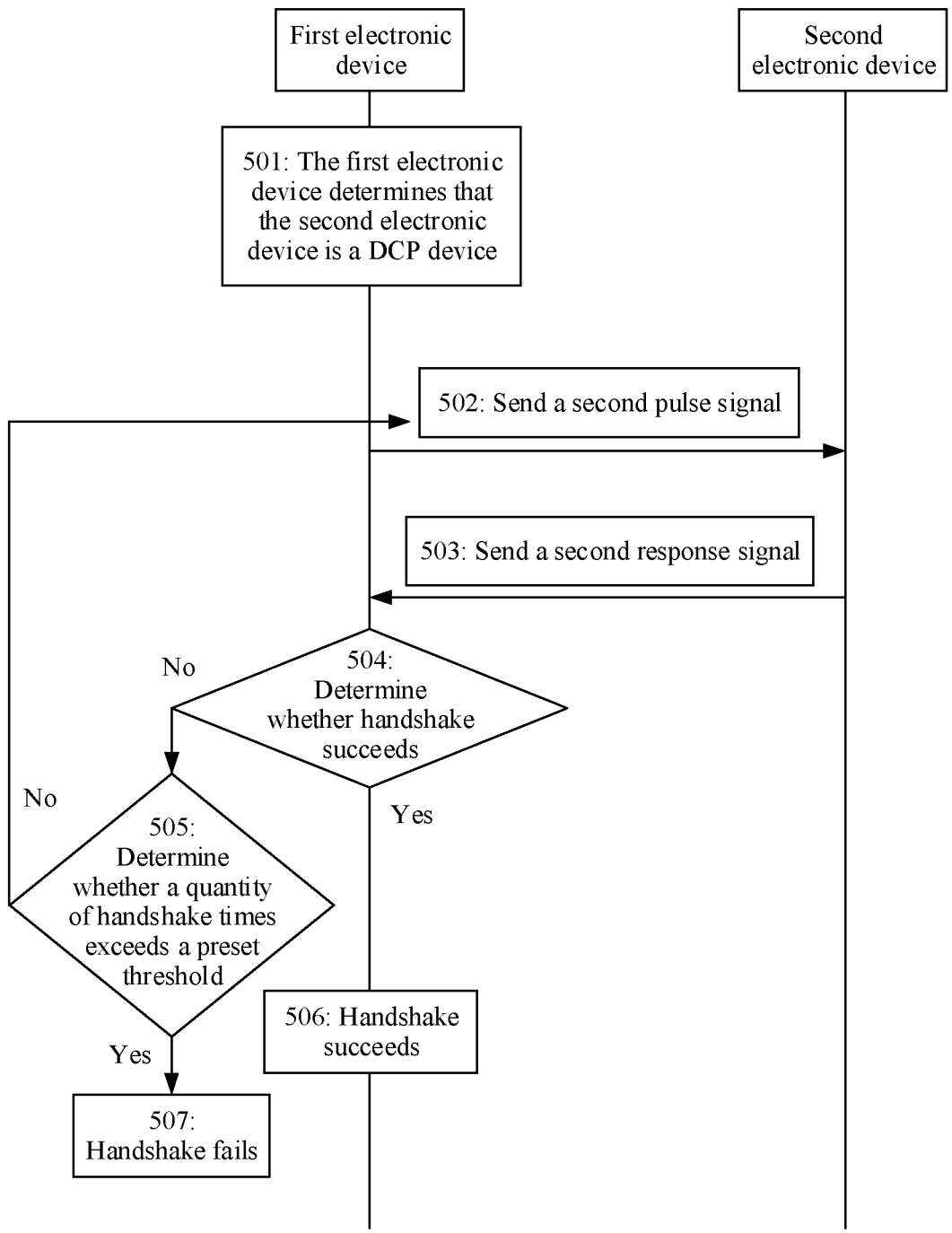
FIG. 5a is a schematic flowchart of a protocol handshaking method according to an embodiment of this application.

FIG. 5*a* is a schematic diagram of another handshake method for a communications protocol according to this application. A charging cable-based data transmission method provided in this application may be prepared by performing handshake between a first electronic device and a second electronic device for the communications protocol provided in this application. In this embodiment, an example in which the first electronic device is a to-be-charged device, the second electronic device is a power supply device, and a third electronic device is a charging cable is used for description. The handshake method may specifically include the following steps.

Step 501: After establishing a physical connection to the second electronic device by using the third electronic device, the first electronic device determines that the second electronic device is a DCP device.

For a specific implementation, refer to the manner in step 401. Details are not described herein again.

Step 502: The first electronic device sends a second pulse signal to the second electronic device through a communications line (the D+ line or the D− line).

Manner b1: The first electronic device sends a second pulse on the D− line.

The second pulse may be implemented in a plurality of manners. For example, the second pulse may be a pulse signal shown in (a) in FIG. 5*b*, where duration of a high level is Tdet1 and Tdet3, a voltage value of the high level may be 3.3 V, and duration of a low level may be Tdet2. In some embodiments, Tdet1, Tdet2, and Tdet3 may be the same, and are all 1 ms; or may be set to different time, and may be set according to a time requirement. This is not limited herein.

For example, when t=0 ms, the first electronic device enables a pull-up resistor, so that a high level is generated on the D− line. Using Tdet1=Tdet2=Tdet3=1 ms as an example, when t=1 to 2 ms, the first electronic device pulls up a voltage on the D− line, and after t=2 ms, the first electronic device restores a low level on the D− line, so that the second pulse of t=0 to 3 ms is generated. In this way, the first electronic device sends the second pulse and the second electronic device detects the second pulse.

Manner b2: The first electronic device sends a second pulse on the D+ line.

The second pulse may be implemented in a plurality of manners. For example, the second pulse may be a pulse signal shown in (a) in FIG. 5*b*, where duration of a low level is Tdet1 and Tdet3, a voltage value of the low level may be −3.3 V, and duration of the low level may be Tdet2. In some embodiments, Tdet1, Tdet2, and Tdet3 may be the same, and are all 1 ms; or may be set to different time, and may be set according to a time requirement. This is not limited herein.

For example, when t=0 ms, the first electronic device enables a pull-down resistor, so that a low level (for example, −3.3 V) is generated on the D− line. Using Tdet1=Tdet2=Tdet3=1 ms as an example, when t=1 to 2 ms, the first electronic device pulls up a voltage (for example, a voltage value is 0 V) on the D− line, and after t=2 ms, the first electronic device restores the low level (for example, −3.3 V) on the D− line, so that the second pulse of t=0 to 3 ms is generated. In this way, the first electronic device sends the second pulse and the second electronic device detects the second pulse.

Step 503: The second electronic device sends a second response signal after detecting the second pulse signal.

Figure 5B:
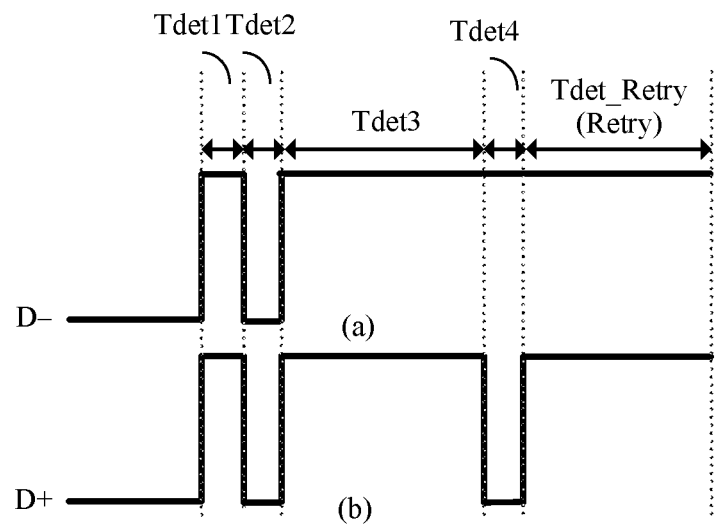
FIG. 5b and FIG. 5c are schematic diagrams of protocol handshaking according to an embodiment of this application.

With reference to the manner b1, as shown in (b) in FIG. 5*b*, in some embodiments, when the second electronic device detects the second pulse, because the D+ line and the D− line are in a short-circuited state, the second pulse may also be detected on the D+ line. After detecting the second pulse, the second electronic device may disconnect the D+ line and the D− line, pull down the D+ line to a grounded state, and after Tdet4, release the pull-down of the D+ line to restore the high level on the D+ line. Therefore, an electrical signal on the D+ line that lasts Tdet4 is used as the second response signal sent by the second electronic device to the first electronic device, so that the first electronic device detects the second response signal based on the D+ line to determine that handshake succeeds.

With reference to the example of the manner b1 in step 502, the second electronic device may detect the second pulse when t=0 to 3 ms. After the second electronic device detects the second pulse, for example, when t=3 to 4 ms, a line between the D+ line and the D− line is disconnected, and the D+ line is pulled down for 1 ms, so that when t=4 to 5 ms, a level on the D+ line is a low level.

Figure 5C:
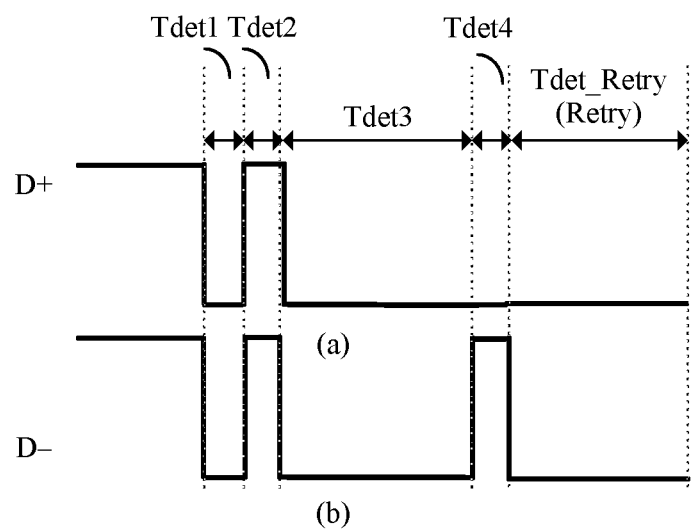

With reference to the manner b2, as shown in (b) in FIG. 5*c*, in some embodiments, when the second electronic device detects the second pulse, because the D+ line and the D− line are in a short-circuited state, the second pulse may also be detected on the D− line. After detecting the second pulse, the second electronic device may disconnect the D+ line and the D− line, pull down the D− line to a grounded state, and after Tdet4, release the pull-down of the D− line to restore the low level on the D− line. Therefore, an electrical signal that lasts Tdet4 is used as the second response signal sent by the second electronic device to the first electronic device, so that the first electronic device detects the second response signal based on the D− line to determine that handshake succeeds.

With reference to the example of the manner b2 in step 502, the second electronic device may detect the second pulse when t=0 to 3 ms. After the second electronic device detects the second pulse, for example, when t=3 to 4 ms, a line between the D+ line and the D− line is disconnected, and the D− line is pulled down for 1 ms, so that when t=4 to 5 ms, a level on the D− line is a low level.

Step 504: The first electronic device detects the second response signal on the communications line, determines whether handshake succeeds, and performs step 506 if handshake succeeds, or performs step 505 if handshake fails.

With reference to the manner b1, if the first electronic device detects the low level on the D− line, and duration of the low level is Tdet4, it may be determined that protocol handshake succeeds. With reference to the example of the manner b1 in step 502, when t=2 ms, the first electronic device may start low level detection on the D+ line.

With reference to the manner b2, if the first electronic device detects the low level on the D+ line, and duration of the low level is Tdet4, it may be determined that protocol handshake succeeds. With reference to the example of the manner b2 in step 502, when t=2 ms, the first electronic device may start low level detection on the D− line.

Step 505: The first electronic device determines whether a quantity of times of detection in step 502 exceeds 3, and performs step 502 if the quantity of times of detection in step 502 exceeds 3, or performs step 507 if the quantity of times of detection in step 502 does not exceed 3.

With reference to the example of the manner b1 in step 502, when t=5 ms, the first electronic device stops low level detection on the D+ line.

With reference to the example of the manner b2 in step 502, when t=5 ms, the first electronic device stops low level detection on the D− line.

Step 506: Complete protocol handshake detection.

Step 507: The first electronic device releases control on D+ and D−, and determines that handshake fails.

For example, with reference to FIG. 5b, when the first electronic device determines that handshake fails, the first electronic device may retry handshake detection when t=5 to 10 ms.

Fast protocol handshake can be implemented by using the protocol handshake detection method in FIG. 4a or FIG. 5a. After a primary device and a secondary device (the second electronic device or the third electronic device) are connected, detection can be completed within tens of milliseconds, and then data transmission between electronic devices is started, so that the primary device and the secondary device quickly enter a fast charging state. This improves charging efficiency.

This application provides a charging cable-based data transmission method, which is a data transmission method implemented based on a D+/D− data channel of a USB port. With reference to FIG. 1a, FIG. 1B, FIG. 2, and FIG. 3, the data transmission method may be applied to a scenario in which the second electronic device 200 performs fast charging on the first electronic device 100 by using the third electronic device 300. In this embodiment, half-duplex communication is performed between devices, and data is received and sent through a first data signal line in a communications line.

Figure 6A:
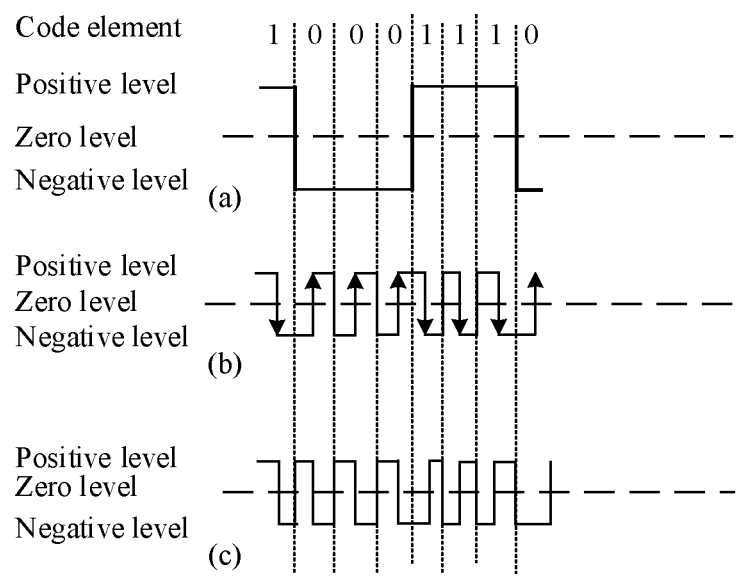
FIG. 6a is a schematic diagram of encoding in a charging cable-based data transmission method according to an embodiment of this application.

Problem 1: In the conventional technology, data is directly transmitted on a D− bus in a binary manner. For example, as shown in FIG. 6a, the first electronic device sends data to the second electronic device. When the data is consecutive "0"s or "1"s, a level does not change in an entire code element time period. Therefore, in the consecutive "0"s or "1"s, if a communication frequency is relatively high, the second electronic device cannot determine a quantity of consecutive 0s or consecutive 1s in the data sent by the first electronic device. Consequently, clock synchronization between the first electronic device and the second electronic device cannot be implemented, and an additional transmission line may be required to transmit a clock signal or an additional clock signal may need to be sent to implement clock synchronization between the first electronic device and the second electronic device. Therefore, only data at a relatively low communication frequency can be sent, or data with consecutive "0"s or "1"s cannot be sent, resulting in a low communication rate.

Figure 6B:
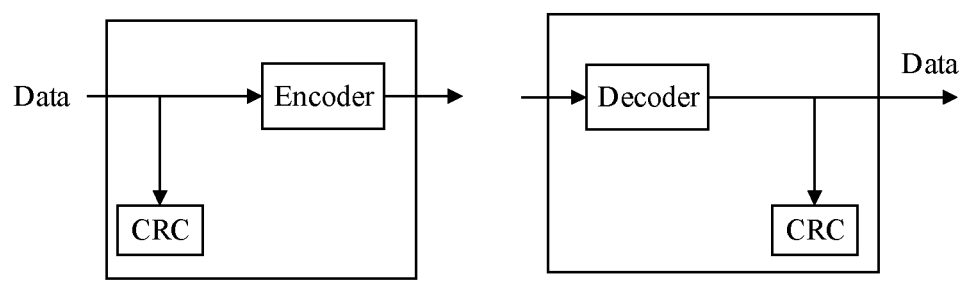
FIG. 6b is a schematic diagram of a structure of encoding and decoding in a charging cable-based data transmission method according to an embodiment of this application.
Figure 6C:
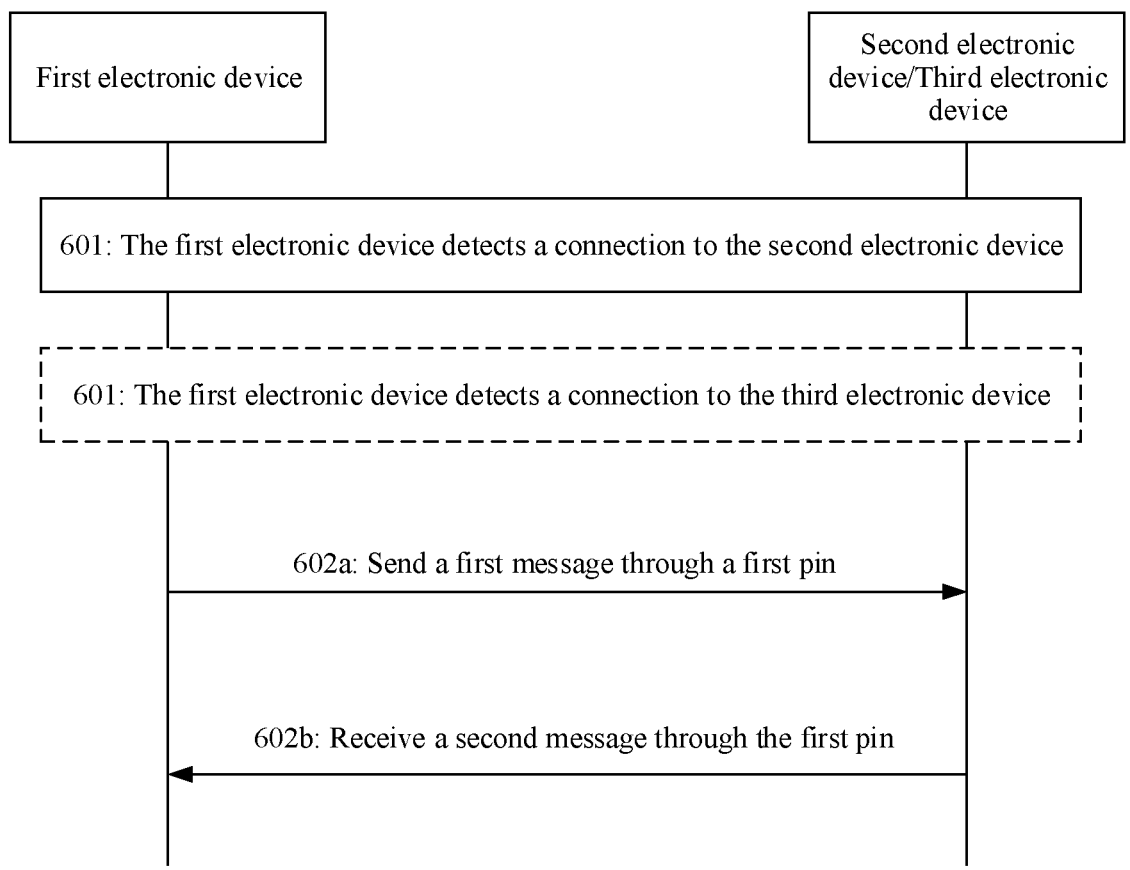
FIG. 6c is a schematic flowchart of a charging cable-based data transmission method according to an embodiment of this application.

Based on the foregoing problem 1, to ensure stability of data transmission and improve a communication rate, in some embodiments, as shown in FIG. 6b, in this application, data may be sent based on a Manchester coding manner, and data may be received in a Manchester decoding manner. As shown in FIG. 6a, based on data obtained in the Manchester coding manner, a jump at an intermediate moment of a code element may represent a clock, or may represent data. For example, a positive jump (from low to high) may represent 1, and a negative jump (from high to low) may represent 0. Alternatively, a positive jump may represent 0, and a negative jump may represent 1. In some other embodiments, as shown in FIG. 6a, differential Manchester coding may be used. In an electrical signal generated through the differential Manchester coding, a jump represents only a clock, and whether a level changes at a start of a code element represents data. For example, if a change occurs, it indicates 0, or if no change occurs, it indicates 1. The following uses data transmission between a first electronic device and a second electronic device as an example to describe a charging cable-based data transmission method in this embodiment. As shown in FIG. 6c, the method may specifically include the following steps.

Step 601: The first electronic device detects a connection to the second electronic device.

It should be noted that, if data transmission is performed between the first electronic device and a third electronic device, in step 601, the first electronic device detects a connection to the third electronic device.

The first electronic device is connected to the second electronic device through the third electronic device, and the third electronic device may include a first data signal line and a second data signal line.

The first data signal line may be a D+ line or a D− line. The second data signal line may be a D− line or a D+ line.

Step 602a: Send a first message through a first pin.

The first message is a message obtained through Manchester coding, and the first pin is connected to the first data signal line.

Step 602b: Receive a second message through the first pin.

The second message is a message obtained through Manchester coding.

In this embodiment, half-duplex communication is performed between devices, and data is received and sent through the first data signal line. After protocol handshake detection succeeds, a connection status between the devices may be determined by maintaining a level status on the second data signal line and monitoring the level status on the second data signal line.

Figure 6D:
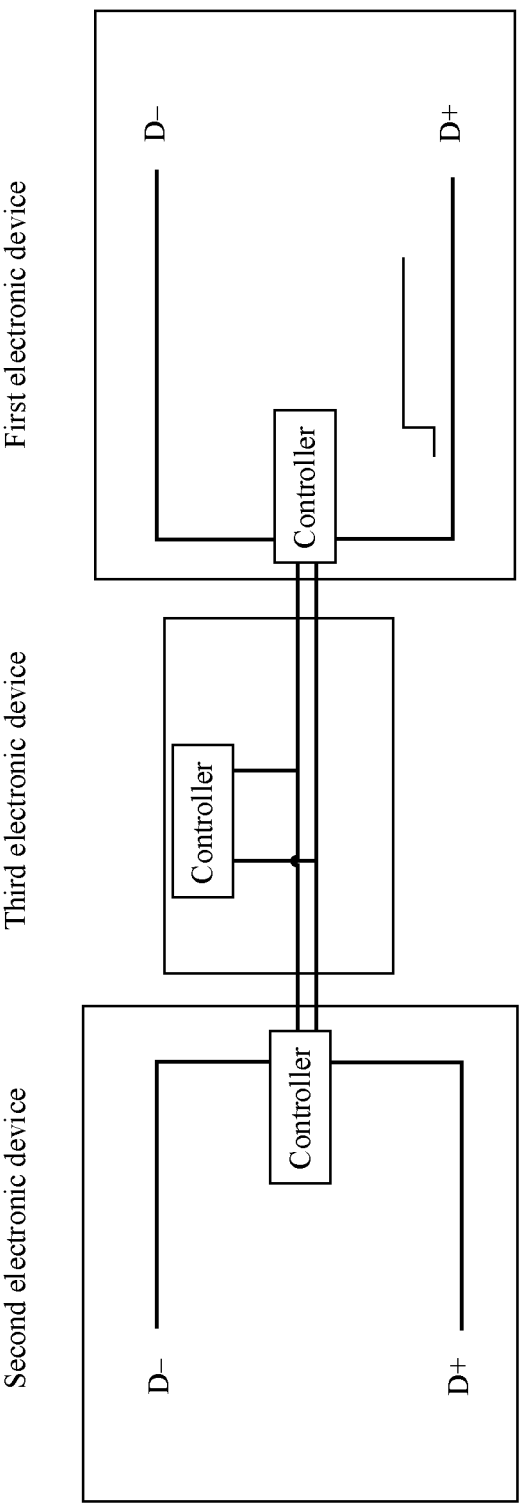
FIG. 6d is a schematic diagram of a structure in a charging cable-based data transmission method according to an embodiment of this application.

Manner c1: With reference to FIG. 6d, the second data signal line is a D+ signal line, and the first data signal line is a D− signal line.

For example, the first electronic device may pull up the D+ signal line to 3.3 V, and maintain the status, to monitor a connection status between the first electronic device, the second electronic device, and the third electronic device. For example, when a connection fault occurs between the first electronic device and the second electronic device, a level on the D+ signal line that is received by the second electronic device is not 3.3 V. Therefore, it can be determined that the connection fault occurs between the first electronic device and the second electronic device. When a connection fault occurs between the first electronic device and the third electronic device, a level on the D+ signal line that is received by the third electronic device is not 3.3 V. Therefore, it can be determined that the connection fault occurs between the first electronic device and the third electronic device.

The first electronic device may send data to the second electronic device and the third electronic device through the first pin on the D+ data signal line. The second electronic device or the third electronic device may also send data to the first electronic device through the first pin on the D+ data signal line, to implement data transmission between the devices.

Figure 6E:
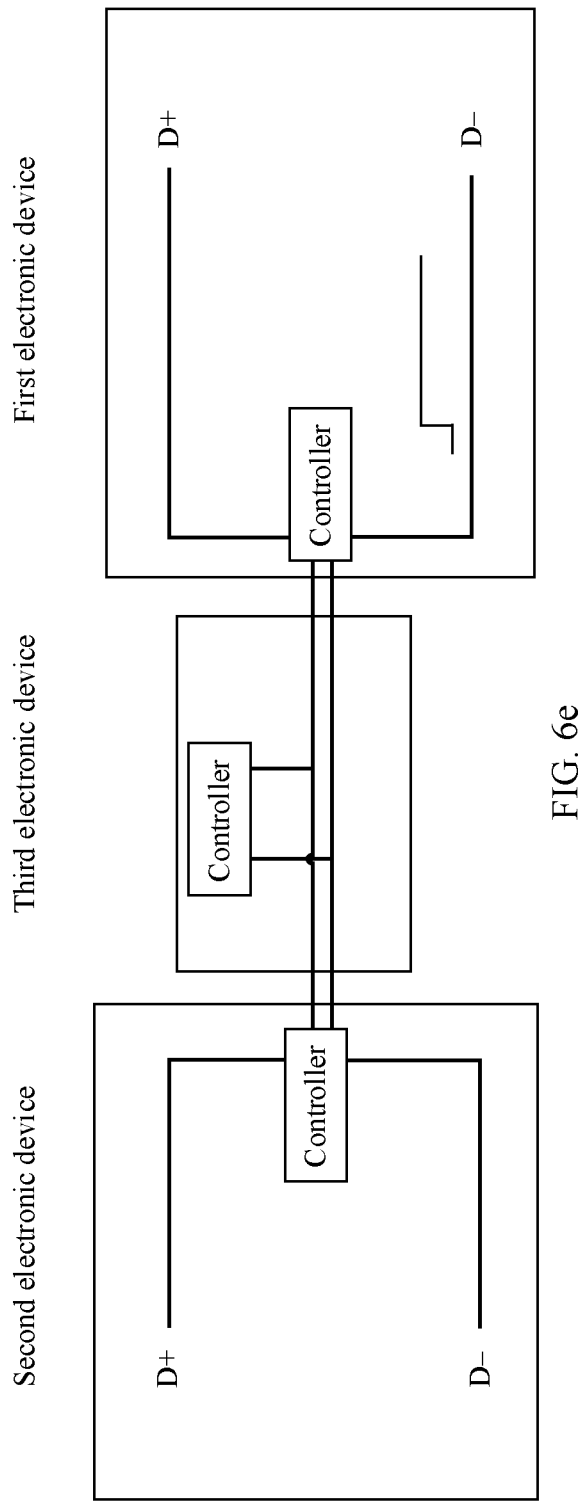
FIG. 6e is a schematic diagram of a structure in a charging cable-based data transmission method according to an embodiment of this application.

Manner c2: With reference to FIG. 6e, the first data signal line is a D+ signal line, and the second data signal line is a D− signal line.

For example, the first electronic device may pull down the D− signal line to −3.3 V, and maintain the status, to monitor a connection status between the first electronic device, the second electronic device, and the third electronic device. For example, when a connection fault occurs between the first electronic device and the second electronic device, a level on the D+ signal line that is received by the second electronic device is not −3.3 V. Therefore, it can be determined that the connection fault occurs between the first electronic device and the second electronic device. When a connection fault occurs between the first electronic device and the third electronic device, a level on the D+ signal line that is received by the third electronic device is not −3.3 V. Therefore, it can be determined that the connection fault occurs between the first electronic device and the third electronic device.

The first electronic device may send data to the second electronic device and the third electronic device through the first pin on the D− data signal line. The second electronic device or the third electronic device may also send data to the first electronic device through the first pin on the D− data signal line, to implement data transmission between the devices.

The following describes data structures of the first message and the second message by using an example.

Example 1

The first message and the second message each may include a start field and an end field of a data packet.

Figure 6F:
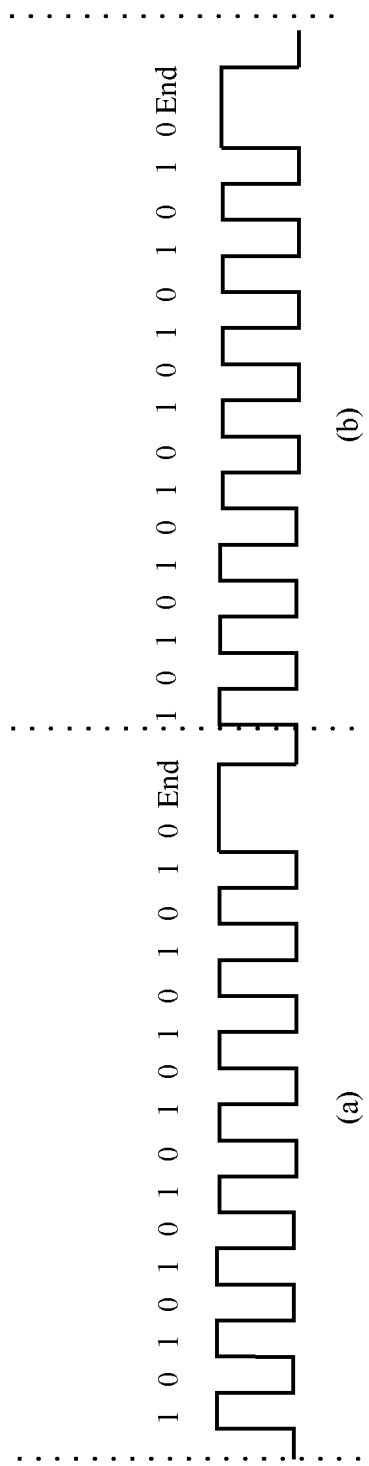
FIG. 6f is a schematic diagram of a signal in a charging cable-based data transmission method according to an embodiment of this application.

As shown in (a) in FIG. 6f, with reference to the manner c1, in some embodiments, the start field of the data packet may be a high-level pulse of one continuous time length. The end field of the data packet may be a high-level pulse of one continuous time length. For example, the start field (SOF) of the data packet may be an 8-UI high-level pulse. For example, the end field (EOF) of the data packet may be a 4-UI high-level pulse.

As shown in (b) in FIG. 6f, with reference to the manner c2, in some embodiments, the start field of the data packet may be a low-level pulse of one continuous time length. The end field of the data packet may be a low-level pulse of one continuous time length. For example, the start field (SOF) of the data packet may be an 8-UI low-level pulse (UI may be a time length required by a bus to transmit one data bit, that is, UI is related to a frequency f of communication between the first electronic device and the second electronic device, and UI=T=1/f). For example, the end field (EOF) of the data packet may be a 4-UI low-level pulse.

Problem 2: Considering that data is transmitted on a D− bus at a fixed communication frequency in the conventional technology, when interference exists in data transmission, data transmission robustness is relatively low, and communication performance is relatively poor.

Figure 7:
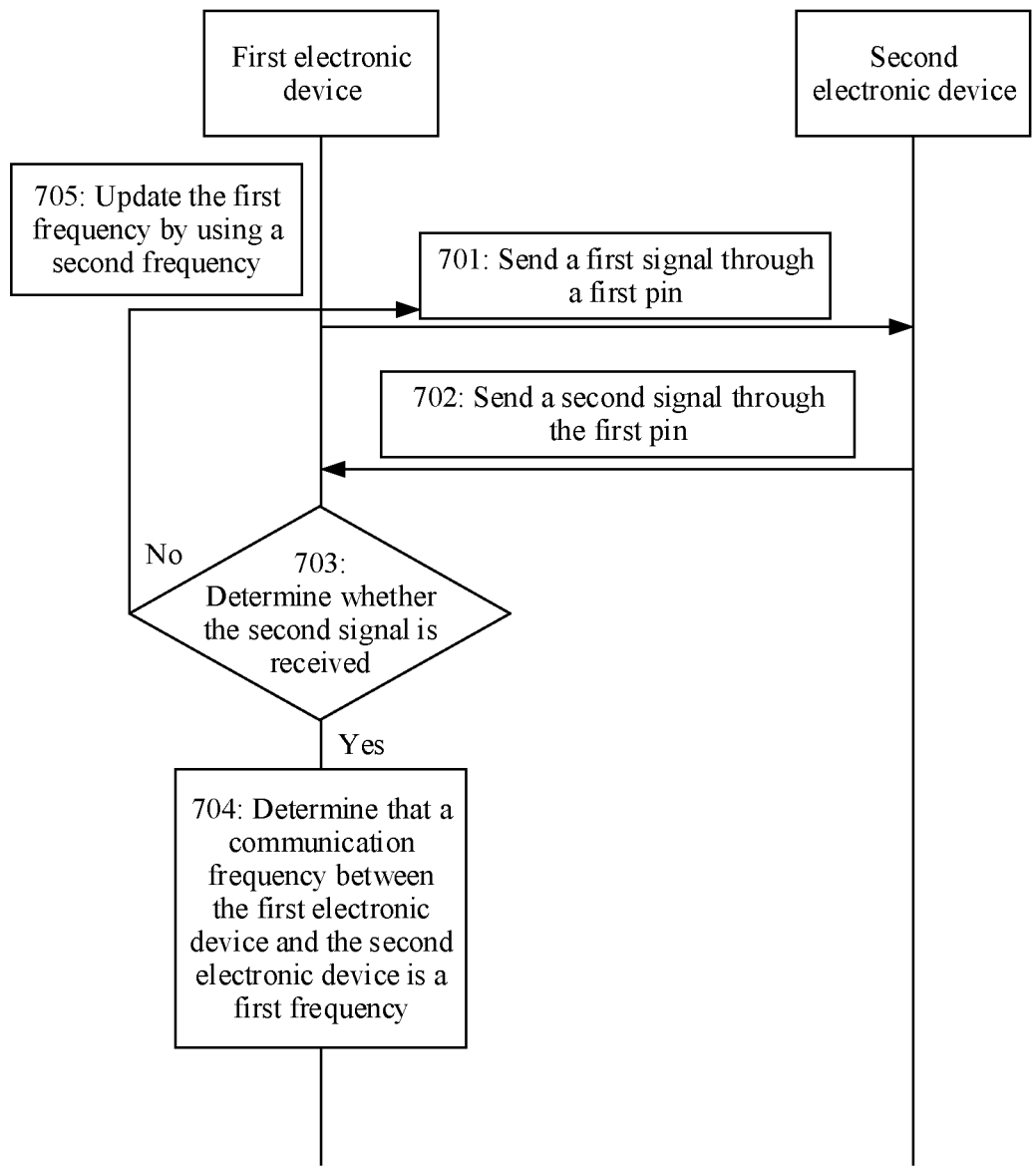
FIG. 7 is a schematic flowchart of a charging cable-based data transmission method according to an embodiment of this application.

Based on the foregoing problem 2, with reference to the embodiment in FIG. 6c, the first electronic device may select a required communication frequency according to an actual requirement. As shown in FIG. 7, the following specifically describes a method for configuring a communication frequency between a first electronic device and a second electronic device. The following steps are specifically included.

Step 701: The first electronic device sends a first signal through a first pin.

A frequency of the first signal is a first frequency, and the first signal is used to negotiate that a communication frequency is the first frequency.

The first frequency may be determined based on the sent first signal. For example, the first signal may be a sequence 1010 1010 1010 1010 sent on a D− channel in a cycle T. Therefore, it may be determined that the first frequency of the first signal is 1/T. After the sequence, a high-level pulse may be further included, and the high-level pulse is used as an end bit of the first signal.

Step 702: After receiving the first signal through the first pin, the second electronic device sends a second signal through the first pin.

A frequency of the second signal is the first frequency, and the second signal is used to determine that the communication frequency is the first frequency.

With reference to the example in step 701, after receiving the sequence, the second electronic device uses the same frequency and the same sequence as the second signal and sends the second signal to the first electronic device, to notify the first electronic device that the first signal is received and the second electronic device supports the communication frequency corresponding to the first signal.

Step 703: The first electronic device receives the second signal through the first pin, determines, in a preset time window, whether the second signal is received, and performs step 704 if the second signal is received, or performs step 705 if the second signal is not received.

Step 704: Determine the communication frequency between the first electronic device and the second electronic device as the first frequency.

Step 705: Update the first frequency by using a second frequency, and repeat step 701 to step 705.

It should be noted that the first frequency and the second frequency may be determined based on a plurality of preset frequencies. For example, communication frequencies f1, f2, f3, and f4 at four levels may be preset. When the communication frequency f1 fails to be configured, a communication frequency at another level may be selected to initiate configuration of the communication frequency.

In some embodiments, considering that a data volume of communication between the third electronic device and the first electronic device is relatively small, and is mainly used to send capability information of the third electronic device to the first electronic device, in this embodiment, the third electronic device may not configure a communication frequency, and selects only a default communication frequency to communicate with the first electronic device. For example, the default communication frequency may be a lowest communication frequency in available frequencies. Certainly, another communication frequency may be set. This is not limited herein.

According to the foregoing method, the first electronic device may send the first signal, and after receiving the first signal, the second electronic device and the third electronic device determine to perform communication at the first frequency of the first signal, to prepare for subsequent data transmission.

Problem 3: Considering that in the conventional technology, only point-to-point communication between the first electronic device and the second electronic device can be supported on the D− line, and communication between a plurality of devices cannot be supported, a scenario in which the first electronic device, the second electronic device, and the third electronic device need to perform communication when the third electronic device exists in a system cannot be adapted.

Based on the foregoing problem, in this embodiment of this application, identifiers of different electronic devices may be defined, and when the first message or the second message is sent, an identifier of a corresponding electronic device may be carried, to implement data transmission between a plurality of devices.

In this embodiment, data is transmitted and received through only the first data signal line. Therefore, the first message and the second message each need to carry identifiers of a sender and a receiver, to distinguish between a plurality of electronic devices.

In some embodiments, identifiers of different electronic devices may be represented by using role code information. The role code information may be carried by using physical packet header information.

In a possible implementation, the first message includes a first identifier, the first identifier is used to indicate a receiver of the first message and a sender of the first message, the second message includes a second identifier, the second identifier is used to indicate a receiver of the second message and a sender of the second message, and the receiver of the first message or the sender of the second message is either of the following: the second electronic device and the third electronic device.

For example, a role code (Role Code) may include eight data bits, where four most significant bits identify a data sender role, and four least significant bits identify a data receiver role. For details, refer to Table 2.

TABLE 2

| Role code | Bit | Description |
|---|---|---|
| | 7:4 | Information sender role |
| | 3:0 | Information receiver role |
| | Value | Description |
| First identifier | 0001 0010 | Information sent by the first electronic device to the second electronic device |
| First identifier | 0001 0011 | Information sent by the first electronic device to the third electronic device |
| Second identifier | 0010 0001 | Information sent by the second electronic device to the first electronic device |
| Second identifier | 0010 0011 | Information sent by the second electronic device to the third electronic device |
| Second identifier | 0011 0001 | Information sent by the third electronic device to the first electronic device |
| Second identifier | 0011 0010 | Information sent by the third electronic device to the second electronic device |
| | Else | Reserved |

For another example, a quantity of fields occupied by the role code may be determined based on a plurality of electronic devices accessing a communications system. For example, to reduce a quantity of fields, the quantity of fields occupied by the role code may be set to 4. Two most significant bits identify a data sender role, and two least significant bits identify a data receiver role. Alternatively, two least significant bits identify a data sender role, and two most significant bits identify a data receiver role. An example in which two most significant bits identify a data sender role and two least significant bits identify a data receiver role may be expressed as Table 3.

TABLE 3

| Role code | Bit | Description |
|---|---|---|
| | 7:4 | Information sender role |
| | 3:0 | Information receiver role |
| | Value | Description |
| First identifier | 00 00 | Information sent by the first electronic device to the second electronic device |
| First identifier | 01 11 | Information sent by the first electronic device to the third electronic device |
| Second identifier | 10 01 | Information sent by the second electronic device to the first electronic device |
| Second identifier | 10 11 | Information sent by the second electronic device to the third electronic device |
| Second identifier | 11 01 | Information sent by the third electronic device to the first electronic device |
| Second identifier | 11 10 | Information sent by the third electronic device to the second electronic device |

For example, the first message is sent to the second electronic device, and the second message is a message fed back by the second electronic device to the first electronic device. The first identifier is added to the first message, so that the second electronic device can determine that a receiver of the first message is the second electronic device, and determine, based on a sender in the first identifier, that an identifier carried in the second message subsequently fed back to the sender is an identifier of the first electronic device, that is, the sent second message includes the second identifier. In this way, the first electronic device can determine that a receiver of the second message is the first electronic device, and determine, based on a fact that a sender in the second identifier is the second electronic device, that an identifier carried in a message subsequently fed back to the sender is an identifier of the second electronic device. This ensures that a non-specified electronic device (for example, the third electronic device) does not respond to the first message, and a non-specified electronic device (for example, the third electronic device) does not respond to the second message, to implement communication between a plurality of electronic devices on a single bus.

In some other embodiments, before the first message or the second message is sent, related information of a role code may be sent by using a physical layer, so that the first electronic device, the second electronic device, and the third electronic device each determine identifiers corresponding to a data sender role and a data receiver role, to subsequently receive and send the first message and the second message, and implement communication between a plurality of devices on a single bus.

Problem 4: Considering that a communication manner complies with a manner in which a primary device asks and a secondary device (the second electronic device or the third electronic device) answers in the conventional technology, the secondary device (the second electronic device or the third electronic device) can only respond to the primary device, but cannot perform active communication. In other words, only after the first electronic device sends a message to the second electronic device, the second electronic device can feed back a corresponding message. In a scenario in which the second electronic device needs to actively report related information, for example, the second electronic device is abnormal, the first electronic device may not be notified in a timely manner, resulting in a problem that charging of the first electronic device is abnormal, or even a corresponding component of the first electronic device is damaged. Based on the problem 4, in embodiments of this application, the secondary device is allowed to actively send a message. Data transmission is implemented between a plurality of electronic devices through D+ or D−, to send a command and report and obtain information between the devices. A problem that a plurality of electronic devices share the first data signal line to send messages is considered. A plurality of devices in a system may apply for the right to use a bus at the same time. To avoid a bus conflict, an applicant who needs to occupy the bus in the system needs to be properly controlled and managed. Considering that the first electronic device is still the primary device, a priority of sending data by the first electronic device through the first data signal line may be set to be high, a priority of sending data by the second electronic device through the first data signal line may be set to be medium, and a priority of sending data by the third electronic device through the first data signal line may be set to be low. An embodiment of this application provides a data transmission arbitration method. The following uses an example for description with reference to FIG. 8a.

Figure 8A:
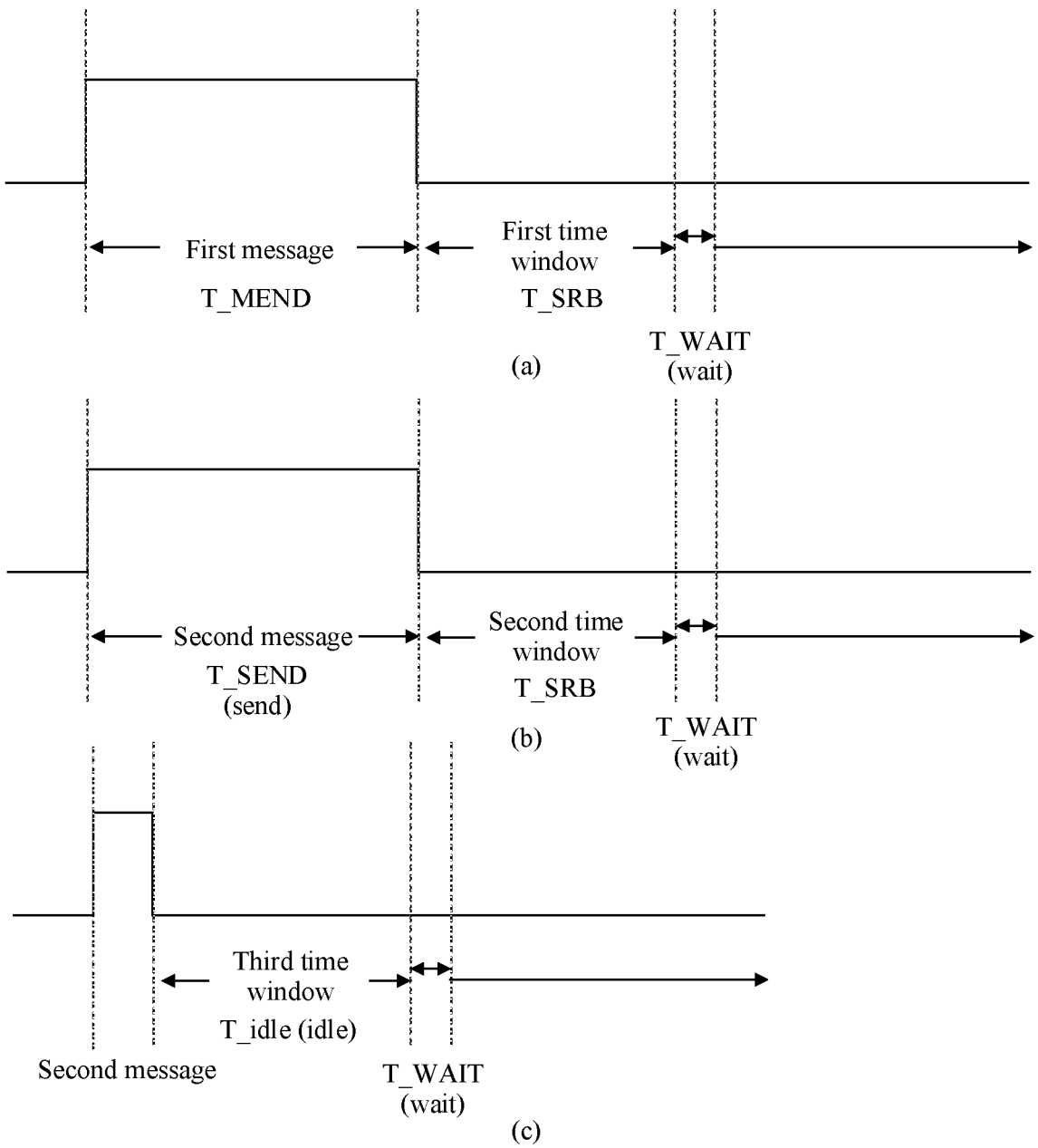
FIG. 8a is a schematic diagram of a time sequence in a charging cable-based data transmission method according to an embodiment of this application.

As shown in (a) in FIG. 8a, in some embodiments, after the first electronic device sends the first message through the first pin, in a first time window, the first data signal line is used by the first electronic device to receive a message.

It should be noted that, when receiving an end field of the first message sent by the first electronic device, the secondary device (the second electronic device or the third electronic device) may determine that sending of the first message is completed. To be specific, after the first electronic device sends the first message, the secondary device may occupy the first data signal line by initiating communication.

As shown in (b) in FIG. 8a, in some embodiments, after the first electronic device receives the second message through the first pin, in a second time window, the first data signal line is used by the electronic device to receive a message.

As shown in (c) in FIG. 8a, after the first electronic device determines that current time exceeds the second time window, the first data signal line is used by the electronic device to send a message. In other words, if the secondary device (the second electronic device or the third electronic device) does not use the first data signal line in the second time window, the ownership of the first data signal line is returned to the first electronic device.

It should be noted that, in some embodiments, to avoid an excessively high delay, after the second time window expires, regardless of whether data sending of the secondary device (the second electronic device or the third electronic device) is completed, the secondary device stops sending a message, and the ownership of the first data signal line is returned to the first electronic device. In some other embodiments, when it is determined that the secondary device (the second electronic device or the third electronic device) does not complete data sending, a third time window may be correspondingly set, and a window length of the third time window is greater than that of the second time window, to ensure as much as possible that data sending of the secondary device can be completed.

Figure 8B:
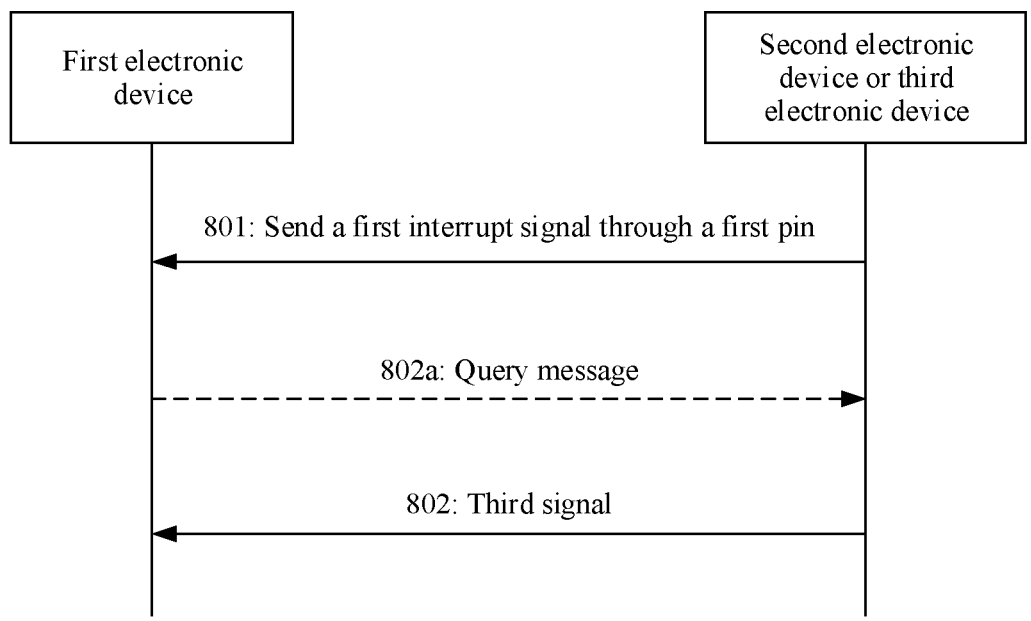
FIG. 8b is a schematic flowchart of a charging cable-based data transmission method according to an embodiment of this application.

Further, in some application scenarios, when a status of the secondary device (the second electronic device or the third electronic device) changes and status information of the secondary device (the second electronic device or the third electronic device) needs to be reported in a timely manner, if the current right to use the first data signal line belongs to the first electronic device, the status of the secondary device (the second electronic device or the third electronic device) may not be reported to the first electronic device in a timely manner. Therefore, an embodiment of this application may further provide a charging cable-based data transmission method. As shown in FIG. 8b, the method specifically includes the following steps.

Step 801: A second electronic device or a third electronic device sends a first interrupt signal when a first data signal line is idle.

When an error event or an abnormal event occurs on the second electronic device or the third electronic device, for example, a case such as an excessively large current, a poor contact, or a voltage fluctuation occurs on the second electronic device, the second electronic device needs to send current status information of the second electronic device to the first electronic device in a timely manner, and may send the first interrupt signal, to trigger interruption of a process of sending data by the first electronic device.

In some embodiments, the first interrupt signal may be a pulse, and a width of the pulse may be different from a pulse width of another message, so that the first electronic device can distinguish between the first interrupt signal and a signal of a normal communication message by using the pulse width.

Step 802: After receiving the first interrupt signal, the first electronic device receives a third message reported by the second electronic device or the third electronic device.

In some embodiments, step 802a is as follows: After receiving the first interrupt signal, the first electronic device may send a query message to the second electronic device or the third electronic device, where the query message is used to query current status information of the second electronic device or the third electronic device, to obtain the abnormal event or the error event on the second electronic device or the third electronic device.

In some other embodiments, after the second electronic device or the third electronic device sends the first interrupt signal, the third message may be directly sent to the second electronic device or the third electronic device, so that the first device obtains the abnormal event or the error event on the second electronic device or the third electronic device based on the sent third message.

According to the foregoing method, the second electronic device and the third electronic device may actively report respective status information. This avoids a passive manner in the conventional technology in which a secondary device (the second electronic device or the third electronic device) only responds to a primary device, and improves charging control flexibility and charging safety.

When an exception occurs on the first data signal line, for example, during large-current charging, the first electronic device is disconnected from the second electronic device. In this case, a large current may cause irreversible damage to the first electronic device or the second electronic device. In this case, the second electronic device may detect, within a microsecond-level time period, an unplugging action of the third electronic device, quickly disable an energy output channel, and stop a fast charging mode. Therefore, correspondingly, a data transmission manner also needs to be restored to a data transmission manner in a common charging mode. In this embodiment of this application, the first electronic device may send a reset signal, to reset a communication mode of the second electronic device and the third electronic device.

Figure 8C:
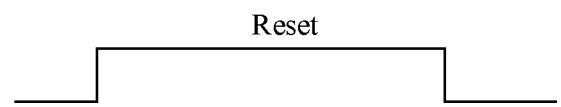
FIG. 8c is a schematic diagram of a time sequence in a charging cable-based data transmission method according to an embodiment of this application.

FIG. 8c is a time sequence diagram of a first reset signal (T_RESET) sent by the first electronic device. The first electronic device may send the first reset signal through the first pin, where the first reset signal is used to indicate a receiver of the first reset signal to perform reset, and a pulse width of the first reset signal is associated with the receiver.

In some embodiments, the first reset signal may be a reset pulse, and the reset pulse may be a pulse signal for driving the first data signal line to a high level in a preset time period. The preset time period may be far greater than a time length occupied by the data signal or the time window in this application. For example, the preset time period may be 1s.

After the second electronic device receives the first reset signal, the second electronic device restores a status of the second electronic device to a default state according to a reset protocol. After the third electronic device receives the first reset signal, the third electronic device restores a status of the third electronic device to a default state according to a reset protocol.

To improve data transmission quality on a communication link, in this embodiment of this application, a data packet may further include communication data error check. The communication data error check may be cyclic redundancy check. The CRC may be generated and performed by a physical layer or a protocol layer.

In some embodiments, the first message includes at least one data frame, and the data frame is any one of the following: data packet header information, data information, control information, and cyclic redundancy check, where a data frame includes a start field, a data field, and an end field.

Figure 8D:
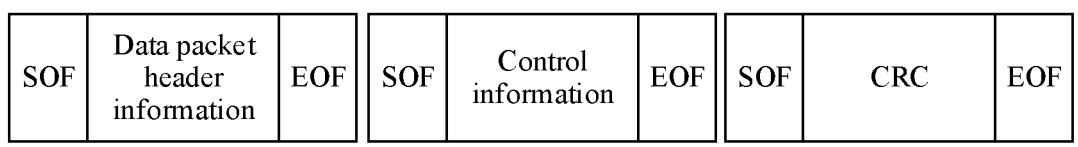

For example, as shown in FIG. 8d, three data frames are included, where the first data frame includes a data frame of data packet header information, the second data frame includes a data frame of control information, and the third data frame is a data frame of cyclic redundancy check. A structure of each data frame may further include a start field (denoted as SOF in the figure) and an end field (denoted as EOF in the figure). A transmitting end transmits all data in a length of 8 bits (one field) and automatically performs statistics collection. In addition, the transmitting end adds a parity check bit to an end of each field. Therefore, the data transmitter collects statistics on cyclic redundancy check (CRC) and adds the cyclic redundancy check to an end of each data packet transmitted over the protocol.

In some embodiments, a cyclic redundancy check field may be added to all data transmitted by the first electronic device to the second electronic device and all data transmitted by the second electronic device to the first electronic device.

In some other embodiments, as shown in FIG. 8e, N+3 data frames are included, where the first data frame includes a data frame of data packet header information, the second data frame includes a data frame of data description information, the third to the (N+2)$^{th}$ data frames are data content, and the (N+3)$^{th}$ data frame is a data frame of cyclic redundancy check. A structure of each data frame may further include a start field (denoted as SOF in the figure) and an end field (denoted as EOF in the figure). The second data frame to the (N+2)$^{th}$ data frame are data frames that include data information. Cyclic redundancy check (CRC) may be performed on only a data field, excluding a parity check bit. The data transmitter collects statistics on cyclic redundancy check (CRC) and adds the cyclic redundancy check to an end of a data packet. A receiving end needs to calculate cyclic redundancy check (CRC) of received data and compare the cyclic redundancy check with a cyclic redundancy check (CRC) field received in the data packet, to implement data check.

Based on the foregoing problem 1, this application provides a charging cable-based data transmission method, which is a data transmission method implemented based on a D+/D− data channel of a USB port. With reference to FIG. 1a, FIG. 1B, FIG. 2, and FIG. 3, the data transmission method may be applied to a scenario in which the second electronic device 200 performs fast charging on the first electronic device 100 by using the third electronic device 300. A communication manner between devices is full-duplex communication. In this embodiment of this application, the full-duplex communication manner is used, so that a problem that clock synchronization needs to be sent when the first electronic device sends data to the second electronic device can be avoided. As shown in FIG. 9a, specific steps may include the following.

Step 901: Detect a connection to the second electronic device and/or the third electronic device.

The first electronic device is connected to the second electronic device through the third electronic device, and the third electronic device may include a first data signal line and a second data signal line. The first data signal line may be a D+ line or a D− line. The second data signal line may be a D− line or a D+ line.

In some embodiments, there may be a plurality of manners for determining whether the first electronic device uses the D+ line or the D− line as the first data signal line to send data. Manners d1 to d3 are used below as examples to describe manners of communication between the first electronic device and the second electronic device.

Manner d1: The first electronic device and the second electronic device determine, in a preset manner, that the first data signal line is the D+ line or the D− line. For example, in a fast charging communications protocol, it is determined that a default communication manner is that a first data signal line of a to-be-charged electronic device (the first electronic device) is a D− line, and a second data signal line of the to-be-charged electronic device (the first electronic device) is a D+ line. Correspondingly, a first data signal line of a power supply device is a D+ line. A second data signal line of the power supply device is a D− line.

In some other possible implementations, the first electronic device may receive a message from the second electronic device through a second pin, and determine that the second pin is in a message receiving state and a first pin is in a message sending state. Alternatively, the first electronic device may send a message to the second electronic device through a first pin, and determine that a second pin is in a message receiving state and the first pin is in a message sending state. The manner d2 and the manner d3 are used as examples to describe manners in which the message may be a negotiation instruction, a negotiation response, a line switching instruction, a switching response, or the like.

Manner d2: The first electronic device and the second electronic device may determine, through negotiation before communication, a first data signal line and a second data signal line that are corresponding to the first electronic device, to correspondingly determine a first data signal line and a second data signal line that are corresponding to the second electronic device.

In some embodiments, after protocol handshake is completed, the first electronic device may first determine that the first data signal line is a D+ line or a D− line. Then, a negotiation instruction is sent to the second electronic device by using the determined first data signal line (the D+ line or the D− line). After receiving the negotiation instruction, the second electronic device determines that the data signal line is a data signal line for receiving from the first electronic device, that is, determines that the data signal line is the second data signal line of the second electronic device. In this case, the first data signal line of the second electronic device may be determined by using the second data signal line. Then, a negotiation response is sent to the first electronic device by using the first data signal line of the second electronic device, to determine that negotiation is completed. In some other embodiments, the second electronic device may initiate a negotiation instruction, to determine, by using a negotiation response fed back by the first electronic device, that negotiation is completed, so that respective first data signal lines and second data signal lines are determined based on a negotiation result.

It should be noted that, in some embodiments, the negotiation instruction may be data sent by the first electronic device to the second electronic device, to reduce instruction sending. The negotiation instruction may alternatively be an instruction separately used for negotiation. This is not limited herein.

Manner d3: The first electronic device and the second electronic device may switch a first data signal line and a second data signal line in a communication process.

In some embodiments, the first electronic device may initiate a line switching instruction to the second electronic device. In an example in which the first data signal line of the first electronic device is currently the D− line, the switching instruction may be sent to the second electronic device by using the D− line. After receiving the switching instruction by using the D− line, the second electronic device determines that a data signal line for communication with the first electronic device needs to be switched, and then determines, according to a requirement, whether to switch the D− line to the second data signal line of the second electronic device. When determining that the second electronic device can switch the D− line to the second data signal line of the second electronic device, and switch the D+ line to the first data signal line of the second electronic device, the second electronic device may send a switching response to the first electronic device by using the switched first data signal line (D+ line) of the second electronic device, to determine that switching is completed. When the second electronic device determines that switching of the D− line to the second data signal line of the second electronic device is not agreed, or switching of the D− line to the second data signal line of the second electronic device is not supported, the second electronic device may send a switching response to the first electronic device by using the original first data signal line (D− line) of the second electronic device, to indicate that switching is not agreed or switching fails. During subsequent communication, the second electronic device sends data by using the D+ line, and receives data by using the D− line. The first electronic device sends data by using the D− line, and receives data by using the D+ line.

In some other embodiments, alternatively, when it is determined that the second electronic device can switch the D− line to the second data signal line of the second electronic device, and switch the D+ line to the first data signal line of the second electronic device, the second electronic device sends a switching response to the first electronic device by using the original first data signal line (D− line) of the second electronic device, to determine that switching is complete. During subsequent communication, the first electronic device sends data by using the D+ line, and receives data by using the D− line. The second electronic device sends data by using the D− line, and receives data by using the D+ line.

When the second electronic device determines that switching of the D− line to the second data signal line of the second electronic device is not agreed, or switching of the D− line to the second data signal line of the second electronic device is not supported, the second electronic device sends a switching response to the first electronic device by using the original first data signal line (D− line) of the second electronic device, to determine that switching fails.

In some other embodiments, the second electronic device may initiate a switching instruction, to determine, by using a negotiation response fed back by the first electronic device, that switching is completed, so that respective first data signal lines and second data signal lines are determined based on a switching result.

For communication between the first electronic device and the third electronic device, manners e1 to e4 are used below as examples to describe manners of communication between the first electronic device and the second electronic device.

Manner e1: The first electronic device and the third electronic device determine, in a preset manner, that the first data signal line of the first electronic device is the D+ line or the D− line, and the first data signal line of the third electronic device is the D− line or the D+ line. For example, in a fast charging communications protocol, it is determined that a default communication manner is that a first data signal line of a to-be-charged electronic device (the first electronic device) is a D− line, and a second data signal line of the to-be-charged electronic device (the first electronic device) is a D+ line. Correspondingly, a first data signal line of a cable is the D+ line. A second data signal line of the cable is the D− line.

Manner e2: The first electronic device and the third electronic device may determine, through negotiation before communication between the first electronic device and the third electronic device, a first data signal line and a second data signal line that are corresponding to the first electronic device, to correspondingly determine a first data signal line and a second data signal line that are corresponding to the third electronic device.

In some embodiments, after protocol handshake is completed, the first electronic device may first determine that the first data signal line is a D+ line or a D− line. Then, a negotiation instruction is sent to the third electronic device by using the determined first data signal line (the D+ line or the D− line). After receiving the negotiation instruction, the third electronic device determines that the data signal line is a data signal line for receiving from the first electronic device, that is, determines that the data signal line is the second data signal line of the third electronic device. In this case, the first data signal line of the third electronic device may be determined by using the second data signal line. Then, a negotiation response is sent to the first electronic device by using the first data signal line of the third electronic device, to determine that negotiation is completed.

In some other embodiments, the third electronic device may initiate a negotiation instruction, to determine, by using a negotiation response fed back by the first electronic device, that negotiation is completed, so that respective first data signal lines and second data signal lines are determined based on a negotiation result.

It should be noted that, the negotiation instruction may be an instruction sent by the first electronic device to the second electronic device for detecting the third electronic device, to reduce instruction sending. The negotiation instruction may alternatively be an instruction separately used for negotiation. This is not limited herein.

Manner e3: After the first electronic device and the second electronic device determine the first data signal line and the second data signal line, the first electronic device and the third electronic device may negotiate to determine the first data signal line and the second data signal line that are corresponding to the third electronic device.

In some embodiments, after the first electronic device determines the first data signal line and the second data signal line for communication with the second electronic device, the first electronic device may send a negotiation instruction to the third electronic device by using the determined first data signal line (D+ line or D− line). In this case, after receiving the negotiation instruction, the third electronic device determines that the data signal line is a data signal line for receiving from the first electronic device.

Alternatively, after the second electronic device determines the first data signal line and the second data signal line for communication with the first electronic device, the second electronic device may send a negotiation instruction to the third electronic device by using the determined first data signal line (D+ line or D− line). In this case, after receiving the negotiation instruction, the third electronic device determines that the data signal line is a data signal line for receiving from the second electronic device.

It should be noted that, in the foregoing method, a manner of communication between the third electronic device and the first electronic device may be independent of a manner of communication between the third electronic device and the first electronic device. For example, the manner of communication between the third electronic device and the first electronic device may be set before communication between the third electronic device and the first electronic device. The manner of communication between the third electronic device and the second electronic device is set before communication between the third electronic device and the second electronic device.

Alternatively, a scenario in which a conflict may exist is considered. For example, the first electronic device sends a first negotiation instruction to the third electronic device, and the second electronic device sends a second negotiation instruction to the third electronic device. First data signal lines of the third electronic device that are indicated by the first negotiation instruction and the second negotiation instruction conflict. In this case, the third electronic device may determine a communication manner, to correspondingly reply to the first electronic device and the second electronic device. For example, the third electronic device determines to determine the first data signal line and the second data signal line in a manner corresponding to the first negotiation instruction. In this case, a negotiation success may be returned to the first electronic device, and a negotiation failure may be returned to the second electronic device. Therefore, the first electronic device and the second electronic device are notified of corresponding negotiation results.

A manner in which the third electronic device determines the first data signal line and the second data signal line may be determined based on a priority of communication between the third electronic device and the first electronic device or the second electronic device. For example, when the priority of communication between the first electronic device and the third electronic device is relatively high, the first data signal line and the second data signal line may be determined based on the first negotiation instruction of the first electronic device, or when the priority of communication between the second electronic device and the third electronic device is relatively high, the first data signal line and the second data signal line may be determined based on the second negotiation instruction of the second electronic device.

The priority of communication between the third electronic device and the first electronic device or the second electronic device may be determined based on an electronic device that preferentially communicates with the third electronic device currently, or may be a preset priority. This is not limited herein.

Step 902a: Send a first message through the first pin, where the first pin is connected to the first data signal line.

Step 902b: Receive a second message through the second pin, where the second pin is connected to the second data signal line.

The first message and the second message are used for charging setting of the electronic device.

Figure 9B:
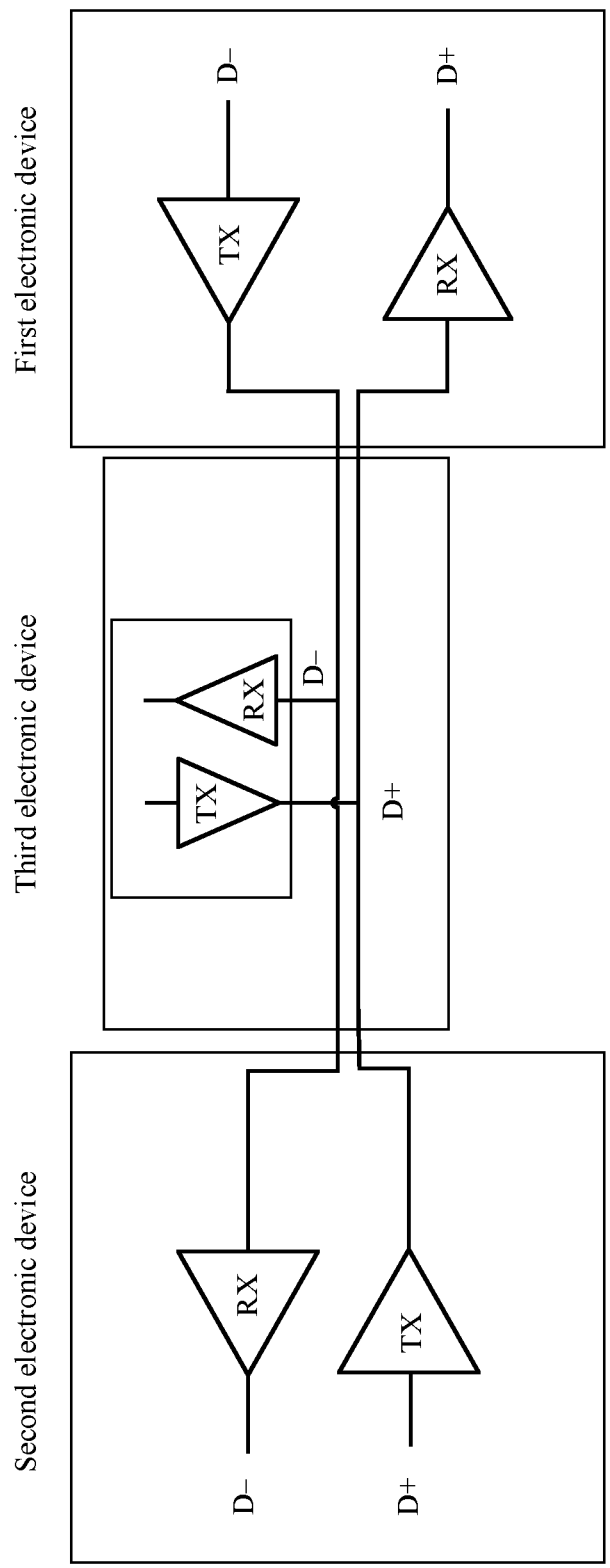
FIG. 9b to FIG. 9d each are a schematic diagram of a structure in a charging cable-based data transmission method according to an embodiment of this application.

With reference to the manner a1 or b1, in a possible manner f1, the second data signal line is a D+ signal line, and the first data signal line is a D− signal line. In this case, the first pin is a pin connected to a negative signal data line, and the second pin is a pin connected to a positive signal data line. As shown in FIG. 9b, the first electronic device sends data on D−, and receives data on D+; and the second electronic device receives data on D−, and sends data on D+.

Figure 9C:
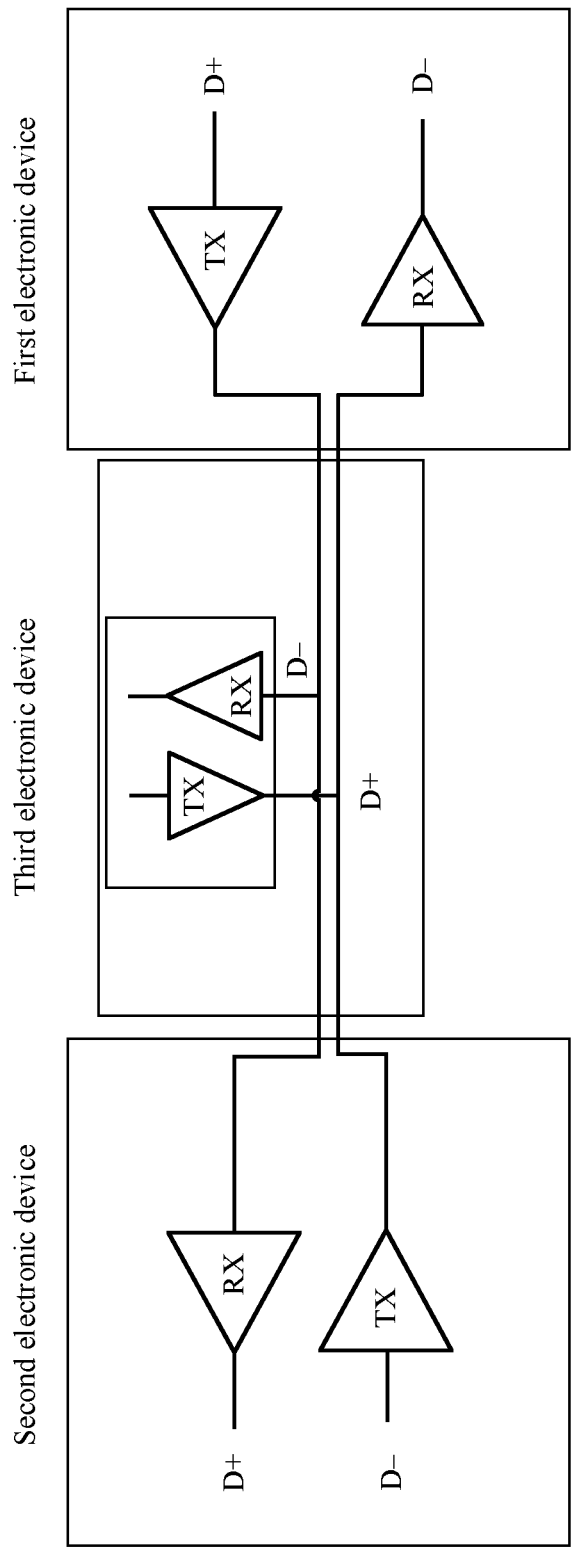

With reference to the manner a2 or b2, in a possible manner f2, the first data signal line is a D− signal line, and the second data signal line is a D+ signal line. In this case, the first pin is a pin connected to a positive signal data line, and the second pin is a pin connected to a negative signal data line. As shown in FIG. 9c, the first electronic device sends data on D+, and receives data on D−; and the second electronic device receives data on D+, and sends data on D−.

For the third electronic device, the third electronic device may receive data on D−, and send data on D+. Alternatively, the third electronic device receives data on D+, and sends data on D−.

Figure 9D:
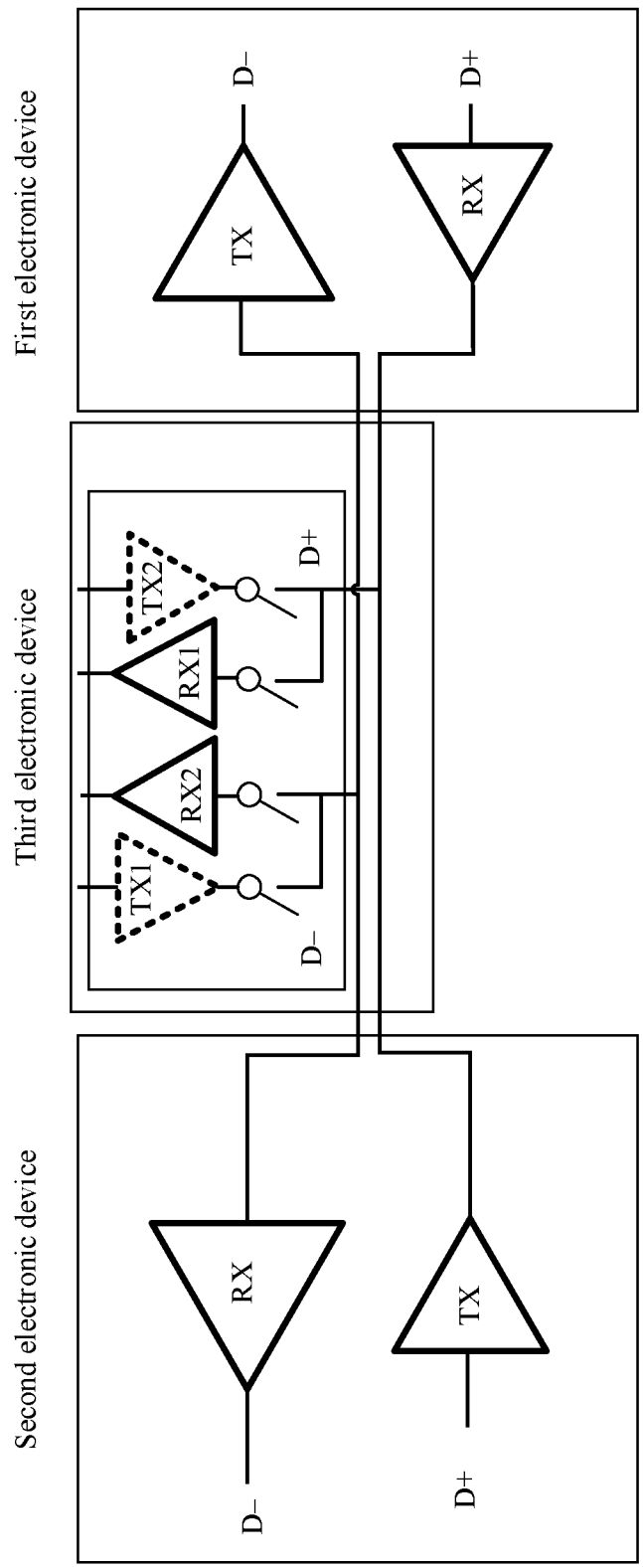
Figure 9E:
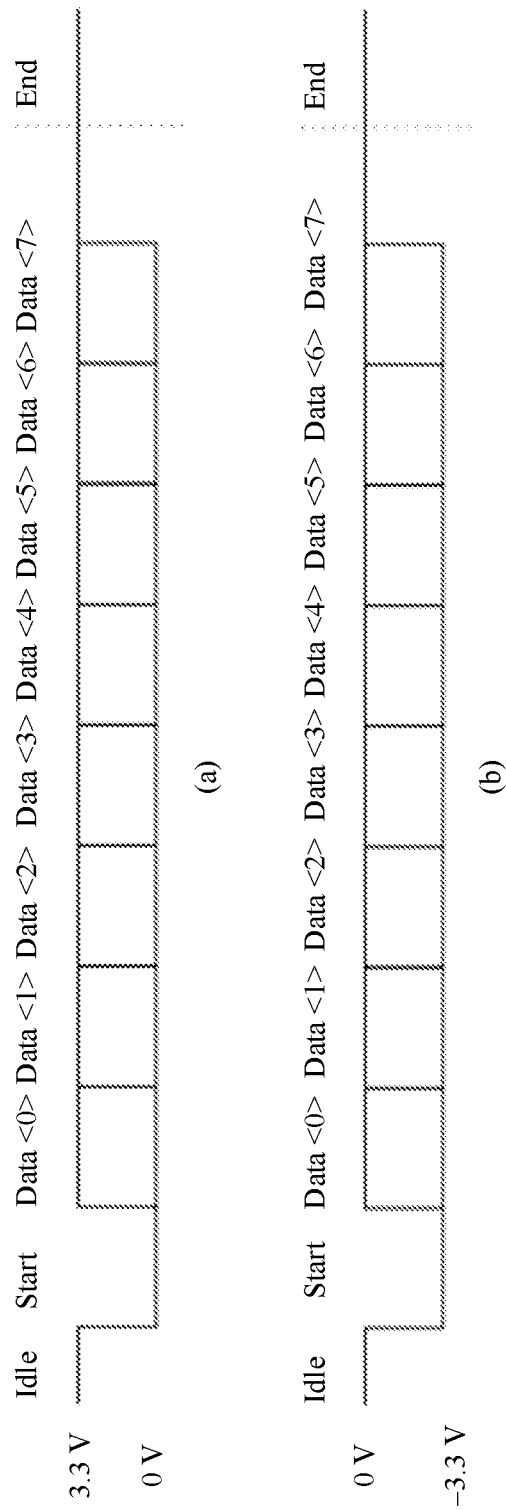
FIG. 9e is a schematic diagram of a signal in a charging cable-based data transmission method according to an embodiment of this application.
Figure 9F:
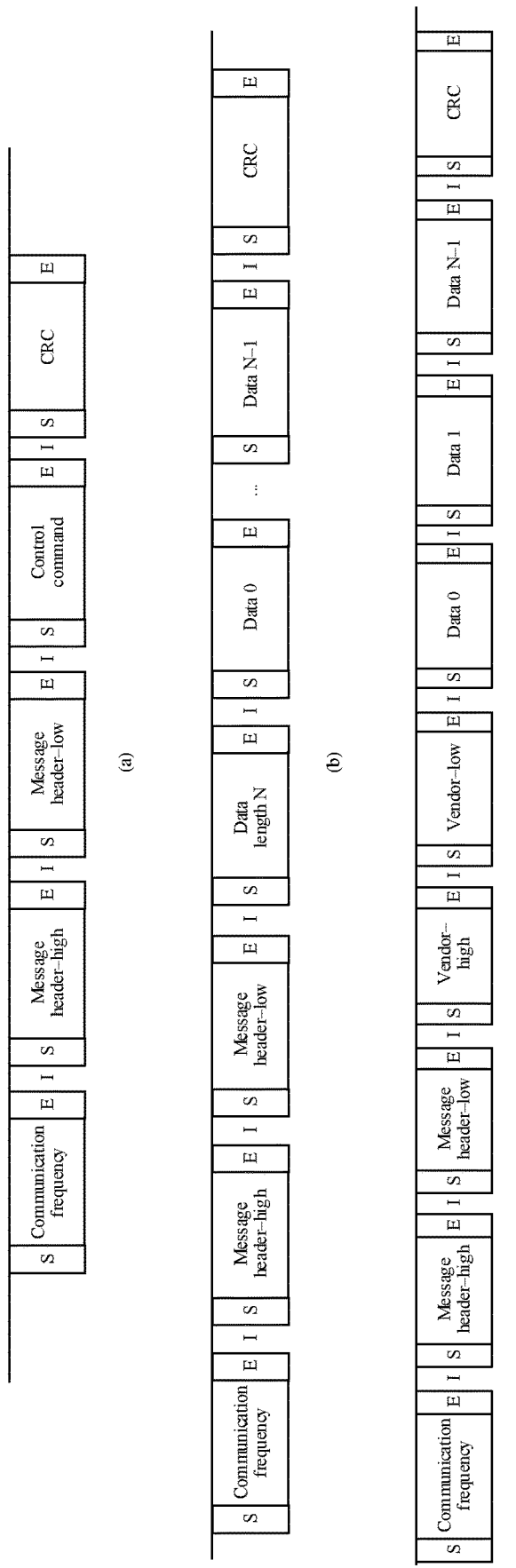
FIG. 9f is a schematic diagram of a data structure according to an embodiment of this application.
Figure 9G:
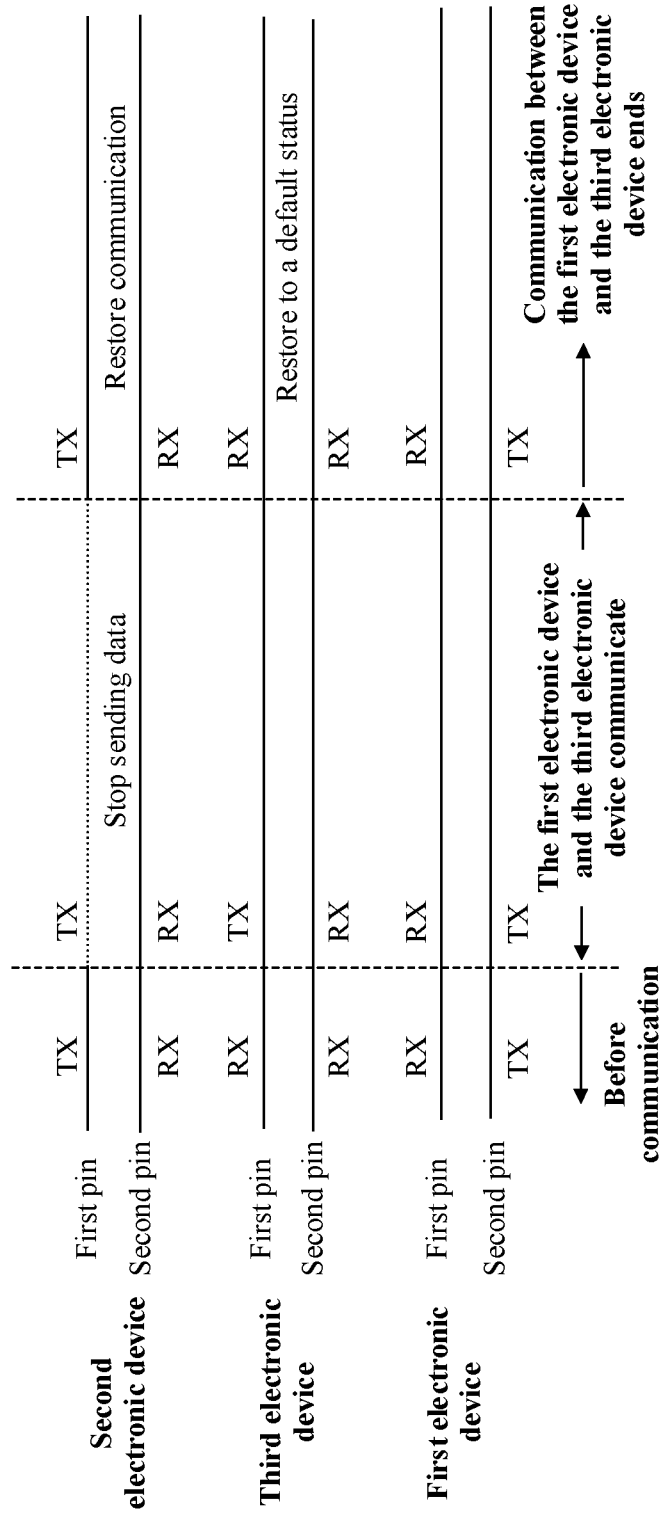
FIG. 9g is a schematic diagram of a pin status in a charging cable-based data transmission method according to an embodiment of this application.

With reference to FIG. 9d, as shown in FIG. 9g, before the third electronic device starts communication with the first electronic device or the second electronic device, and after the communication ends, both the first pin and the second pin may be set to a message receiving state. When receiving a third message from the first electronic device or the second electronic device, the third electronic device determines message receiving/sending states of the first pin and the second pin.

For example, the first electronic device communicates with the third electronic device. The first electronic device determines that the second pin of the first electronic device is in a message receiving state, and the first pin is in a message sending state. Therefore, the first electronic device may send the third message to the third electronic device through the first pin.

In a possible implementation, the third message may include a third identifier, and the third identifier is used to identify that a receiver of the third message is the third electronic device. For a setting manner of the third identifier, refer to the following setting manner of setting a first identifier in the first message. Details are not described herein again.

The third message may be used to indicate the third electronic device to set the first pin to the message receiving state and set the second pin to the message sending state. Therefore, when receiving the third message, the third electronic device may set the first pin to the message receiving state, and set the second pin to the message sending state. Therefore, the third electronic device may start to communicate with the first electronic device. In some other embodiments, to reduce signaling overheads, the third message may alternatively be a request message used to obtain configuration information of the third electronic device. When receiving the third message, the third electronic device may set the first pin to the message receiving state, and set the second pin to the message sending state. In addition, communication with the first electronic device is directly started based on the third message.

After the communication ends, in a possible implementation, the first electronic device may actively send a reset message to the third electronic device, where the reset message may be used to indicate that the first pin and the second pin of the third electronic device are in the message receiving state. Therefore, when determining that the reset message is received, the third electronic device determines that the communication between the first electronic device and the third electronic device ends, and then restores the first pin and the second pin of the third electronic device to the message receiving state. In another possible implementation, the third electronic device may alternatively determine, in another manner, that communication between the first electronic device and the third electronic device ends. For example, after determining that communication with the third electronic device ends, the first electronic device communicates with the second electronic device. For example, the first electronic device sends a fourth message to the second electronic device, where the fourth message includes a second identifier, and the second identifier is used to indicate that a receiver is the second electronic device. When receiving the fourth message, the third electronic device may determine that communication between the first electronic device and the third electronic device ends, and the third electronic device may set the first pin and the second pin of the third electronic device to the message receiving state.

In a possible scenario, when determining that a transceiver pin of the third electronic device needs to be switched, the first electronic device may send a fifth message to the third electronic device through the second pin, where a receiver of the fifth message is the third electronic device. The fifth message may be an instruction used to instruct the third electronic device to switch a receiving/sending state of the pin. Therefore, when receiving the fifth message through the second pin, the third electronic device may set the second pin to the message receiving state and set the first pin to the message sending state, to switch between receiving and sending states of the first pin and the second pin.

It should be noted that, the fifth message may be sent after communication between the first electronic device and the third electronic device ends, or may be sent in a process of communication between the first electronic device and the third electronic device. This is not limited herein.

Figure 9H:
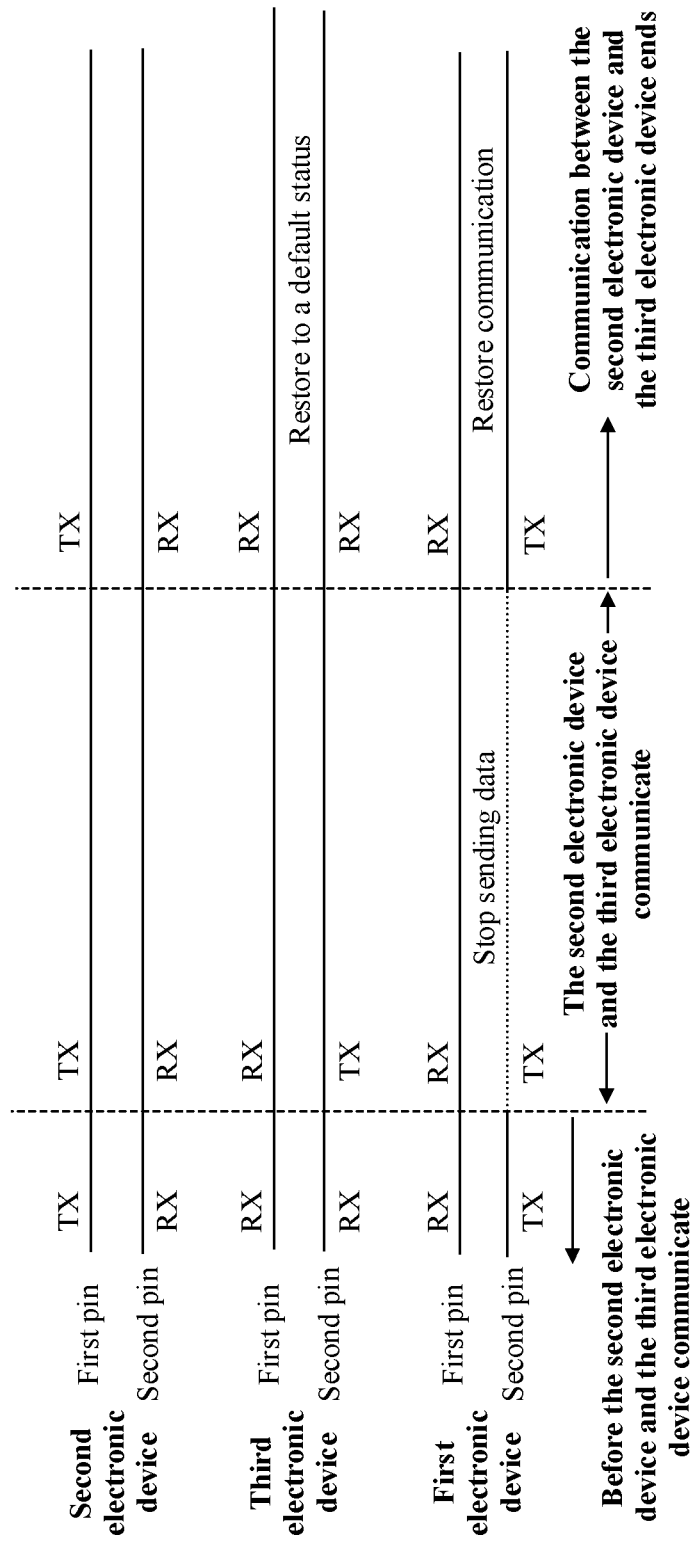
FIG. 9h is a schematic diagram of a pin status in a charging cable-based data transmission method according to an embodiment of this application.

With reference to FIG. 9d, as shown in FIG. 9h, an example in which the second electronic device communicates with the third electronic device is used. The second electronic device may determine that a second pin of the second electronic device is in the message receiving state, and a first pin is in the message sending state. A determining manner may be determined after negotiation with the first electronic device, or may be a manner indicated by the first electronic device. For example, the second electronic device receives a message of the first electronic device through the second pin, and then determines that the second pin is in the message receiving state. Therefore, the second electronic device may send a third message to the third electronic device through the first pin.

In a possible implementation, the third message may include a third identifier, and the third identifier is used to identify that a receiver of the third message is the third electronic device.

The third message may be used to indicate the third electronic device to set the first pin to the message receiving state and set the second pin to the message sending state. Therefore, when receiving the third message, the third electronic device may set the first pin to the message receiving state, and set the second pin to the message sending state. Therefore, the third electronic device may start to communicate with the second electronic device. In some other embodiments, to reduce signaling overheads, the third message may alternatively be a request message used to obtain configuration information of the third electronic device. When receiving the third message, the third electronic device may set the first pin to the message receiving state, and set the second pin to the message sending state. In addition, communication with the second electronic device is directly started based on the third message.

After the communication ends, in a possible implementation, the second electronic device may actively send a reset message to the third electronic device, where the reset message may be used to indicate that the first pin and the second pin of the third electronic device are in the message receiving state. Therefore, when determining that the reset message is received, the third electronic device determines that the communication between the second electronic device and the third electronic device ends, and then restores the first pin and the second pin of the third electronic device to the message receiving state. In another possible implementation, the third electronic device may alternatively determine, in another manner, that communication between the second electronic device and the third electronic device ends. For example, after determining that communication with the third electronic device ends, the second electronic device communicates with the first electronic device. For example, the second electronic device sends a fourth message to the first electronic device, where the fourth message includes a first identifier, and the first identifier is used to indicate that a receiver is the first electronic device. When receiving the fourth message, the third electronic device may determine that communication between the second electronic device and the third electronic device ends, and the third electronic device may set the first pin and the second pin of the third electronic device to the message receiving state.

In a possible scenario, when determining that a transceiver pin of the third electronic device needs to be switched, the second electronic device may send a fifth message to the third electronic device through the second pin, where a receiver of the fifth message is the third electronic device. The fifth message may be an instruction used to instruct the third electronic device to switch a receiving/sending state of the pin. Therefore, when receiving the fifth message through the second pin, the third electronic device may set the second pin to the message receiving state and set the first pin to the message sending state, to switch between receiving and sending states of the first pin and the second pin.

In another possible switching scenario, the third electronic device receives, through the first pin, a fifth message sent by the first electronic device, and the third electronic device further receives, through the second pin, a third message sent by the second electronic device. In this case, the third electronic device may determine, based on priorities of the first electronic device and the second electronic device, to set the receiving/sending states of the first pin and the second pin. For example, when the priority of the first electronic device is higher than that of the second electronic device, the third electronic device may set the second pin to the message receiving state and the first pin to the message sending state based on the received fifth message sent by the first electronic device.

For example, in FIG. 9b, the third electronic device may receive data on D−, and send data on D+. In some other embodiments, the third electronic device may further switch a communication mode of the third electronic device by using a controller of the third electronic device. For example, a manner of switching the communication mode may be setting a switch to switch a pin that is of the third electronic device and that is used for sending data to the D+ line, and switch a pin that is of the third electronic device and that is used for receiving data to the D− line, to switch the communication mode of the third electronic device to a mode in which data is received on D− and data is sent on D+. In FIG. 9c, the third electronic device receives data on D+, and sends data on D−. In some other embodiments, the third electronic device may further switch a communication mode of the third electronic device by using a controller of the third electronic device. For example, a manner of switching the communication mode may be setting a switch to switch a pin that is of the third electronic device and that is used for sending data to the D− line, and switch a pin that is of the third electronic device and that is used for receiving data to the D+ line, to switch the communication mode of the third electronic device to a mode in which data is received on D+ and data is sent on D−. In FIG. 9d, two data receiving modules RX1 and RX2 and two data sending modules TX1 and TX2 are disposed in the third electronic device, so that switching between two receiving/sending manners can be implemented. For example, it may be specified that data is received on D+ and data is sent on D− by using the receiving module RX1 and the sending module TX1. A setting manner may be: After a control instruction is received on D−, a D− data signal line is determined as a receiving line, and correspondingly the receiving module RX1 is set to be enabled and the sending module TX1 is set to be enabled. Alternatively, it may be specified that data is received on D− and data is sent on D+ by using the receiving module RX2 and the sending module TX2. A setting manner may be: After a control instruction is received on D+, a D+ data signal line is determined as a receiving line, and correspondingly the receiving module RX2 is set to be enabled and the sending module TX2 is set to be enabled. A switching manner may be, for example, switching implemented by using the switch shown in FIG. 9d. Certainly, switching may alternatively be implemented in another manner. This is not limited herein.

In step 902a, with reference to the manner a1 or b1, as shown in (a) in FIG. 9e, the first electronic device sends a logical "0" signal by pulling down the first data signal line, to indicate start of character transmission. After data sending is completed, a logical "1" signal is sent to indicate that transmission ends.

In some embodiments, when the first data signal line is in an idle state, the first data signal line is at a high level; and after determining to start to send the first message (a sending instruction is received), the first electronic device may use, as a start field of the first message, time (for example, time of one data bit) corresponding to a start field of pulling down the first data signal line, to start communication. Then, data in the first message is sequentially sent from a least significant bit to a most significant bit, and an end field of the first message is sent after the data in the first message is completely sent. In some embodiments, the end field may be time (for example, time of one data bit) corresponding to an end field of pulling up the first data signal line, to determine that sending of a data frame in the first message is completed.

In step 902a, with reference to the manner a2 or b2, as shown in (b) in FIG. 9e, the first electronic device sends a logical "0" signal by pulling up the first data signal line, to indicate start of character transmission. After data sending is completed, a logical "1" signal is sent to indicate that transmission ends.

In some embodiments, when the first data signal line is in an idle state, the first data signal line is at a low level (for example, −3.3 V); and after determining to start to send the first message (a sending instruction is received), the first electronic device may use, as a start field of the first message, time (for example, time of one data bit) corresponding to pulling up the first data signal line to 0 V and lasting a start field, to start communication. Then, data in the first message is sequentially sent from a least significant bit to a most significant bit, and an end field of the first message is sent after the data in the first message is completely sent. In some embodiments, the end field may be time (for example, time of one data bit) corresponding to an end field of pulling down the first data signal line, to determine that sending of a data frame in the first message is completed.

For example, one data frame may include a 1-bit start field, an 8-bit data field, and a 1-bit end field. When the first message includes only one data frame, it may be considered that sending of the first message is completed currently. When the first message includes a plurality of data frames, all data frames in the first message may be sequentially sent until all the data frames in the first message are sent.

In step 902b, with reference to the manner a1 or b1, in some embodiments, for the first electronic device, when the second data signal line is in an idle state, the second data signal line is at a high level, and when it is detected that a falling edge appears on the second data signal line, it may be determined that there is data transmission, and it may be determined to start to receive the second message. One data frame in the second message is sequentially received from a least significant bit to a most significant bit. After it is determined that data of a preset field is received, it is determined that the second data signal line is at a high level, and then it is determined that one data frame is received.

In step 902b, with reference to the manner a2 or b2, for the first electronic device, when the second data signal line is in an idle state, the second data signal line is at a low level (for example, −3.3 V), and when it is detected that a rising edge appears on the second data signal line, it may be determined that there is data transmission, and it may be determined to start to receive the second message. One data frame in the second message is sequentially received from a least significant bit to a most significant bit. After it is determined that data of a preset field is received, it is determined that the second data signal line is at a low level, and then it is determined that one data frame is received.

In some embodiments, the first message includes at least one data frame, and the data frame is any one of the following: data packet header information, data information, control information, and cyclic redundancy check, where a data frame includes a start field, a data field, and an end field.

As shown in FIG. 9f, a structure of a data frame may include a start field (denoted as S in the figure), a data field, and an end field (denoted as E in the figure). An interval between different data is denoted as I. For example, in a data link, one frame of data includes 10 bits (1-bit start field+8-bit data field+1-bit end field). At a protocol layer, according to different information commands, one piece of data may include a plurality of 10-bit data frames.

For example, a control command may be shown in (a) in FIG. 9f, and includes five data frames. A data field of the first data frame is a communication frequency (training) field, a data field of the second data frame is a high-order message header field (that is, data packet header information), a data field of the third data frame is a low-order message header field (that is, data packet header information), a data field of the fourth data frame is a control command field (that is, control information), and a data field of the fifth data frame is a CRC field (that is, CRC information).

A data command may be shown in (b) in FIG. 9f, and includes 4+N data frames. A data field of the first data frame is a communication frequency field, a data field of the second data frame is a high-order message header field, a data field of the third data frame is a low-order message header field, data fields of the fourth data frame to the $(3+N)^{th}$ data frame are data fields (that is, data information), and a data field of the $(4+N)^{th}$ data frame is a CRC field.

The data may alternatively be a user-defined command. For example, as shown in (c) in FIG. 9f, the data may include 6+N data frames. A data field of the first data frame is a communication frequency field, a data field of the second data frame is a high-order message header field, a data field of the third data frame is a low-order message header field, a data field of the fourth data frame is a high-order vendor information field, a data field of the fifth data frame is a low-order vendor information field, data fields of the sixth data frame to the $(5+N)^{th}$ data frame are data fields, and a data field of the $(6+N)^{th}$ data frame is a CRC field.

The format of the command field is merely an example. The data packet may further include a data frame corresponding to another field. Details are not described herein.

Figure 10A:
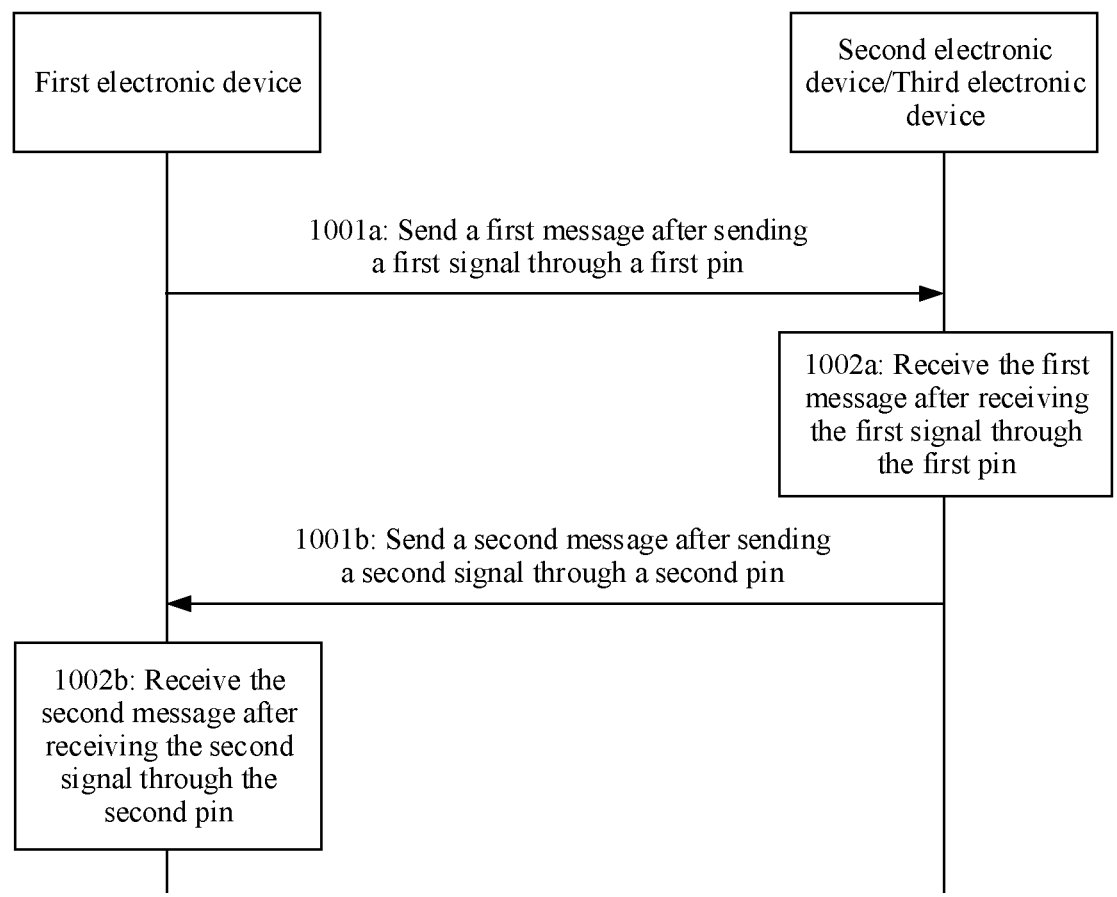
FIG. 10a is a schematic flowchart of a charging cable-based data transmission method according to an embodiment of this application.

Based on the foregoing problem 2, considering that data is transmitted on a D– bus at a fixed communication frequency in the conventional technology, when interference exists in data transmission, data transmission robustness is relatively low, and communication performance is relatively poor. With reference to the embodiment in FIG. 9a, the first electronic device may select a required communication frequency according to an actual requirement. As shown in FIG. 10a, the following specifically describes a method for configuring a communication frequency between a first electronic device and a second electronic device. The following steps are specifically included.

Step 1001a: The first electronic device sends a first message after sending a first signal through a first pin.

A frequency of the first signal is a first frequency.

Figure 10B:
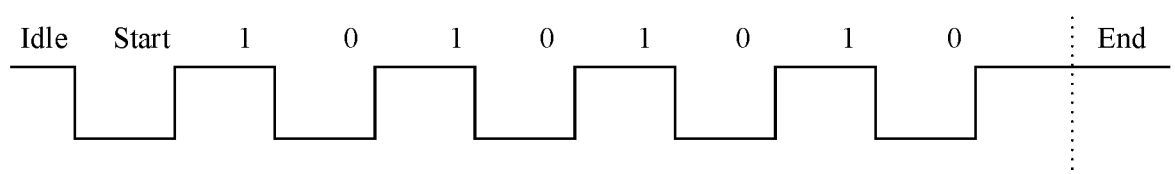
FIG. 10b is a schematic diagram of a signal in a charging cable-based data transmission method according to an embodiment of this application.

The first frequency may be determined based on the sent first signal. For example, as shown in FIG. 10b, the first signal may be 0xAA or 0x55 data sent on a D– channel, and the communication frequency of the first signal is determined by receiving the 0xAA or 0x55 data. After the data, a level pulse may be further included, and the level pulse is used as an end bit of the first signal.

Step 1002a: The second electronic device or a third electronic device receives the first message after receiving the first signal through the first pin.

A communication frequency of a second message is determined as a frequency of a second signal based on the first signal.

Step 1001b: The second electronic device or the third electronic device sends the second message after sending the second signal through a second pin.

The communication frequency of the second message is determined as the frequency of the second signal based on the second signal.

Step 1002b: The first electronic device receives the second message after receiving the second signal through the second pin.

The communication frequency of the second message is determined as the frequency of the second signal based on the second signal.

According to the foregoing method, the first electronic device may send the first signal, and after receiving the first signal, the second electronic device and the third electronic device determine to perform communication at the first frequency of the first signal.

Problem 3: Considering that in the conventional technology, only point-to-point communication between the first electronic device and the second electronic device can be supported on the D– line, and communication between a plurality of devices cannot be supported, a scenario in which the first electronic device, the second electronic device, and the third electronic device need to perform communication when the third electronic device exists in a system cannot be adapted.

Based on the foregoing problem, in this embodiment of this application, identifiers of different electronic devices may be defined, and when the first message or the second message is sent, an identifier of a corresponding electronic device may be carried, to implement data transmission between a plurality of devices.

In this embodiment, using the first electronic device as an example, the first message is sent by using a first data signal line, and the second message is received by using a second data signal line. Therefore, only an identifier of a receiver needs to be carried in the first message and the second message, to distinguish between a plurality of electronic devices that may be receivers.

In some embodiments, identifiers of different electronic devices may be represented by using role code information. The role code information may be carried by using physical packet header information.

In a possible implementation, the first message includes a first identifier, the first identifier is used to indicate a receiver of the first message, the second message includes a second identifier, the second identifier is used to indicate a receiver of the second message, and the receiver of the first message is either of the following: the second electronic device and the third electronic device.

For example, a role code (Role Code) may include four data bits, where two most significant bits identify a data receiver role, or two least significant bits identify a data receiver role.

For example, the two most significant bits identify the data receiver role. In a data packet, the first field is data packet header information, and the data packet header information may carry an identifier of a data receiver. For example, refer to Table 4.

TABLE 4

| Role code | Bit | Description |
|---|---|---|
| | 7:6 | Data receiver identifier |
| | Value | Description |
| First identifier | 01 | Send to the second electronic device |
| First identifier | 10 | Send to the third electronic device |
| Second identifier | 11 | Send to the first electronic device |

Problem 4: Considering that a communication manner complies with a manner in which a primary device asks and a secondary device (the second electronic device or the third electronic device) answers in the conventional technology, the secondary device (the second electronic device or the third electronic device) can only respond to the primary device, but cannot perform active communication. In other words, only after the first electronic device sends a message to the second electronic device, the second electronic device can feed back a corresponding message. In a scenario in which the second electronic device needs to actively report related information, for example, the second electronic device is abnormal, the first electronic device may not be notified in a timely manner, resulting in a problem that charging of the first electronic device is abnormal, or even a corresponding component of the first electronic device is damaged.

Figures 1, 11A:
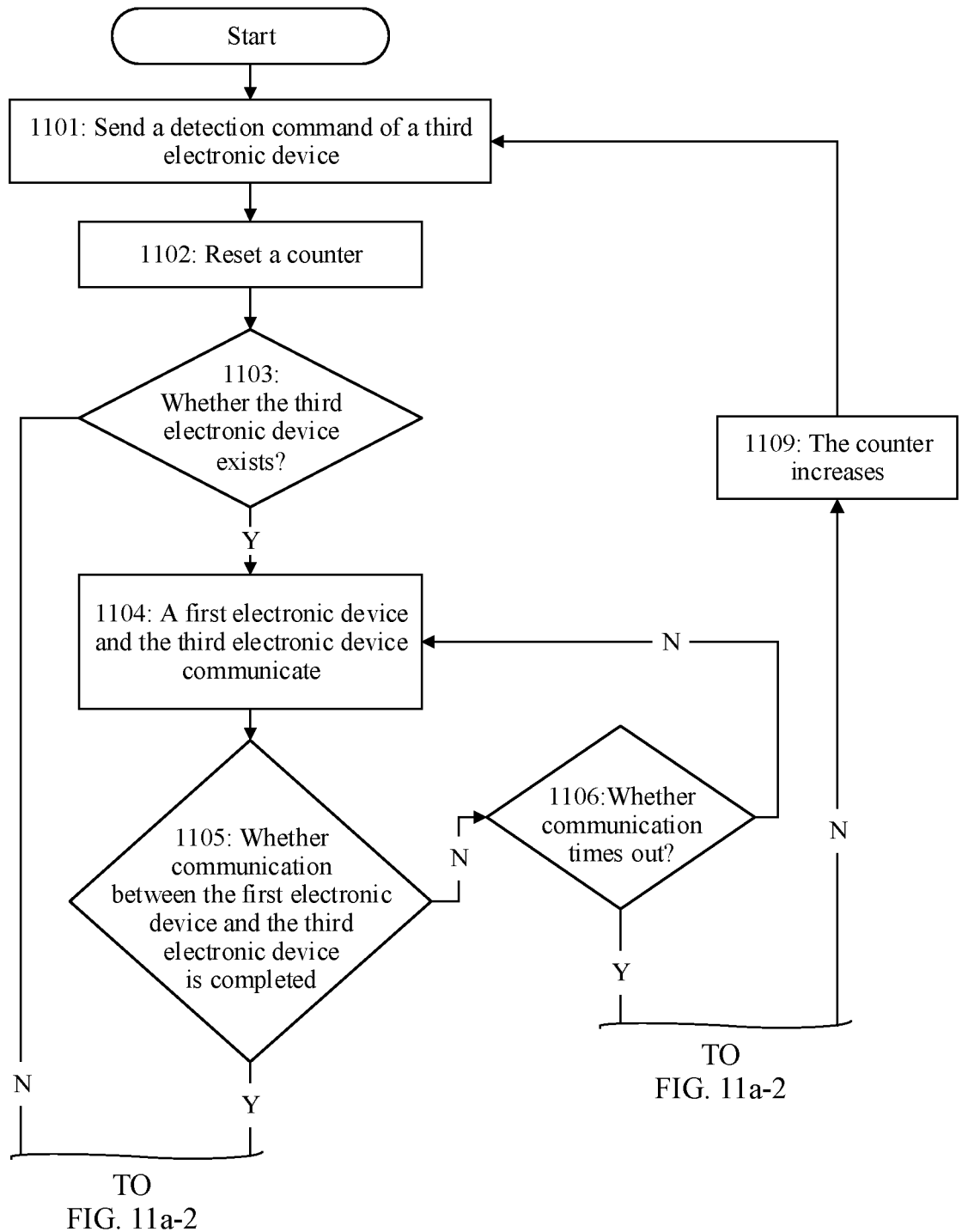
Figures 2, 11A:
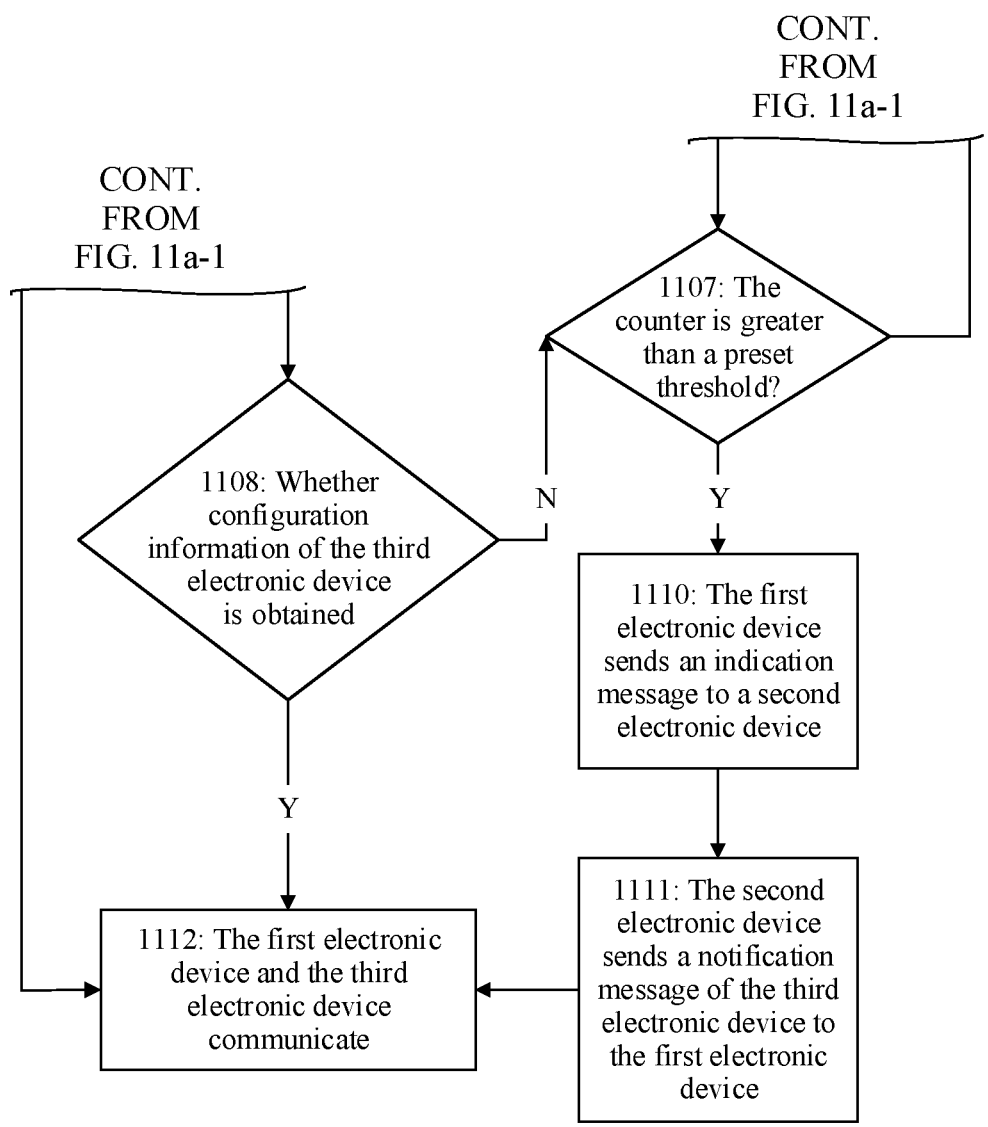

Based on the problem 4, with reference to the embodiment in FIG. 9a, the secondary device is allowed to actively send a message. Data transmission is implemented between a plurality of electronic devices through D+ or D−, to send a command and report and obtain information between the devices. A problem that a plurality of electronic devices share the first data signal line to send messages is considered. Data transmission between the third electronic device and the first electronic device may be first performed, and after it is determined that the data transmission between the third electronic device and the first electronic device is completed, only data transmission between the first electronic device and the second electronic device is enabled. With reference to FIG. 11a-1 and FIG. 11a-2, description is provided below by using an example in which the first electronic device actively initiates obtaining of configuration information of the third electronic device. For a manner in which the second electronic device actively initiates obtaining of the configuration information of the third electronic device, refer to this embodiment. Details are not described herein.

Step 1101: After handshake detection is completed, the first electronic device sends a detection instruction to the third electronic device.

It should be noted that the detection instruction sent by the first electronic device to the third electronic device may be the foregoing third message, to implement setting of a pin of the third electronic device, or may be used to obtain configuration information of the third electronic device. For specific content, refer to the foregoing description. Details are not described herein again. In the manner in which the second electronic device actively initiates obtaining of the configuration information of the third electronic device, the second electronic device may send a detection instruction (the third message) to the third electronic device after handshake detection is completed.

Step 1102: Reset a counter.

Step 1103: The first electronic device determines whether the third electronic device exists, and performs step 1112 if the third electronic device does not exist, or performs step 1104 if the third electronic device exists.

Step 1104: The first electronic device and the third electronic device start communication according to a specified process. In this process, the second electronic device is prohibited from actively initiating communication.

For example, the first electronic device sends a third message to the third electronic device, where the third message is used to obtain the configuration information of the third electronic device. Correspondingly, the first electronic device receives a third response message from the third electronic device through the second pin, where the third response message is used to indicate the configuration information of the third electronic device.

Step 1105: The first electronic device determines whether communication between the first electronic device and the third electronic device is completed, and performs step 1108 if the communication is completed, or performs step 1106 if the communication is not completed.

Step 1106: The first electronic device determines whether communication between the first electronic device and the third electronic device exceeds a preset time period, and performs step 1107 if the communication exceeds the preset time period, or performs step 1104 if the communication does not exceed the preset time period.

Step 1107: Determine whether the counter is greater than a preset threshold (for example, the preset threshold is 3), and perform step 1108 if the counter is greater than the preset threshold, or perform step 1109 if the counter is not greater than the preset threshold.

Step 1108: The first electronic device determines whether the configuration information of the third electronic device is successfully obtained. If the configuration information of the third electronic device is successfully obtained, step 1112 is performed. If the configuration information of the third electronic device is not successfully obtained, step 1110 is performed.

Step 1109: Increase a count of the counter.

Through the counter, it can be ensured that communication between the first electronic device and the third electronic device is completed within a quantity of times of the preset threshold and the preset time period, and then communication between the first electronic device and the second electronic device is performed.

Step 1110: The first electronic device sends an indication message to the second electronic device.

Optionally, before enabling communication with the second electronic device, the first electronic device may send a reset message to the third electronic device, where the reset message is used to indicate that a first pin of the third electronic device and a second pin of the third electronic device are in a message receiving state. Therefore, the third electronic device determines to stop communication with the first electronic device.

The first electronic device sends the indication message to the second electronic device, where the indication message is used to indicate the second electronic device to obtain the configuration information of the third electronic device. Therefore, the second electronic device may communicate with the third electronic device, so that the configuration information of the third electronic device is obtained by using the second electronic device.

It should be noted that, for a manner in which the second electronic device may communicate with the third electronic device, refer to the manner in which the first electronic device communicates with the third electronic device to obtain the configuration information of the third electronic device in step 1101 to step 1112. Details are not described herein.

Step 1111: After the second electronic device requests to obtain the configuration information of the third electronic device by communicating with the third electronic device, the second electronic device may send a notification message of the third electronic device to the first electronic device.

In a possible scenario, the second electronic device successfully obtains the configuration information of the third electronic device. In this case, the notification message may include the configuration information of the third electronic device. Optionally, the notification message may be further used to indicate that the second electronic device successfully obtains the configuration information of the third electronic device.

In another possible scenario, the second electronic device fails to obtain the configuration information of the third electronic device. In this case, the notification message may be used to indicate that the second electronic device fails to obtain the configuration information of the third electronic device.

Therefore, the first electronic device obtains the configuration information of the third electronic device by using the second electronic device, to determine whether to use the configuration information of the third electronic device for charging configuration.

Step 1112: The first electronic device starts communication with the second electronic device.

When an exception occurs on the first data signal line or the second data signal line, for example, during large-current charging, the first electronic device is disconnected from the second electronic device. In this case, a large current may cause irreversible damage to the first electronic device or the second electronic device. In this case, the second electronic device may detect, within a microsecond-level time period, an unplugging action of the third electronic device, quickly disable an energy output channel, and stop a fast charging mode. Therefore, correspondingly, a data transmission manner also needs to be restored to a data transmission manner in a common charging mode. In this embodiment of this application, the first electronic device may send a reset signal, to reset a communication mode of the second electronic device and the third electronic device.

Figure 11B:
FIG. 11b is a schematic diagram of a second reset signal according to an embodiment of this application.

FIG. 11b is a time sequence diagram of a second reset signal sent by the first electronic device. The first electronic device may send a second reset signal through the first pin, where the second reset signal is used to indicate a receiver of the second reset signal to perform reset, and a pulse width of the second reset signal is associated with the receiver.

In some embodiments, the second reset signal may be a reset pulse, and the reset pulse may be a pulse signal for driving the first data signal line to a low level in a preset time period. For example, a preset time period corresponding to the second electronic device may be 1 ms. The preset time period may be far greater than a time length occupied by the data signal or the time window in this application.

After the second electronic device receives the second reset signal, the second electronic device restores a status of the second electronic device to a default state according to a reset protocol. After the third electronic device receives the second reset signal, the third electronic device restores a status of the third electronic device to a default state according to a reset protocol.

When a power supply device executes a reset command, if a previous command sequence is running, the reset command is delivered only after the previous command sequence ends. For the second electronic device or the third electronic device, pulse widths of the second reset signal may be different. For example, a time length of the second reset signal of the third electronic device may be 1 ms, and a time length of the second reset signal of the second electronic device may be 2 ms. In another possible implementation, the second reset signal may alternatively be determined based on a current communication frequency. For example, a time length of the second reset signal of the first electronic device may be N cycles (cycle T corresponding to a communication frequency f between the first electronic device and the second electronic device). This is not limited herein.

To improve data transmission quality on a communication link, in this embodiment of this application, a data packet may further include communication data error check. For this method, refer to the data error check method in the foregoing embodiment. Details are not described herein.

Figure 12:
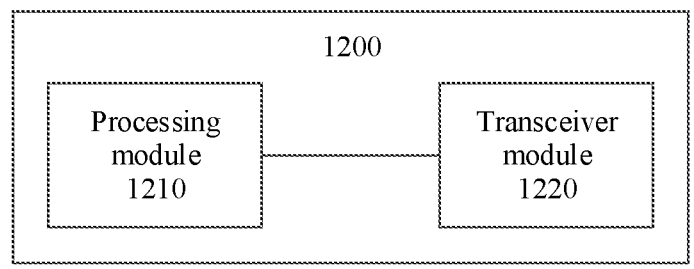
FIG. 12 is a schematic diagram of a structure of a possible electronic device according to an embodiment of this application.

As shown in FIG. 12, based on a same concept, FIG. 12 shows an electronic device 1200 according to an embodiment of this application. The electronic device 1200 includes a processing module 1210 and a transceiver module 1220.

In a possible embodiment, the electronic device 1200 may be a first electronic device. The electronic device 1200 is connected to a second electronic device through a third electronic device, and the third electronic device includes a first data signal line and a second data signal line.

The processing module 1210 is configured to detect a connection to the second electronic device by using the transceiver module 1220. The processing module 1210 is configured to: send a first message through a first pin of the transceiver module 1220, where the first pin is connected to the first data signal line; and receive a second message through a second pin of the transceiver module 1220, where the second pin is connected to the second data signal line, and the first message and the second message are used for charging setting of the first electronic device.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

In a possible implementation, the processing module 1210 is configured to: detect the connection to the second electronic device by using the first pin or the second pin, and determine that the second electronic device is a dedicated charging port DCP device; send a first pulse signal through the first pin of the transceiver module 1220; and detect an electrical signal of the second electronic device by using the second pin, and determine that the second electronic device supports a fast charging mode.

In a possible implementation, the second pin is the pin connected to the positive signal data line, and the electrical signal is a high-level signal.

In a possible implementation, the second pin is the pin connected to the negative signal data line, and the electrical signal is a low-level signal.

In a possible implementation, the first message includes a first identifier, the first identifier is used to indicate a receiver of the first message, the second message includes a second identifier, and the second identifier is used to indicate a receiver of the second message.

In a possible implementation, the receiver of the first message is a chip of the third electronic device, and the receiver of the second message is the first electronic device.

In a possible implementation, the receiver of the first message is the second electronic device, and the receiver of the second message is the first electronic device.

In a possible implementation, before sending the first message through the first pin of the transceiver module 1220, the processing module 1210 is further configured to send a first signal through the first pin, where a frequency of the first signal is a first frequency, and the first signal is used to indicate that a frequency of the first message is the first frequency.

In a possible implementation, the processing module 1210 is configured to receive a second signal through the second pin of the transceiver module 1220, where a frequency of the second signal is a second frequency, and the second signal is used to indicate that a frequency of the second message is the second frequency.

In a possible implementation, the first message includes at least one data frame, and the data frame is any one of the following: data packet header information, data information, control information, and cyclic redundancy check, where a data frame includes a start field, a data field, and an end field.

In a possible implementation, the data packet header information includes the first identifier.

In a possible implementation, the processing module 1210 is further configured to send a start signal before sending the first message through the first pin of the transceiver module 1220, where the start signal is a high-level signal, or the start signal is a low-level signal. The processing module 1210 is further configured to send an end signal after sending the first message through the first pin of the transceiver module 1220, where the end signal is a low-level signal.

Alternatively, the processing module 1210 is further configured to send a start signal before sending the first message through the first pin of the transceiver module 1220, where the start signal is a low-level signal. The processing module 1210 is further configured to send an end signal after sending the first message through the first pin of the transceiver module 1220, where the end signal is a high-level signal.

In a possible implementation, the processing module 1210 is further configured to receive a start signal before receiving the second message through the second pin of the transceiver module 1220, where the start signal is a high-level signal. The processing module 1210 is further configured to receive an end signal after receiving the second message through the second pin of the transceiver module 1220, where the end signal is a low-level signal.

Alternatively, the processing module 1210 is further configured to receive a start signal before receiving the second message through the second pin of the transceiver module 1220, where the start signal is a low-level signal. The processing module 1210 is further configured to receive an end signal after receiving the second message through the second pin of the transceiver module 1220, where the end signal is a high-level signal.

In a possible implementation, the processing module 1210 is configured to send a first reset signal through the first pin of the transceiver module 1220, where the first reset signal is used to indicate a receiver of the first reset signal to perform reset, and a pulse width of the first reset signal is associated with the receiver.

In a possible embodiment, the electronic device 1200 may be a first electronic device.

In a possible implementation, the processing module 1210 is configured to: determine that a second pin is in a message receiving state and a first pin is in a message sending state, where the first pin is connected to the first data signal line, and the second pin is connected to the second data signal line; and send a third message to the third electronic device through the first pin of the transceiver module 1220, where the third message is used to obtain configuration information of the third electronic device, or the third message is used by the first electronic device to indicate the third electronic device to switch a receiving/sending state of a pin.

In a possible implementation, the processing module 1210 is configured to: receive a message from the second electronic device through the second pin of the transceiver module 1220, and determine that the second pin is in the message receiving state and the first pin is in the message sending state; or send a message to the second electronic device through the first pin of the transceiver module 1220, and determine that the second pin is in the message receiving state and the first pin is in the message sending state.

In a possible implementation, the processing module 1210 is configured to receive a third response message from the third electronic device through the second pin of the transceiver module 1220, where the third response message is used to indicate the configuration information of the third electronic device.

In a possible implementation, the third message includes a third identifier, and the third identifier is used to indicate that a receiver of the third message is the third electronic device.

In a possible implementation, the processing module 1210 is configured to send an indication message to the second electronic device through the transceiver module 1220 when determining that the configuration information of the third electronic device fails to be received, where the indication message is used to indicate the second electronic device to obtain the configuration information of the third electronic device.

In a possible implementation, the processing module 1210 is configured to receive a notification message from the second electronic device through the transceiver module 1220, where the notification message is used to notify that the second electronic device fails to obtain the configuration information of the third electronic device.

In a possible implementation, the processing module 1210 is configured to: when a fourth message from the second electronic device is received through the second pin of the transceiver module 1220, determine that communication with the third electronic device ends.

In a possible implementation, the processing module 1210 is configured to send a reset message to the third electronic device through the first pin of the transceiver module 1220, where the reset message is used to indicate that the first pin of the third electronic device and the second pin of the third electronic device are in the message receiving state.

In a possible implementation, the processing module 1210 is configured to: determine that the first pin is in the message receiving state and the second pin is in the message sending state; send a fifth message to the third electronic device through the second pin of the transceiver module 1220, where the fifth message is used to obtain the configuration information of the third electronic device; and receive a fifth response message from the third electronic device through the first pin of the transceiver module 1220, where the fifth response message is used to indicate the configuration information of the third electronic device.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

In a possible embodiment, the electronic device 1200 may be a first electronic device. The processing module 1210 is configured to: detect a connection to the second electronic device through the transceiver module 1220; and send a first message through a first pin of the transceiver module 1220; or receive a second message through the first pin, where the first message and the second message are messages obtained after Manchester coding, the first pin is connected to the first data signal line, and the first message and the second message are used for charging setting of the first electronic device.

In a possible implementation, the first pin is a pin connected to a negative signal data line, or the first pin is a pin connected to a positive signal data line.

In a possible implementation, the processing module 1210 is configured to detect the connection to the second electronic device by using the first pin and a second pin of the transceiver module 1220, and determine that the second electronic device is a dedicated charging port DCP device; the processing module 1210 is configured to send a first pulse signal through the first pin of the transceiver module 1220; and the processing module 1210 is configured to detect an electrical signal of the second electronic device by using the second pin of the transceiver module 1220, and determine whether to charge a battery of the first electronic device in a fast charging mode.

In a possible implementation, the second pin is the pin connected to the positive signal data line, and the electrical signal is a high-level signal.

In a possible implementation, the second pin is the pin connected to the negative signal data line, and the electrical signal is a low-level signal.

In a possible implementation, the first message includes a first identifier, the first identifier is used to indicate a receiver of the first message and a sender of the first message, the second message includes a second identifier, the second identifier is used to indicate a receiver of the second message and a sender of the second message, and the receiver of the first message or the sender of the second message is either of the following: the second electronic device and the third electronic device.

In a possible implementation, the processing module 1210 is configured to send a first signal through the first pin of the transceiver module 1220, where a frequency of the first signal is a first frequency, and the first signal is used to negotiate that a communication frequency is the first frequency.

In a possible implementation, the processing module 1210 is configured to receive a second signal through the first pin of the transceiver module 1220, where a frequency of the second signal is a first frequency, and the second signal is used to determine that a communication frequency is the first frequency.

In a possible implementation, frequencies of the first message and the second message are the first frequency.

In a possible implementation, the first message includes at least one data frame, and the data frame is any one of the following: data packet header information, data information, control information, and cyclic redundancy check, where a data frame includes a start field, a data field, and an end field.

In a possible implementation, after the processing module 1210 sends the first message through the first pin of the transceiver module 1220, in a first time window, the first data signal line is used by the first electronic device to receive a message.

In a possible implementation, after receiving the second message through the first pin of the transceiver module 1220, the processing module 1210 is further configured to determine, in a second time window, that the first data signal line is used by the first electronic device to receive a message.

In a possible implementation, after receiving the second message through the first pin of the transceiver module 1220, the processing module 1210 is further configured to determine that the first data signal line is used by the first electronic device to send a message after current time exceeds the second time window.

In a possible implementation, the processing module 1210 is configured to send a first reset signal through the first pin of the transceiver module 1220, where the first reset signal is used to indicate a receiver of the first reset signal to perform reset, and a pulse width of the first reset signal is associated with the receiver.

In a possible embodiment, the electronic device 1200 may be a second electronic device. The second electronic device is connected to a first electronic device through a third electronic device, and the third electronic device includes a first data signal line and a second data signal line.

In a possible implementation, the processing module 1210 is configured to determine a connection to the first electronic device through the transceiver module 1220; the processing module 1210 is configured to receive a first message through a first pin of the transceiver module 1220, where the first pin is connected to the first data signal line; and the processing module 1210 is configured to send a second message through a second pin of the transceiver module 1220, where the second pin is connected to the second data signal line, and the first message and the second message are used for charging setting of the first electronic device.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

In a possible implementation, the processing module 1210 is configured to receive detection from the first electronic device through the first pin or the second pin of the transceiver module 1220, where the detection is used by the first electronic device to determine that the second electronic device is a dedicated charging port DCP device.

The processing module 1210 is configured to receive a first pulse signal from the first electronic device through the first pin of the transceiver module 1220. The processing module 1210 is configured to send an electrical signal to the first electronic device through the second pin of the transceiver module 1220, and determine to charge a battery of the first electronic device in a fast charging mode.

In a possible implementation, the second pin is the pin connected to the positive signal data line, and the electrical signal is a high-level signal; or the second pin is the pin connected to the negative signal data line, and the electrical signal is a low-level signal.

In a possible implementation, the first message includes a first identifier, the first identifier is used to indicate a receiver of the first message, the second message includes a second identifier, and the second identifier is used to indicate a receiver of the second message.

In a possible implementation, the receiver of the first message is the second electronic device, and the receiver of the second message is the first electronic device.

In a possible implementation, when the receiver of the first message is a chip of the third electronic device, the second message is not sent to the first electronic device.

In a possible implementation, before sending the second message through the second pin of the transceiver module 1220, the processing module 1210 is further configured to send a second signal through the second pin, where a frequency of the second signal is a second frequency, and the second signal is used to indicate that a frequency of the second message is the second frequency.

In a possible implementation, the processing module 1210 is configured to receive a first signal through the first pin of the transceiver module 1220, where a frequency of the first signal is a first frequency, and the first signal is used to indicate that a frequency of the first message is the first frequency.

In a possible implementation, the first message includes at least one data frame, and the data frame is any one of the following: data packet header information, data information, control information, and cyclic redundancy check, where a data frame includes a start field, a data field, and an end field.

In a possible implementation, the processing module 1210 is further configured to send a start signal before sending the second message through the second pin of the transceiver module 1220, where the start signal is a low-level signal. The processing module 1210 is further configured to send an end signal after sending the second message through the second pin of the transceiver module 1220, where the end signal is a high-level signal.

In a possible implementation, the processing module 1210 is further configured to receive a start signal before receiving the first message through the first pin of the transceiver module 1220, where the start signal is a low-level signal. The processing module 1210 is further configured to receive an end signal after receiving the first message through the first pin of the transceiver module 1220, where the end signal is a high-level signal.

In a possible implementation, the processing module 1210 is configured to receive a first reset signal through the first pin of the transceiver module 1220, where a pulse width of the first reset signal is associated with the second electronic device.

The processing module 1210 is configured to reset the second electronic device based on the first reset signal.

In a possible implementation, the processing module 1210 is configured to receive a second reset signal through the first pin of the transceiver module 1220, where a pulse width of the second reset signal is associated with the third electronic device. The processing module 1210 is further configured to ignore the second reset signal.

In a possible embodiment, the electronic device 1200 may be a second electronic device.

The processing module 1210 is configured to: determine that a first pin is in a message receiving state and a second pin is in a message sending state, where the first pin is connected to the first data signal line, and the second pin is connected to the second data signal line. The processing module 1210 is configured to send a third message to the third electronic device through the second pin of the transceiver module 1220, where the third message is used to obtain configuration information of the third electronic device, or the third message is used by the second electronic device to indicate the third electronic device to switch a receiving/sending state of a pin.

In a possible implementation, the processing module 1210 is configured to receive a message from the first electronic device through the first pin of the transceiver module 1220, and determine that the first pin is in the message receiving state and the second pin is in the message sending state; or the processing module 1210 is configured to send a message to the first electronic device through the second pin of the transceiver module 1220, and determine that the first pin is in the message receiving state and the second pin is in the message sending state.

In a possible implementation, the processing module 1210 is configured to receive a third response message from the third electronic device through the first pin of the transceiver module 1220, where the third response message is used to indicate the configuration information of the third electronic device.

In a possible implementation, the third message includes a third identifier, and the third identifier is used to indicate that a receiver of the third message is the third electronic device.

In a possible implementation, the processing module 1210 is configured to send a notification message to the first electronic device through the transceiver module 1220 when determining that the configuration information of the third electronic device fails to be received, where the notification message is used to notify that the second electronic device fails to obtain the configuration information of the third electronic device.

In a possible implementation, before sending the third message to the third electronic device through the first pin of the transceiver module 1220, the processing module 1210 is further configured to receive an indication message from the first electronic device through the second pin of the transceiver module 1220, where the indication message is used to indicate the second electronic device to obtain the configuration information of the third electronic device.

In a possible implementation, the processing module 1210 is configured to: when a fourth message from the first electronic device is received through the second pin of the transceiver module 1220, determine that communication with the third electronic device ends.

In a possible implementation, the processing module 1210 is configured to send a reset message to the third electronic device through the first pin of the transceiver module 1220, where the reset message is used to indicate that the first pin of the third electronic device and the second pin of the third electronic device are in the message receiving state.

In a possible implementation, the processing module 1210 is configured to determine that the second pin is in the message receiving state and the first pin is in the message sending state; the processing module 1210 is configured to send a fifth message to the third electronic device through the second pin of the transceiver module 1220, where the fifth message is used to obtain the configuration information of the third electronic device; and the processing module 1210 is configured to receive a fifth response message from the third electronic device through the second pin of the transceiver module 1220, where the fifth response message is used to indicate the configuration information of the third electronic device.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

In a possible embodiment, the electronic device 1200 may be a second electronic device. The processing module 1210 is configured to: determine a connection to the first electronic device through the transceiver module 1220; and send a second message through a first pin of the transceiver module 1220; or receive a first message through the first pin of the transceiver module 1220, where the first pin is connected to the first data signal line, the first message and the second message are messages obtained after Manchester coding, and the first message and the second message are used for charging setting of the first electronic device.

In a possible implementation, the first pin is a pin connected to a negative signal data line, or the first pin is a pin connected to a positive signal data line.

In a possible implementation, the processing module 1210 is configured to: receive detection from the first electronic device through the first pin and a second pin of the transceiver module 1220, where the detection is used by the first electronic device to determine that the second electronic device is a dedicated charging port DCP device; receive a first pulse signal from the first electronic device through the first pin; and send an electrical signal to the first electronic device through the second pin, and determine whether to charge a battery of the first electronic device in a fast charging mode.

In a possible implementation, the second pin is the pin connected to the positive signal data line, and the electrical signal is a high-level signal.

The second pin is the pin connected to the negative signal data line, and the electrical signal is a low-level signal.

In a possible implementation, the first message includes a first identifier, and the first identifier is used to indicate a receiver of the first message and a sender of the first message.

The second message includes a second identifier, the second identifier is used to indicate a receiver of the second message and a sender of the second message, and the sender of the first message or the receiver of the second message is either of the following: the first electronic device and the third electronic device.

In a possible implementation, the processing module 1210 is configured to receive a first signal through the first pin of the transceiver module 1220, where a frequency of the first signal is a first frequency, and the first signal is used to negotiate that a communication frequency is the first frequency.

In a possible implementation, the processing module 1210 is configured to send a second signal through the first pin of the transceiver module 1220, where a frequency of the second signal is a first frequency, and the first signal is used to determine that a communication frequency is the first frequency.

In a possible implementation, frequencies of the first message and the second message are the first frequency.

In a possible implementation, the first message includes at least one data frame, and the data frame is any one of the following: data packet header information, data information, control information, and cyclic redundancy check, where a data frame includes a start field, a data field, and an end field.

In a possible implementation, after receiving the first message through the first pin of the transceiver module 1220, the processing module 1210 is further configured to determine, in a first time window, that the first data signal line is used by the second electronic device or the third electronic device to send a message.

In a possible implementation, after sending the second message through the first pin of the transceiver module 1220, the processing module 1210 is further configured to determine, in a second time window, that the first data signal line is used by the second electronic device or the third electronic device to send a message.

In a possible implementation, after sending the second message through the first pin of the transceiver module 1220, the processing module 1210 is further configured to determine that the first data signal line is used by the second electronic device or the third electronic device to receive a message after current time exceeds the second time window.

In a possible implementation, the processing module 1210 is configured to: receive a first reset signal through the first pin of the transceiver module 1220, where a pulse width of the first reset signal is associated with the second electronic device; and reset a charging mode based on the first reset signal.

In a possible implementation, the processing module 1210 is configured to: receive a second reset signal through the first pin of the transceiver module 1220, where a pulse width of the second reset signal is associated with the third electronic device; and ignore the second reset signal.

In a possible embodiment, the electronic device 1200 may be a third electronic device. The third electronic device is configured to connect a second electronic device to a first electronic device, and the third electronic device includes a first data signal line and a second data signal line.

In a possible implementation, the processing module 1210 is configured to receive a first message through a first pin of the transceiver module 1220, where the first pin is connected to the first data signal line; and the processing module 1210 is configured to send a second message through a second pin of the transceiver module 1220, where the second pin is connected to the second data signal line, and the first message and the second message are used for charging setting of the first electronic device.

In a possible implementation, the first pin is a pin connected to a negative signal data line, and the second pin is a pin connected to a positive signal data line.

In a possible implementation, the first pin is a pin connected to a positive signal data line, and the second pin is a pin connected to a negative signal data line.

In a possible implementation, the first message includes a first identifier, the first identifier is used to indicate a receiver of the first message, the second message includes a second identifier, and the second identifier is used to indicate a receiver of the second message.

In a possible implementation, the receiver of the first message is the third electronic device, and the receiver of the second message is the first electronic device.

In a possible implementation, when the receiver of the first message is the second electronic device, the processing module 1210 is configured to determine not to send the second message to the first electronic device.

In a possible implementation, the processing module 1210 is configured to receive a first signal through the first pin of the transceiver module 1220, where a frequency of the first signal is a first frequency, and the first signal is used to indicate that a frequency of the first message is the first frequency.

Before sending the second message through the second pin of the transceiver module 1220, the processing module 1210 is further configured to send a first signal through the second pin, where a frequency of the first signal is a second frequency, and the first signal is used to indicate that a frequency of the first message is the second frequency.

In a possible implementation, the first message includes at least one data frame, and the data frame is any one of the following: data packet header information, data information, control information, and cyclic redundancy check, where a data frame includes a start field, a data field, and an end field.

In a possible implementation, the processing module 1210 is further configured to send a start signal through the second pin before sending the second message through the second pin of the transceiver module 1220, where the start signal is a high-level signal. The processing module 1210 is further configured to send an end signal after sending the second message through the second pin of the transceiver module 1220, where the end signal is a low-level signal.

Alternatively, the processing module 1210 is further configured to send a start signal before sending the second message through the second pin of the transceiver module 1220, where the start signal is a low-level signal. The processing module 1210 is further configured to send an end signal after sending the second message through the second pin of the transceiver module 1220, where the end signal is a high-level signal.

In a possible implementation, the processing module 1210 is further configured to receive a start signal before receiving the first message through the first pin of the transceiver module 1220, where the start signal is a high-level signal. The processing module 1210 is further configured to receive an end signal after receiving the first message through the first pin of the transceiver module 1220, where the end signal is a low-level signal.

Alternatively, the processing module 1210 is further configured to receive a start signal before receiving the first message through the first pin of the transceiver module 1220, where the start signal is a low-level signal. The processing module 1210 is further configured to receive an end signal after receiving the first message through the first pin of the transceiver module 1220, where the end signal is a high-level signal.

In a possible implementation, the processing module 1210 is configured to: receive a second reset signal through the first pin of the transceiver module 1220, where a pulse width of the second reset signal is associated with the third electronic device; and perform reset based on the second reset signal.

In a possible implementation, the processing module 1210 is configured to receive a first reset signal through the first pin of the transceiver module 1220, where a pulse width of the first reset signal is associated with the second electronic device. The processing module 1210 is configured to ignore the first reset signal.

In a possible embodiment, the electronic device 1200 may be a third electronic device. The electronic device 1200 connects a first electronic device to a second electronic device, and the electronic device 1200 includes a first data signal line and a second data signal line.

In a possible implementation, the processing module 1210 is configured to: send a second message through a first pin of the transceiver module 1220; or receive a first message through the first pin of the transceiver module 1220, where the first pin is connected to the first data signal line, the first message and the second message are messages obtained after Manchester coding, and the first message and the second message are used for charging setting of the first electronic device.

In a possible implementation, the first pin is a pin connected to a negative signal data line, or the first pin is a pin connected to a positive signal data line.

In a possible implementation, the first message includes a first identifier, and the first identifier is used to indicate a receiver of the first message and a sender of the first message.

The second message includes a second identifier, the second identifier is used to indicate a receiver of the second message and a sender of the second message, and the sender of the first message or the receiver of the second message is either of the following: the first electronic device and the third electronic device.

In a possible implementation, frequencies of the first message and the second message are the first frequency.

In a possible implementation, the first message includes at least one data frame, and the data frame is any one of the following: data packet header information, data information, control information, and cyclic redundancy check, where a data frame includes a start field, a data field, and an end field.

In a possible implementation, after receiving the first message through the first pin of the transceiver module 1220, the processing module 1210 is further configured to determine, in a first time window, that the first data signal line is used by the second electronic device or the third electronic device to send a message.

In a possible implementation, after sending the second message through the first pin of the transceiver module 1220, the processing module 1210 is further configured to determine, in a second time window, that the first data signal line is used by the second electronic device or the third electronic device to send a message.

In a possible implementation, after sending the second message through the first pin of the transceiver module 1220, the processing module 1210 is further configured to determine that the first data signal line is used by the third electronic device or the second electronic device to receive a message after current time exceeds the second time window.

In a possible implementation, the processing module 1210 is configured to: receive a first reset signal through the first pin of the transceiver module 1220, where a pulse width of the first reset signal is associated with the third electronic device; and reset a charging mode based on the first reset signal.

In a possible implementation, the processing module 1210 is configured to: receive a second reset signal through the first pin of the transceiver module 1220, where a pulse width of the second reset signal is associated with the second electronic device; and ignore the second reset signal.

In a possible embodiment, the electronic device 1200 may be a third electronic device.

In a possible implementation, the processing module 1210 is configured to: when receiving a third message through a first pin of the transceiver module 1220, set the first pin to a message receiving state and set a second pin to a message sending state, where the first pin is connected to the first data signal line, the second pin is connected to the second data signal line, and a receiver of the third message is the third electronic device.

In a possible implementation, the processing module 1210 is configured to set the first pin and the second pin to the message receiving state before receiving the third message through the first pin of the transceiver module 1220.

In a possible implementation, the third message further includes a third identifier, and the third identifier is used to indicate that a receiver of the third message is the third electronic device.

In a possible implementation, the processing module 1210 is configured to set the first pin and the second pin to the message receiving state when a fourth message is received through the first pin of the transceiver module 1220, where a receiver of the fourth message is the second electronic device or the first electronic device, and the fourth message is used to indicate that the first pin of the third electronic device and the second pin of the third electronic device are in the message receiving state.

In a possible implementation, the processing module 1210 is configured to: when receiving a fifth message through the second pin of the transceiver module 1220, set the second pin to the message receiving state and set the first pin to the message sending state, where a receiver of the fifth message is the third electronic device.

In a possible implementation, the third message and the fifth message are sent by a same electronic device; or the third message is sent by the second electronic device, and the fifth message is sent by the first electronic device.

In a possible implementation, the third message and the fourth message are used by the first electronic device or the second electronic device to obtain configuration information of the third electronic device; or the third message and the fourth message are used by the first electronic device or the second electronic device to indicate the third electronic device to switch a receiving/sending state of a pin.

In a possible implementation, the first pin is a pin connected to a negative signal data line, and the second pin is a pin connected to a positive signal data line; or the first pin is a pin connected to a positive signal data line, and the second pin is a pin connected to a negative signal data line.

In a possible embodiment, the electronic device 1200 may be a third electronic device.

In a possible implementation, the processing module 1210 is configured to: send a second message through a first pin of the transceiver module 1220; or receive a first message through the first pin, where the first pin is connected to the first data signal line, the first message and the second message are messages obtained after Manchester coding, and the first message and the second message are used for charging setting of the first electronic device.

In a possible implementation, the first pin is a pin connected to a negative signal data line, or the first pin is a pin connected to a positive signal data line.

In a possible implementation, the first message includes a first identifier, the first identifier is used to indicate a receiver of the first message and a sender of the first message, the second message includes a second identifier, the second identifier is used to indicate a receiver of the second message and a sender of the second message, and the sender of the first message or the receiver of the second message is either of the following: the first electronic device and the third electronic device.

In a possible implementation, frequencies of the first message and the second message are the first frequency.

In a possible implementation, the first message includes at least one data frame, and the data frame is any one of the following: data packet header information, data information, control information, and cyclic redundancy check, where a data frame includes a start field, a data field, and an end field.

In a possible implementation, after receiving the first message through the first pin of the transceiver module 1220, the processing module 1210 is further configured to determine, in a first time window, that the first data signal line is used by the second electronic device or the third electronic device to send a message.

In a possible implementation, after sending the second message through the first pin of the transceiver module 1220, the processing module 1210 is further configured to determine, in a second time window, that the first data signal line is used by the second electronic device or the third electronic device to send a message.

In a possible implementation, after the processing module 1210 sends the second message through the first pin of the transceiver module 1220, the processing module 1210 is configured to determine that the first data signal line is used by the third electronic device or the second electronic device to receive a message after current time exceeds the second time window.

In a possible implementation, the processing module 1210 is configured to: receive a second reset signal through the first pin of the transceiver module 1220, where a pulse width of the second reset signal is associated with the third electronic device; and reset a charging mode based on the second reset signal.

In a possible implementation, the processing module 1210 is configured to receive a first reset signal through the first pin of the transceiver module 1220, where a pulse width of the first reset signal is associated with the second electronic device; and ignore the first reset signal.

Figure 13:
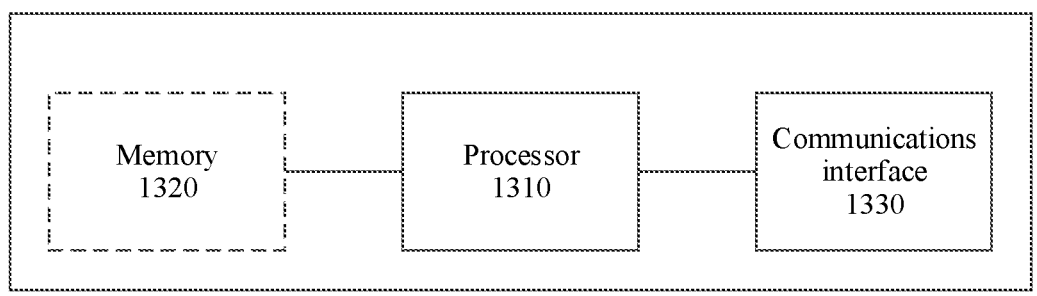
FIG. 13 is a schematic diagram of a structure of a possible electronic device according to an embodiment of this application.

Based on a same inventive concept, FIG. 13 is a schematic diagram of a structure of an electronic device according to this application.

In a possible embodiment, the electronic device in FIG. 13 may be a first electronic device. The first electronic device may include a processor 1310 and a communications interface 1330. The processor 1310 may be a baseband processor, and the baseband processor may include one or more central processing units (central processing unit, CPU). Alternatively, the first electronic device may be a component that has a function of the first electronic device in embodiments of this application. For example, when the first electronic device is a chip system, the communications interface 1330 may be an input/output interface of the chip system (for example, a baseband chip), and the processor may be a processor of the chip system, and may include one or more central processing units. Optionally, a memory 1320 may further be included. The memory 1320 stores a computer instruction or program, and the processor 1310 may execute the computer instruction or program stored in the memory 1320. When the computer instruction or program stored in the memory 1320 is executed, the processor 1310 is configured to perform an operation other than a sending/receiving operation of the first electronic device in embodiments of this application, and the communications interface 1330 is configured to perform a sending/receiving operation of the first electronic device in embodiments of this application. Alternatively, the first electronic device may not include the memory 1320. For example, the memory is located outside the first electronic device. When the computer instruction or program stored in the external memory is executed, the processor 1310 is configured to perform an operation other than a receiving/sending operation of the first electronic device in the foregoing embodiments, and the communications interface 1330 is configured to perform a sending/receiving operation of the first electronic device in embodiments of this application.

In a possible embodiment, the electronic device in FIG. 13 may be a second electronic device. The second electronic device may include a processor 1310 and a communications interface 1330. The processor 1310 may be a baseband processor, and the baseband processor may include one or more central processing units (central processing unit, CPU). Alternatively, the second electronic device may be a component that has a function of the second electronic device in embodiments of this application. For example, when the second electronic device is a chip system, the communications interface 1330 may be an input/output interface of the chip system (for example, a baseband chip), and the processor may be a processor of the chip system, and may include one or more central processing units. Optionally, a memory 1320 may further be included. The memory 1320 stores a computer instruction or program, and the processor 1310 may execute the computer instruction or program stored in the memory 1320. When the computer instruction or program stored in the memory 1320 is executed, the processor 1310 is configured to perform an operation other than a sending/receiving operation of the second electronic device in embodiments of this application, and the communications interface 1330 is configured to perform a sending/receiving operation of the second electronic device in embodiments of this application. Alternatively, the second electronic device may not include the memory 1320. For example, the memory is located outside the second electronic device. When the computer instruction or program stored in the external memory is executed, the processor 1310 is configured to perform an operation other than a receiving/sending operation of the second electronic device in the foregoing embodiments, and the communications interface 1330 is configured to perform a sending/receiving operation of the second electronic device in embodiments of this application.

In a possible embodiment, the electronic device in FIG. 13 may be a third electronic device. The third electronic device may include a processor 1310 and a communications interface 1330. The processor 1310 may be a baseband processor, and the baseband processor may include one or more central processing units (central processing unit, CPU). Alternatively, the third electronic device may be a component that has a function of the third electronic device in embodiments of this application. For example, when the third electronic device is a chip system, the communications interface 1330 may be an input/output interface of the chip system (for example, a baseband chip), and the processor may be a processor of the chip system, and may include one or more central processing units. Optionally, a memory 1320 may further be included. The memory 1320 stores a computer instruction or program, and the processor 1310 may execute the computer instruction or program stored in the memory 1320. When the computer instruction or program stored in the memory 1320 is executed, the processor 1310 is configured to perform an operation other than a sending/receiving operation of the third electronic device in embodiments of this application, and the communications interface 1330 is configured to perform a sending/receiving operation of the third electronic device in embodiments of this application. Alternatively, the third electronic device may not include the memory 1320. For example, the memory is located outside the third electronic device. When the computer instruction or program stored in the external memory is executed, the processor 1310 is configured to perform an operation other than a receiving/sending operation of the third electronic device in the foregoing embodiments, and the communications interface 1330 is configured to perform a sending/receiving operation of the third electronic device in embodiments of this application.

An embodiment of this application further provides a computer storage medium. The computer-readable storage medium is configured to store a computer program. When the computer program is run on a computer, the computer is enabled to perform the method in any one of the possible implementations in FIG. 4*a* to FIG. 4*d*, FIG. 4*a* to FIG. 5*c*, FIG. 6*a* to FIG. 6*f*, FIG. 7, FIG. 8*a* to FIG. 8*e*, FIG. 9*a* to FIG. 9*h*, FIG. 10*a* and FIG. 10*b*, and FIG. 11*a*-1 and FIG. 11*a*-2.

An embodiment of this application further provides a computer program product including instructions. The computer program product is configured to store a computer program. When the computer program is run on a computer, the computer is enabled to perform the method in any one of the possible implementations in FIG. 4*a* to FIG. 4*d*, FIG. 4*a* to FIG. 5*c*, FIG. 6*a* to FIG. 6*f*, FIG. 7, FIG. 8*a* to FIG. 8*e*, FIG. 9*a* to FIG. 9*h*, FIG. 10*a* and FIG. 10*b*, and FIG. 11*a*-1 and FIG. 11*a*-2.

It should be understood that the processor mentioned in embodiments of this application may be a CPU, or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification includes but is not limited to the memories and any other appropriate types of memories.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in embodiments of this application may be integrated into one processing unit, or each of the units may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium such as a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A first electronic device, comprising:
   at least one processor; and
   a memory coupled to the at least one processor and configured to store programming instructions that, when executed by the at least one processor, cause the first electronic device to:
   determine that a second electronic device is a dedicated charging port (DCP) device after establishing a physical connection to the second electronic device;
   send a first pulse signal through a first pin of the first electronic device;
   in response to sending the first pulse signal, detect an electrical signal of the second electronic device through a second pin of the first electronic device;
   determine that the second electronic device supports a fast charging mode when detecting the electrical signal of the second electronic device through the second pin of the first electronic device;
   send a first message through the first pin; and
   receive a second message through the second pin, wherein the second message is a response message of the first message, and the first message and the second message are used for charging setting of the first electronic device.

2. The first electronic device according to claim 1, wherein the first pin is a pin connected to a negative signal data line between the first electronic device and the second electronic device, and the second pin is a pin connected to a positive signal data line between the first electronic device and the second electronic device.

3. The first electronic device according to claim 1, wherein the second pin is a pin connected to a positive signal data line between the first electronic device and the second electronic device, and the electrical signal is a high-level signal.

4. The first electronic device according to claim 1, wherein the first message comprises a first identifier used to indicate a receiver of the first message; and
   the second message comprises a second identifier used to indicate a receiver of the second message.

5. The first electronic device according to claim 4, wherein the receiver of the first message is the second electronic device, and the receiver of the second message is the first electronic device.

6. The first electronic device according to claim 1, wherein the programming instructions, when executed by the at least one processor, further cause the first electronic device to:
   send a first reset signal through the first pin, wherein the first reset signal is used to reset the second electronic device when a pulse width of the first reset signal is a first width, and the first reset signal is used to reset a third electronic device when the pulse width of the first reset signal is a second width, wherein the first electronic device is connected to the second electronic device through the third electronic device.

7. The first electronic device according to claim 6, wherein the second electronic device is a power supply device, and the third electronic device is a charging cable including a controller.

8. The first electronic device according to claim 1, wherein before sending the first message through the first pin, the programming instructions, when executed by the at least one processor, further cause the first electronic device to:
   send a first signal through the first pin, wherein a frequency of the first signal is a first frequency, and the first signal is used to determine a frequency of the first message.

9. The first electronic device according to claim 1, wherein before receiving the second message through the second pin, the programming instructions, when executed by the at least one processor, further cause the first electronic device to:
   receive a second signal through the second pin, wherein a frequency of the second signal is a second frequency, and the second signal is used to determine a frequency of the second message.

10. The first electronic device according to claim 1, wherein before sending the first message through the first pin, the programming instructions, when executed by the at least one processor, further cause the first electronic device to:
    send a start signal that is a low-level signal; and
    after sending the first message through the first pin, the programming instructions, when executed by the at least one processor, further cause the first electronic device to:
    send an end signal that is a high-level signal.

11. The first electronic device according to claim 1, wherein before receiving the second message through the second pin, the programming instructions, when executed by the at least one processor, further cause the first electronic device to:
receive a start signal that is a low-level signal; and
after receiving the second message through the second pin, the programming instructions, when executed by the at least one processor, further cause the first electronic device to:
receive an end signal that is a high-level signal.

12. The first electronic device according to claim 1, wherein the first electronic device performs full-duplex communication with the second electronic device through the first pin and the second pin.

13. The first electronic device according to claim 1, wherein the programming instructions, when executed by the at least one processor, further cause the first electronic device to:
send a third message to a third electronic device through the first pin, wherein the third message is used to obtain configuration information of the third electronic device, or the third message is used by the first electronic device to indicate the third electronic device to switch a receiving/sending state of a pin.

14. The first electronic device according to claim 13, wherein the third message is used to obtain configuration information of the third electronic device from the third electronic device.

15. The first electronic device according to claim 13, wherein the programming instructions, when executed by the at least one processor, further cause the first electronic device to:
receive a third response message from the third electronic device through the second pin, wherein the third response message is used to indicate the configuration information of the third electronic device.

16. The first electronic device according to claim 13, wherein the third message comprises a third identifier used to indicate that a receiver of the third message is the third electronic device.

17. The first electronic device according to claim 13, wherein the programming instructions, when executed by the at least one processor, further cause the first electronic device to:
send an indication message to the second electronic device when determining that the configuration information of the third electronic device fails to be received, where the indication message is used to indicate the second electronic device to obtain the configuration information of the third electronic device.

18. The first electronic device according to claim 13, wherein the programming instructions, when executed by the at least one processor, further cause the first electronic device to:
determine that communication with the third electronic device ends when a fourth message from the second electronic device is received through the second pin.

19. The first electronic device according to claim 13, wherein the programming instructions, when executed by the at least one processor, further cause the first electronic device to:
send a reset message to the third electronic device through the first pin, where the reset message is used to indicate that two pins of the third electronic device are in the message receiving state.

20. A charging cable-based data transmission system, comprising a first electronic device, a second electronic device, wherein the first electronic device is configured to be connected to the second electronic device through a third electronic device;
wherein the first electronic device is configured to:
determine that the second electronic device is a dedicated charging port (DCP) device after establishing a physical connection to the second electronic device;
send a first pulse signal through a first pin of the first electronic device;
wherein the second electronic device is configured to send an electrical signal in response to receiving the first pulse signal;
wherein the first electronic device is further configured to:
detect the electrical signal of the second electronic device through a second pin of the first electronic device;
determine that the second electronic device supports a fast charging mode when detecting the electrical signal of the second electronic device through the second pin of the first electronic device;
send a first message through the first pin; and
receive a second message through the second pin, wherein the second message is a response message of the first message, and the first message and the second message are used for charging setting of the first electronic device.

* * * * *